US009226271B2

(12) United States Patent
Dwyer et al.

(10) Patent No.: US 9,226,271 B2
(45) Date of Patent: Dec. 29, 2015

(54) METHOD AND APPARATUS FOR STATE/MODE TRANSITIONING

(71) Applicant: BlackBerry Limited, Waterloo (CA)

(72) Inventors: Johanna Lisa Dwyer, Brookline, MA (US); Paul Marcus Carpenter, Twickenham (GB)

(73) Assignee: BlackBerry Limited, Waterloo, Ontario (CA)

( * ) Notice: Subject to any disclaimer, the term of this patent is extended or adjusted under 35 U.S.C. 154(b) by 194 days.

(21) Appl. No.: 13/955,919

(22) Filed: Jul. 31, 2013

(65) Prior Publication Data

US 2013/0316720 A1 Nov. 28, 2013

Related U.S. Application Data

(63) Continuation of application No. 13/751,369, filed on Jan. 28, 2013, which is a continuation of application No. 12/897,945, filed on Oct. 5, 2010.

(60) Provisional application No. 61/263,823, filed on Nov. 23, 2009.

(51) Int. Cl.
*H04J 1/16* (2006.01)
*H04W 72/04* (2009.01)
*H04W 76/04* (2009.01)
*H04W 52/02* (2009.01)

(52) U.S. Cl.
CPC .......... *H04W 72/04* (2013.01); *H04W 52/0206* (2013.01); *H04W 52/0229* (2013.01); *H04W 76/046* (2013.01); *H04W 76/048* (2013.01)

(58) Field of Classification Search
CPC . H04W 76/046; H04W 76/048; H04W 72/04; H04W 52/0229
See application file for complete search history.

(56) References Cited

U.S. PATENT DOCUMENTS

| 5,812,636 | A | 9/1998 | Tseng et al. |
| 6,064,340 | A | 5/2000 | Croft et al. |
| 6,223,044 | B1 | 4/2001 | Schultz |
| 6,229,989 | B1 | 5/2001 | Kwon |
| 6,243,579 | B1 | 6/2001 | Kari |
| 6,275,712 | B1 | 8/2001 | Gray et al. |

(Continued)

FOREIGN PATENT DOCUMENTS

| AU | 2007202206 | 12/2007 |
| CA | 2661592 C | 10/2013 |

(Continued)

OTHER PUBLICATIONS

3GPP ETSI TS 123 034, v3.3.0, Digital Cellular Telecommunications System (Phase 2+) (GSM); Universal Mobile Telecommunications System (UMTS); High Speed Circuit Switched Data (HSCSD)—Stage 2, Dec. 2000 (21 pages).

(Continued)

*Primary Examiner* — Ayaz Sheikh
*Assistant Examiner* — Hai-Chang Hsiung
(74) *Attorney, Agent, or Firm* — Fish & Richardson P.C.

(57) ABSTRACT

A user equipment implements a method of processing indication messages, such as SCRI (signaling connection release indication) messages. For at least one RRC (radio resource control) state, if the current RRC state of the UE is a result of a previously sent indication, the UE inhibits itself from sending a further indication message.

18 Claims, 35 Drawing Sheets

(56) References Cited

U.S. PATENT DOCUMENTS

| | | |
|---|---|---|
| 6,345,185 B1 | 2/2002 | Yoon et al. |
| 6,377,790 B1 | 4/2002 | Ishii |
| 6,593,850 B1 | 7/2003 | Addy |
| 6,654,360 B1 | 11/2003 | Abrol |
| 6,657,984 B1 | 12/2003 | Semper |
| 6,661,777 B1 | 12/2003 | Blanc et al. |
| 6,668,175 B1 | 12/2003 | Almgren |
| 6,748,246 B1 | 6/2004 | Khullar |
| 6,845,236 B2 | 1/2005 | Chang |
| 6,847,610 B1 | 1/2005 | Suumaki |
| 6,961,570 B2 | 11/2005 | Kuo et al. |
| 7,130,668 B2 | 10/2006 | Chang et al. |
| 7,155,261 B2 | 12/2006 | Chen |
| 7,164,673 B2 | 1/2007 | Jang |
| 7,280,506 B2 | 10/2007 | Lin et al. |
| 7,313,408 B2 | 12/2007 | Choi |
| 7,353,120 B2 | 4/2008 | Enta |
| 7,437,172 B2 | 10/2008 | Chen et al. |
| 7,480,267 B2 | 1/2009 | Funnell et al. |
| 7,539,160 B2 | 5/2009 | Virtanen et al. |
| 7,609,673 B2 | 10/2009 | Bergenlid et al. |
| 7,623,869 B2 | 11/2009 | Lee et al. |
| 7,720,482 B2 | 5/2010 | Chaudry et al. |
| 7,761,097 B2 | 7/2010 | Chaudry et al. |
| 7,894,375 B2 | 2/2011 | Chaudry et al. |
| 7,949,377 B2 | 5/2011 | Islam et al. |
| 7,969,924 B2 | 6/2011 | Young et al. |
| 8,014,772 B2 | 9/2011 | Beming et al. |
| 8,208,950 B2 | 6/2012 | Islam et al. |
| 8,223,697 B2 | 7/2012 | Dwyer et al. |
| 8,243,683 B2 | 8/2012 | Young et al. |
| 8,265,034 B2 | 9/2012 | Islam et al. |
| 8,270,932 B2 | 9/2012 | Kim et al. |
| 8,305,924 B2 | 11/2012 | Dwyer et al. |
| 8,310,970 B2 | 11/2012 | Dwyer et al. |
| 2001/0018342 A1 | 8/2001 | Vialen et al. |
| 2002/0022455 A1 | 2/2002 | Salokannel et al. |
| 2002/0064140 A1 | 5/2002 | Numminen |
| 2002/0077105 A1 | 6/2002 | Chang |
| 2002/0082020 A1 | 6/2002 | Lee et al. |
| 2002/0141331 A1 | 10/2002 | Mate et al. |
| 2002/0159444 A1 | 10/2002 | Vialen et al. |
| 2003/0003895 A1 | 1/2003 | Wallentin et al. |
| 2003/0014145 A1 | 1/2003 | Reiss et al. |
| 2003/0031159 A1 | 2/2003 | Sayeedi et al. |
| 2003/0156578 A1 | 8/2003 | Bergenlid et al. |
| 2003/0157927 A1 | 8/2003 | Yi et al. |
| 2003/0211846 A1 | 11/2003 | Nagpal et al. |
| 2004/0044771 A1 | 3/2004 | Allred et al. |
| 2004/0062262 A1 | 4/2004 | Venteicher et al. |
| 2004/0120253 A1 | 6/2004 | Forssell et al. |
| 2004/0156338 A1* | 8/2004 | Pasanen et al. .............. 370/331 |
| 2004/0179490 A1 | 9/2004 | Jang |
| 2004/0192312 A1 | 9/2004 | Li et al. |
| 2004/0203778 A1 | 10/2004 | Kuo et al. |
| 2004/0203971 A1 | 10/2004 | Kuo |
| 2004/0216144 A1 | 10/2004 | Mitsui |
| 2004/0224688 A1 | 11/2004 | Fischer |
| 2005/0009527 A1 | 1/2005 | Sharma |
| 2005/0026597 A1 | 2/2005 | Kim et al. |
| 2005/0032555 A1 | 2/2005 | Jami et al. |
| 2005/0068965 A1 | 3/2005 | Lin et al. |
| 2005/0141471 A1 | 6/2005 | Virtanen et al. |
| 2005/0143056 A1 | 6/2005 | Iyer et al. |
| 2005/0153700 A1 | 7/2005 | Farnsworth et al. |
| 2005/0185613 A1 | 8/2005 | Kowalski et al. |
| 2005/0192021 A1 | 9/2005 | Lee et al. |
| 2005/0232176 A1 | 10/2005 | Van Lieshout et al. |
| 2005/0237935 A1 | 10/2005 | Chae et al. |
| 2005/0245267 A1 | 11/2005 | Guethaus |
| 2005/0266846 A1 | 12/2005 | Kim |
| 2005/0272422 A1 | 12/2005 | Asadi |
| 2005/0281269 A1 | 12/2005 | Choi |
| 2005/0286461 A1 | 12/2005 | Zhang et al. |
| 2006/0025122 A1 | 2/2006 | Harris et al. |
| 2006/0036741 A1 | 2/2006 | Kiss et al. |
| 2006/0040645 A1 | 2/2006 | Grilli et al. |
| 2006/0089137 A1 | 4/2006 | Howell |
| 2006/0094478 A1 | 5/2006 | Kim et al. |
| 2006/0109846 A1 | 5/2006 | Lioy et al. |
| 2006/0111110 A1 | 5/2006 | Schwarz et al. |
| 2006/0176167 A1 | 8/2006 | Dohrmann |
| 2006/0182022 A1 | 8/2006 | Abedi |
| 2006/0223537 A1 | 10/2006 | Kojima |
| 2006/0223564 A1 | 10/2006 | Rosen et al. |
| 2006/0240823 A1 | 10/2006 | Jiao et al. |
| 2006/0293067 A1 | 12/2006 | Leung et al. |
| 2007/0072635 A1 | 3/2007 | Zhao et al. |
| 2007/0121540 A1 | 5/2007 | Sharp et al. |
| 2007/0135080 A1 | 6/2007 | Islam et al. |
| 2007/0270140 A1 | 11/2007 | Islam et al. |
| 2008/0039087 A1 | 2/2008 | Gallagher et al. |
| 2008/0049662 A1* | 2/2008 | Islam et al. .............. 370/328 |
| 2008/0123658 A1 | 5/2008 | Hyytia et al. |
| 2008/0126554 A1 | 5/2008 | Sakai et al. |
| 2008/0212542 A1 | 9/2008 | Kung et al. |
| 2008/0253312 A1* | 10/2008 | Park .............. 370/311 |
| 2008/0304510 A1 | 12/2008 | Qlu |
| 2008/0310313 A1 | 12/2008 | Maheshwari et al. |
| 2009/0016278 A1 | 1/2009 | Wakabayashi |
| 2009/0028084 A1 | 1/2009 | Ping |
| 2009/0042560 A1 | 2/2009 | Islam et al. |
| 2009/0088134 A1 | 4/2009 | Ishii et al. |
| 2009/0093262 A1 | 4/2009 | Gao et al. |
| 2009/0124212 A1 | 5/2009 | Islam et al. |
| 2009/0124249 A1 | 5/2009 | Young et al. |
| 2009/0129339 A1 | 5/2009 | Young et al. |
| 2009/0149189 A1 | 6/2009 | Sammour et al. |
| 2009/0161571 A1 | 6/2009 | Terry et al. |
| 2009/0221277 A1 | 9/2009 | Fomin et al. |
| 2009/0225709 A1 | 9/2009 | Wager et al. |
| 2009/0253422 A1 | 10/2009 | Fischer |
| 2009/0318199 A1 | 12/2009 | Barreto et al. |
| 2010/0046533 A1 | 2/2010 | Kuramoto et al. |
| 2010/0061361 A1 | 3/2010 | Wu |
| 2010/0075679 A1 | 3/2010 | Tenny et al. |
| 2010/0107172 A1 | 4/2010 | Calinescu et al. |
| 2010/0118752 A1 | 5/2010 | Suzuki et al. |
| 2010/0142457 A1 | 6/2010 | Chun et al. |
| 2010/0208696 A1 | 8/2010 | Lee et al. |
| 2010/0226325 A1 | 9/2010 | Chun et al. |
| 2010/0265896 A1 | 10/2010 | Park et al. |
| 2010/0323703 A1 | 12/2010 | Pirskanen |
| 2011/0007682 A1 | 1/2011 | Islam et al. |
| 2011/0038347 A1 | 2/2011 | Patil et al. |
| 2011/0122818 A1 | 5/2011 | Dwyer et al. |
| 2011/0124294 A1 | 5/2011 | Dwyer et al. |
| 2011/0159895 A1 | 6/2011 | Arzelier et al. |
| 2011/0182193 A1 | 7/2011 | Dwyer et al. |
| 2011/0207465 A1 | 8/2011 | Dwyer et al. |
| 2011/0249575 A1 | 10/2011 | Dwyer et al. |
| 2011/0267959 A1 | 11/2011 | Yi et al. |
| 2011/0306352 A1 | 12/2011 | Young et al. |
| 2012/0008585 A1 | 1/2012 | Kwon et al. |
| 2012/0014325 A1 | 1/2012 | Dwyer et al. |
| 2012/0014326 A1 | 1/2012 | Dwyer et al. |
| 2012/0033626 A1 | 2/2012 | Dwyer et al. |
| 2012/0051288 A1 | 3/2012 | Dwyer et al. |
| 2012/0051289 A1 | 3/2012 | Dwyer et al. |
| 2012/0281561 A1 | 11/2012 | Shukla et al. |
| 2012/0307703 A1 | 12/2012 | Young et al. |
| 2012/0320811 A1 | 12/2012 | Islam et al. |
| 2013/0021919 A1 | 1/2013 | Islam et al. |
| 2013/0122918 A1 | 5/2013 | Boley et al. |
| 2013/0188543 A1 | 7/2013 | Dwyer et al. |
| 2013/0295905 A1 | 11/2013 | Islam et al. |
| 2013/0308578 A1 | 11/2013 | Dwyer et al. |
| 2013/0316720 A1 | 11/2013 | Dwyer et al. |

(56) References Cited

U.S. PATENT DOCUMENTS

| | | |
|---|---|---|
| 2013/0336258 A1 | 12/2013 | Young et al. |
| 2014/0194131 A1 | 7/2014 | Islam et al. |

FOREIGN PATENT DOCUMENTS

| | | |
|---|---|---|
| CN | 1328756 A | 12/2001 |
| CN | 1934802 | 3/2007 |
| CN | 101005659 A | 7/2007 |
| CN | 101080102 | 11/2007 |
| CN | 101409606 | 4/2009 |
| CN | 101426278 | 5/2009 |
| CN | 101453742 | 6/2009 |
| CN | 103619071 | 3/2014 |
| EP | 0695069 | 1/1996 |
| EP | 1006695 A1 | 6/2000 |
| EP | 1453286 | 1/2004 |
| EP | 1511337 | 3/2005 |
| EP | 1560381 | 8/2005 |
| EP | 1596616 | 11/2005 |
| EP | 1608113 | 12/2005 |
| EP | 1798998 | 6/2007 |
| EP | 1858209 | 11/2007 |
| EP | 2019512 | 12/2007 |
| EP | 1892895 | 2/2008 |
| EP | 1981224 | 10/2008 |
| EP | 2028909 | 2/2009 |
| EP | 2061192 | 5/2009 |
| EP | 2244499 | 10/2010 |
| EP | 2271168 | 1/2011 |
| EP | 2654369 A2 | 10/2013 |
| EP | 2667679 A2 | 11/2013 |
| EP | 2592895 | 7/2014 |
| HK | 1105132 | 12/2011 |
| JP | 09-055764 | 2/1997 |
| JP | 11-313370 | 11/1999 |
| JP | 11-331947 | 11/1999 |
| JP | 2000-174820 | 6/2000 |
| JP | 2000-261372 | 9/2000 |
| JP | 2001-275168 | 10/2001 |
| JP | 2003-037874 | 2/2003 |
| JP | 2004-032391 | 1/2004 |
| JP | 2005-175831 A | 6/2005 |
| JP | 2005-525760 | 8/2005 |
| JP | 2006-510244 | 3/2006 |
| JP | 2006-518125 | 8/2006 |
| JP | 2007-166627 | 6/2007 |
| JP | 2007-312393 | 11/2007 |
| JP | 2008-509627 | 3/2008 |
| JP | 2009-504047 A | 1/2009 |
| JP | 2009-508372 | 2/2009 |
| JP | 2009-534980 | 9/2009 |
| JP | 2011-504020 A | 1/2011 |
| JP | 2012-257314 | 12/2012 |
| KR | 10-1116549 | 2/2012 |
| TW | 476205 | 2/2002 |
| WO | WO00/62435 | 10/2000 |
| WO | WO00/62449 | 10/2000 |
| WO | WO01/52574 | 7/2001 |
| WO | WO02/33853 | 4/2002 |
| WO | 03/105519 | 12/2003 |
| WO | WO2004/032391 | 4/2004 |
| WO | WO2004/056142 | 7/2004 |
| WO | WO2004/079542 | 9/2004 |
| WO | WO2005/029813 | 3/2005 |
| WO | WO2005/050917 | 6/2005 |
| WO | WO2005/064962 | 7/2005 |
| WO | WO2005/120104 | 12/2005 |
| WO | WO2006/009714 A1 | 1/2006 |
| WO | WO2006/016784 | 2/2006 |
| WO | WO2006/029054 | 3/2006 |
| WO | WO2007/023366 | 3/2007 |
| WO | WO2007/023812 | 3/2007 |
| WO | WO2007/025138 | 3/2007 |
| WO | 2007/052753 | 5/2007 |
| WO | WO2007/052098 | 5/2007 |
| WO | WO2007/073118 | 6/2007 |
| WO | WO2007/097670 | 8/2007 |
| WO | WO2007/123351 | 11/2007 |
| WO | WO2007/125462 | 11/2007 |
| WO | WO2008/076991 A2 | 6/2008 |
| WO | WO2008/108143 | 9/2008 |
| WO | 2009/062303 | 5/2009 |
| WO | WO2009/062302 | 5/2009 |
| WO | WO2009/104086 | 8/2009 |
| WO | WO2010/006204 | 1/2010 |

OTHER PUBLICATIONS

3GPP TS 25.331 v 8.7.0 R.8. Jul. 2009. Universal Mobile Telecommunications System (UMTS); Radio Resource Control (RRC); Protocol specification. p. 1424.
3GPP TS25.331 V8.8.0, Sep. 2009.
3GPP TSG SA WG 3 (Security) Meeting #11, S3-000131, Mainz, Germany, Feb. 22-24, 2000 (11 pages).
Ericsson et al.; "Clarification on the UE State after Fast Dormancy Request"; 3GPP; R2-096625; Jeju, Korea; Nov. 2009.
Nokia Siemens Network et al.; "Clarification on Enhanced SCRI Approach for Fast Dormancy"; 3GPP TSG-RAN2 Meeting #68; R2-096818; Jeju, Korea; Nov. 9-13, 2009; 16 pages.
Talukdar et al., IEEE Xplore Digital Library, "Radio Resource Control Protocol Configuration for Optimum Web Browsing", published in Vehicular Technology Conference, 2002. Proceedings VTC 2002—Fall, IEEE 56th, vol. 3 (3 Pgs).
United States Office Action in U.S. Appl. No. 13/673,398, dated Apr. 8, 2014, 10 pages.
United States Office Action in U.S. Appl. No. 11/467,309, dated May 13, 2014, 19 pages.
United States Office Action in U.S. Appl. No. 12/616,024, dated May 8, 2014, 26 pages.
United States Office Action in U.S. Appl. No. 12/649,461, dated Apr. 28, 2014, 27 pages.
United States Office Action in U.S. Appl. No. 12/897,945, dated Jun. 18, 2014, 33 pages.
United States Office Action in U.S. Appl. No. 12/897,959, dated Jun. 18, 2014, 26 pages.
United States Office Action in U.S. Appl. No. 12/953,049, dated Jun. 18, 2014, 18 pages.
United States Office Action in U.S. Appl. No. 12/953,223, dated Jul. 22, 2014, 12 pages.
United States Office Action in U.S. Appl. No. 13/244,761, dated Jun. 19, 2014, 17 pages.
United States Office Action in U.S. Appl. No. 13/244,849, dated Apr. 25, 2014, 32 pages.
United States Office Action in U.S. Appl. No. 13/244,849, dated Jan. 14, 2015, 10 pages.
United States Office Action in U.S. Appl. No. 13/532,353, dated Jun. 9, 2014, 5 pages.
United States Office Action in U.S. Appl. No. 13/587,073, dated Jul. 14, 2014, 4 pages.
United States Office Action in U.S. Appl. No. 13/921,728, dated Jun. 9, 2014, 5 pages.
Australian Second Examination Report in Australian Application No. 2010321205, dated Jul. 9, 2014, 3 pages.
Australian Office Action in Australian Application No. 2013248261, dated Jan. 22, 2015, 2 pages.
Australian Office Action in Australian Application No. 2014203095, dated Mar. 19, 2015, 3 pages.
Canadian Office Action in Canadian Application No. 2,781,497, dated May 21, 2014, 4 pages.
Canadian Office Action dated May 20, 2014, issued in Canadian Application No. 2,781,558, (2 pages).
Canadian Office Action dated May 13, 2014, issued in Canadian Application No. 2,781,630, (3 pages).
"Canadian Office Action dated May 8, 2014, issued in Canadian Application No. 2,781,509, (2 pages)."
"Canadian Office Action dated May 8, 2014, issued in Canadian Application No. 2, 785,826, (2 pages)."

(56) References Cited

OTHER PUBLICATIONS

"Canadian Office Action dated May 9, 2014, issued in Canadian Application No. 2,781,562, (3 pages)."
Canadian Office Action in Canadian Application No. 2,743,128, dated Aug. 21, 2014, 3 pages.
"Chinese First Office Action dated Jul. 2, 2014, issued in Chinese Application No. 201080062345.X, (5 pages)."
"Chinese First Office Action dated Jul. 25, 2014, issued in Chinese Application No. 201080062006.1, (6 pages)."
"Chinese First Office Action dated Jul. 15, 2014, issued in Chinese Application No. 201080062010.8, (8 pages)."
"Chinese First Office Action dated Jul. 25, 2014, issued in Chinese Application No. 201080062001.9, (3 pages)."
Chinese First Office Action dated Jun. 5, 2014, issued in Chinese Application No. 201210213644.X, 5 pages.
Chinese Third Office Action dated Dec. 25, 2013, issued in Chinese Application No. 200880124414.8, (7 pages).
Chinese First Office Action dated Aug. 15, 2014, issued in Chinese Application No. 201080062007.6, (7 pages).
European Communication Pursuant to Article 94(3) EPC in European Application No. 13152938.0, dated Jan. 13, 2015, 4 pages.
"European Communication—Invitation Pursuant to Article 94(3) and Rule 71 (1) EPC dated Apr. 14, 2014,issued in European Application No. 08849315.0, (4 pages)."
"European Examination Report dated Apr. 30, 2014, issued in European Application No. 08849731.8, (5 pagess)."
Partial European Search Report dated Jun. 13, 2014, issued in European Application No. 13177318.6, (5 pages).
"Extended European Search Report dated Jul. 16, 2014, issued in European Application No. 13181054.1, (8 pages)."
European Examination Report dated Sep. 7, 2009, issued in European Application No. 07121138.7 (1 page).
EP Application No. 08154976.8, Communication pursuant to Article 94(3) EPC, dated Oct. 8, 2009, 4 pages.
Extended European Search Report for EP Application No. 10184515, dated Nov. 19, 2010, (7 pages).
Japanese Office Action dated Apr. 2, 2014, issued in Japanese Application No. 2012-539362, (13 pages).
Japanese Office Action for JP Application No. 2006-335943, dated Jun. 19, 2009, 10 pages.
Japanese Office Action for Japanese Patent Application No. 2010-533396, dated May 29, 2012 (5 pages).
Japanese Office Action in Japanese Patent Application No. 2010-533397, dated Apr. 23, 2012, 8 pages.
"3rd Generation Partnership Project 2; Data Service Options for Spread Spectrum Systems," 3GPP2 C.S0017-0, Version 5.0, Feb. 17, 2003 (70 pgs.).
"3rd Generation Partnership Project 2; Data Service Options for Spread Spectrum Systems: Introduction and Service Guide," 3GPP2 C.S0017-001-A, Version 1.0, Jun. 11, 2004 (22 pgs.).
"3rd Generation Partnership Project 2; Data Service Options for Spread Spectrum Systems: Radio Link Protocol Type 3," 3GPP2 C.S0017-010-A, Version 2.0, Sep. 2005 (56 pgs.).
"3rd Generation Partnership Project 2; Data Service Options for Spread Spectrum Systems: Service Options 33 and 66," 3GPP2 C.S0017-012-A, Version 2.0, May, 2006 (70 pgs.).
"3rd Generation Partnership Project 2; Upper Layer (Layer 3) Signaling Standard for cdma2000 Spread Spectrum Systems Release D," 3GPP2 C.S0005-D, Version 1.0, Feb. 2004 (2247 pgs.).
"3rd Generation Partnership Project; Technical Specification Group Radio Access Network; Evolved Universal Terrestrial Radio Access (E-UTRA) and Evolved Universal Terrestrial Radio Access Network (E-URTRA); Overall description; Stage 2 (Release 8)," 3GPPTS 36.300 V8.9.0 (Jun. 2009) (159 pages).
"3rd Generation Partnership Project; Technical Specification Group Radio Access Network; Evolved Universal Terrestrial Radio Access (E-UTRA) Medium Access Control (MAC) protocol specification (Release 8)" 3GPP TS 36.321 V8.7.0 (Sep. 2009) (47 pgs.).
"3rd Generation Partnership Project; Technical Specification Group Radio Access Network; Evolved Universal Terrestrial Radio Access (E-UTRA) Radio Resource Control (RRC); Protocol specification (Release 8)" 3GPP TS 36.331 V8.6.0 (Jun. 2009) (207 pgs.).
"3rd Generation Partnership Project; Technical Specification Group Radio Access Network; Evolved Universal Terrestrial Radio Access (E-UTRA); User Equipment (UE) procedures in idle mode (Release 8)" 3GPP TS 36.304 V8.6.0 (Jun. 2009) (30 pgs.).
"3rd Generation Partnership Project; Technical Specification Group Radio Access Network; Radio Resource Control (RRC); Protocol Specification (Release 8)"; 3GPP TS 25.331 V8.8.0 (Sep. 2009) (1697 pages).
"3rd Generation Partnership Project; Technical Specification Group Radio Access Network; User Equipment (UE) procedures in idle mode and procedures for cell reselection in connected mode (Release 7)," 3GPP TS 25.304 V7.1.0 (Jun. 2006) (38 pgs.).
"3rd Generation Partnership Project; Technical Specification Group Services and System Aspects; General Packet Radio Service (GPRS) enhancements for Evolved Universal Terrestrial Radio Access Network (E-UTRAN) access (Release 8)," 3GPP TS 23.401 V8.0.0 (Dec. 2007) (167 pages).
"3rd Generation Partnership Project; Technical Specification Group Services and System Aspects; General Packet Radio Service (GPRS) enhancements for Evolved Universal Terrestrial Radio Access Network (E-UTRAN) access (Release 8)," 3GPP TS 23.401 V8.7.0 (Sep. 2009) (234 pages).
"3rd Generation Partnership Project; Technical Specification Group Services and System Aspects; Policy and charging control architecture (Release 8)" 3GPP TS 23.203 V8.1.1 (Mar. 2008) (87 pgs.).
"3rd Generation Partnership Project; Technical Specification Group Services and System Aspects; Policy and charging control architecture (Release 8)" 3GPP TS 23.203 V8.7.0 (Sep. 2009) (114 pgs.).
"3rd Generation Partnership Project2; Upper Layer (Layer 3) Signaling Standard for cdma2000 Spread Spectrum Systems Release D," 3GPP2 C.S0005-D, Version 2.0, Sep. 6, 2005 (2367 pgs.).
"Digital Cellular Telecommunications System (Phase 2+)"; ETSI Standards European Telecommunications Standards Institute, Sophia-Antipo, FR, vol. 3-SA2, No. V6110, Dec. 2005, XP014032437 (17 pgs.).
3GPP 25.331 Radio Resource Control (RRC); Protocol Specification, V5.18.0 (Sep. 2006), pp. 12-13.
3GPP Organizational Partners, 3GPP TS 25.331 v8.7.0, Sections 6.3.8.1.14.2, 8.3.1.2, 13.2, http://www.3gpp.org/ftp/Specs/archive/25_series/25.331/25331-870.zip (4 pages).
3GPP Technical Specification Group Radio Access Network; Radio Resource Control (RRC); Protocol Specification (Release 9); 3GPP TS 25.331 v9.0.0 (Sep. 2009) Section 8.1.14 (pp. 142-144) and Sections 13.1 and 13.2 (pp. 1437-1439).
3GPP TS 25.331 Universal Mobile Telecommunications System (UMTS); Radio Resource Control (RRC); Protocol Specification, V8.8.0 (Release 8) (Oct. 2009) Section 8.1.14 (pp. 141-143) and Sections 13.1 and 13.2 (pp. 1430-1432).
3GPP TS 25.331 V5.16.0 (Mar. 2006) (1045 pgs.).
3GPP TSG RAN WG#2 Meeting #67, R2-094437, Shenzhen, People's Republic of China, Aug. 24-28, 2009 (57 pages).
3GPP TSG RAN WG2 #63bis; R2-085921; Prague, Czech Republic; Sep. 29-Oct. 3, 2008 (38 pgs).
3GPP TSG-RAN WG2 Meeting #60, R2-074848, Vodafone, Rim, Huawei, Title: UE "Fast Dormancy" Behaviour, Nov. 5-9, 2007, Jeju, South Korea, (9 pages).
3GPP TSG-RAN WG2 Meeting #60, R2-075251, Jeju, South Korea, Nov. 5-9, 2007 (13 pages).
3GPP TSG-RAN WG2 Meeting #62bis, R2-083626, Warsaw, Poland, Jun. 30-Jul. 4, 2008 (11 pages).
3GPP TSG-RAN WG2 Meeting #63, R2-084647, Jeju, South Korea, Aug. 18-22, 2008 (14 pages).
3GPP TSG-RAN WG2 Meeting #63bis, R2-085584, Prague, Czech Republic, Sep. 29-Oct. 3, 2008 (5 pgs).
3GPP TSG-RAN WG2 Meeting #68, R2-097173, Jeju, South Korea, Nov. 9-13, 2009 (5 pages).
3GPP TSG-RAN WG2 Meeting #68, R2-097174, Jeju, South Korea, Nov. 9-13, 2009 (8 pages).
3GPP TSG-RAN WG2 Meeting #69, R2-101710, San Francisco, California, Feb. 22-26, 2010 (6 pages).

(56) References Cited

OTHER PUBLICATIONS

3GPP TSG-RAN WG2 Meeting #69, R2-101726, San Francisco, California, Feb. 22-26, 2010 (6 pages).
3GPP TSG-RAN WG2#67bis; R2-096027; Miyazaki, Japan, Oct. 12-16, 2009 (4 pages).
3GPP TSG-RAN WG2#68, R2-096624, Jeju, South Korea, Nov. 9-13, 2009 (8 pages).
3GPP TSG-RAN2 Meeting #63bis, R2-085134, Prague, Czech, Sep. 29-Oct. 3, 2008 (13 pgs).
3GPP TSG-RAN2 Meeting #64 R2-086557, Prague, Czech, Nov. 10-14, 2008 (13 pages).
3GPP TSG-RAN2 Meeting #67; R2-094792; Shenzhen, China, Aug. 24-28, 2009 (10 pages).
3GPP TSG-RAN2 Meeting #69, R2-101440, San Francisco, CA, Feb. 22-26, 2010 (18 pages).
3GPP TSG-RAN2 Meeting #69, R2-101441, San Francisco, CA, Feb. 22-26, 2010 (20 pages).
3GPP: "Radio resource control (RRC) protocol specification V7.0. 0," 3GPP TS25.331 V7.0.0, (Mar. 2006), (1,249 pgs.).
3GPP: Radio Resource Control Protocol Specification for UE-UTRAN radio interface, 3GPP TS 25.331 V6.8.0 (Dec. 2005) (1,174 pgs.).
3rd Generation Partnership Project 2 "3GPP2", "Data Service Options for Spread Spectrum Systems: Service Options 33 and 66," 3GPP2 C.S0017-012-A, Version 1.0, Jun. 11, 2004 (70 pgs.).
3rd Generation Partnership Project 2 "3GPP2", Upper Layer (Layer 3) Signaling Standard for cdma2000 Spread Spectrum Systems, Release 0, 3GPP2 C.S0005-0, Version 3.0, Jun. 15, 2000 (1168 pgs.).
Australian First Examination Report dated Apr. 9, 2008, issued in Australian Appplication No. 2006252042 (this reference relates to U.S. Appl. No. 11/302,263) (2 pgs.).
Australian First Examination Report dated Feb. 13, 2013, issued in Australian Application No. 2009313191 (3 pages).
Australian First Examination Report dated Feb. 3, 2012, issued in Australian Application No. 2010202720 (16 pages).
Australian First Examination Report dated Sep. 2, 2008, issued in Australian Application No. 2007202206 (this reference relates to U.S. Appl. No. 11/464,380) (7 pgs.).
Australian Second Examination Report dated Sep. 30, 2009, issued in Australian Application No. 2007202206 (this reference relates to U.S. Appl. No. 11/464,380) (1 pg.).
Canadian Office Action dated Apr. 30, 2012, issued in Canadian Patent Application No. 2,571,101 (4 pages).
Canadian Office Action dated Feb. 22, 2011, issued in Canadian Application 2,589,373 (5 pages).
Canadian Office Action dated Jul. 20, 2012, issued in Canadian Patent Application No. 2,705,477 (4 pages).
Canadian Office Action dated Jun. 18, 2012, issued in Canadian Patent Application No. 2,661,592 (5 pages).
Canadian Office Action dated Jun. 21, 2012, issued in Canadian Application No. 2,705,476 (3 pages).
Canadian Office Action dated Jun. 21, 2012, issued in Canadian Patent Application No. 2,705,478 (4 pages).
Canadian Office Action dated Mar. 16, 2010, issued in Canadian Patent Application No. 2,571,101 (5 pages).
Canadian Office Action dated May 31, 2012, issued in Canadian Patent Application No. 2,589,373 (3 pages).
Canadian Office Action dated Nov. 14, 2011, issued in Canadian Application No. 2,661,592 (3 pages).
Chinese First Office Action dated Apr. 25, 2011, issued in Chinese Application No. 200710137906.8 (13 pages).
Chinese First Office Action dated Aug. 2, 2012, issued in Chinese Application No. 200880124457.6 (26 pages).
Chinese First Office Action dated Aug. 3, 2012, issued in Chinese Application No. 200880124414.8 (10 pages).
Chinese First Office Action dated Feb. 6, 2009, issued in Chinese Application No. 200610064329.X (18 pages).
Chinese First Office Action dated Oct. 31, 2012, issued in Chinese Application No. 200880124114.X (10 pages).
Chinese Fourth Office Action dated Mar. 18, 2013, issued in Chinese Application No. 200710137906.8 (7 pages).
Chinese Notification of Grant of Rights for Invention Patent dated Apr. 9, 2012, issued in Chinese Patent Application No. 200610064329.X (2 pages).
Chinese Second Office Action dated Feb. 2, 2012, issued in Chinese Application No. 200710137906.8 (7 pages).
Chinese Second Office Action dated Feb. 24, 2010, issued in Chinese Application No. 200610064329.X (including translation) (this reference relates to U.S. Appl. No. 11/302,263) (18 pgs.).
Chinese Second Office Action dated Jan. 30, 2013, issued in Chinese Application No. 200880124457.6 (25 pages).
Chinese Third Office Action dated Aug. 27, 2012, issued in Chinese Application No. 200710137906.8 (12 pages).
Chinese Third Office Action dated Oct. 8, 2011, issued in Chinese Application No. 200610064329.X (7 pages).
European Communication dated Jul. 18, 2012, issued in European Application No. 10771051.9 (2 pages).
European Communication dated Jul. 19, 2012, issued in European Application No. 10768896.2 (2 pages).
European Communication dated Jul. 19, 2012, issued in European Application No. 10798525.1 (2 pages).
European Communication dated Jul. 25, 2012, issued in European Application No. 10790529.1 (2 pages).
European Examination Report dated Apr. 19, 2012, issued in European Application No. 08849315.0 (5 pages).
European Examination Report dated Apr. 19, 2012, issued in European Application No. 08849731.8 (5 pages).
European Examination Report dated Aug. 10, 2009, issued in European Application No. 08154976.8 (4 pages).
European Examination Report dated Aug. 8, 2011, issued in European Application No. 07121138.7 (5 pages).
European Examination Report dated Aug. 8, 2011, issued in European Application No. 10184515.4 (7 pages).
European Examination Report dated Dec. 15, 2011, issued in European Application No. 10 184 515.4 (7 pages).
European Examination Report dated Dec. 28, 2011, issued in European Application No. 08154976.8 (3 pages).
European Examination Report dated Feb. 14, 2013, issued in European Application No. 08849315.0 (6 pages).
European Examination Report dated Feb. 21, 2013, issued in European Application No. 08849731.8 (5 pages).
European Examination Report dated Jan. 24, 2008, issued in European Application No. 05112183.8 (2 pages).
European Examination Report dated Jul. 30, 2009, issued in European Application No. 06118909.8 (this reference relates to U.S. Appl. No. 11/464,380) (3 pgs).
European Examination Report dated Jun. 25, 2008, issued in European Application No. 06118909.8 (this reference relates to U.S. Appl. No. 11/464,380) (3 pgs.).
European Examination Report dated May 22, 2012, issued in European Application No. 10184515.4 (9 pages).
European Examination Report dated Nov. 12, 2007, issued in European Application No. 06118909.8 (this reference relates to U.S. Appl. No. 11/464,380) (4 pgs.).
European Examination Report dated Nov. 15, 2011, issued in European Application No. 11160318.9 (4 pages).
European Examination Report dated Oct. 25, 2007, issued in European Application No. 06119590.5 (7 pages).
European Examination Report dated Sep. 7, 2009, issued in European Application No. 05112183.8 (3 pages).
European Examinaton Report dated Oct. 19, 2010, issued in European Application No. 07121138.7 (8 pages).
European Intent to Grant dated Apr. 13, 2012, issued in European Application No. 10183886.0 (5 pages).
European Intent to Grant dated Dec. 17, 2010, issued in European Application No. 05112183.8 (41 pages).
European Intent to Grant dated Jan. 26, 2012, issued in European Application No. 07121138.7 (66 pages).
European Intent to Grant dated Oct. 20, 2011, issued in European Application No. 10170815.4 (1 page).
European Summons to Attend Oral Proceedings dated Jan. 28, 2011, issued in European Application No. 08154976.8 (10 pages).

(56) References Cited

OTHER PUBLICATIONS

Extended European Search Report dated Apr. 12, 2013, issued in European Application No. 13152938.0 (10 pages).
Extended European Search Report dated Apr. 12, 2013, issued in European Application No. 13152942.2 (10 pages).
Extended European Search Report dated Apr. 16, 2013, issued in European Application No. 13159334.5 (10 pages).
Extended European Search Report dated Jan. 18, 2011, issued in European Application No. 08849315.0 (8 pages).
Extended European Search Report dated Jan. 18, 2011, issued in European Application No. 08849731.8 (7 pages).
Extended European Search Report dated Jun. 21, 2011, issued in European Application No. 10174218.7 (7 pages).
Extended European Search Report dated Jun. 24, 2011, issued in European Application No. 11160318.9 (5 pages).
Extended European Search Report dated Mar. 20, 2007, issued in European Application No. 06119590.5 (11 pages).
Extended European Search Report dated May 16, 2008, issued in European Application No. 07121138.7 (this reference relates to U.S. Appl. No. 11/454,380) (10 pages).
Extended European Search Report dated May 20, 2010, issued in European Application No. 09180936.8 (9 pages).
Extended European Search Report dated May 3, 2007, issued in European Application No. 05112183.8 (7 pages).
Extended European Search Report dated Nov. 15, 2010, issued in European Application No. 10183886.0 (3 pages).
Extended European Search Report dated Nov. 19, 2010, issued in European Application No. 10184515.4 (this refrence relates to U.S. Appl. No. 11/454,380) (7 pages).
Extended European Search Report dated Nov. 2, 2010, issued in European Application No. 10170815.4 (5 pages).
Extended European Search Report dated Nov. 22, 2012, issued in European Application No. 11177172.1 (6 pages).
Extended European Search Report dated Nov. 24, 2006, issued in European Application No. 06118909.8 (this reference relates to U.S. Appl. No. 11/464,380) (8 pages).
Extended European Search Report dated Nov. 29, 2012, issued in European Application No. 11177171.3 (7 pages).
Extended European Search Report dated Sep. 3, 2008, issued in European Application 08154976.8 (7 pages).
Final Office Action dated Aug. 15, 2013, issued in U.S. Appl. No. 13/244,761, (21 pages).
Final Office Action dated Apr. 20, 2011, issued in U.S. Appl. No. 12/195,018 (33 pages).
Final Office Action dated Dec. 22, 2010, issued in U.S. Appl. No. 11/464,380 (21 pages).
Final Office Action dated Dec. 24, 2012, issued in U.S. Appl. No. 12/616,024 (56 pages).
Final Office Action dated Feb. 10, 2012, issued in U.S. Appl. No. 12/195,018 (14 pages).
Final Office Action dated Feb. 15, 2012, issued in U.S. Appl. No. 12/844,302 (9 pages).
Final Office Action dated Feb. 26, 2013, issued in U.S. Appl. No. 12/897,945 (13 pages).
Final Office Action dated Feb. 27, 2013, issued in U.S. Appl. No. 12/953,144 (8 pages).
Final Office Action dated Jan. 21, 2010, issued in U.S. Appl. No. 11/467,309 (25 pages).
Final Office Action dated Jul. 12, 2012, issued in U.S. Appl. No. 13/244,761 (26 pages).
Final Office Action dated Jul. 20, 2010, issued in U.S. Appl. No. 11/467,309 (30 pages).
Final Office Action dated Jun. 26, 2013, issued in U.S. Appl. No. 13/532,353 (15 pages).
Final Office Action dated Mar. 22, 2012, issued in U.S. Appl. No. 13/244,849 (18 pages).
Final Office Action dated Mar. 25, 2013, issued in U.S. Appl. No. 12/897,959 (22 pages).
Final Office Action dated May 23, 2013, issued in U.S. Appl. No. 11/464,380 (22 pages).
Final Office Action dated Nov. 10, 2011, issued in U.S. Appl. No. 12/107,514 (13 pages).
Final Office Action dated Nov. 14, 2011, issued in U.S. Appl. No. 11/467,309 (29 pages).
Final Office Action dated Nov. 23, 2011, issued in U.S. Appl. No. 12/844,302 (16 pages).
Final Office Action dated Oct. 11, 2012, issued in U.S. Appl. No. 12/649,461 (19 pages).
Final Office Action dated Sep. 13, 2012, issued in U.S. Appl. No. 12/953,049 (18 pages).
Indian Office Action dated Apr. 7, 2011, issued in Indian Application No. 2672/DEL/2006 (2 pages).
Japanese Office Action dated Apr. 26, 2012, issued in Japanese Application No. 2010-533397 (8 pages).
Japanese Office Action dated Dec. 3, 2009, issued in Japanese Application No. 2006-335943 (this reference relates to U.S. Appl. No. 11/302,263) (6 pgs.).
Japanese Office Action dated Jun. 20, 2012, issued in Japanese Application No. 2010-533398 (9 pages).
Japanese Office Action dated Jun. 23, 2009, issued in Japanese Application No. 2006-335943 (this reference relates to U.S. Appl. No. 11/302,263) (10 pgs.).
Japanese Office Action dated Jun. 4, 2012, issued in Japanese Application No. 2011-083176 (7 pages).
Japanese Office Action dated May 31, 2012, issued in Japanese Application No. 2010-533396 (5 pages).
Japanese Office Action dated Nov. 12, 2012, issued in Japanese Application No. 2011-535770 (7 pages).
Japanese Office Action dated Oct. 29, 2012, issued in Japanese Application No. 2010-085595 (6 pages).
Japanese Office Action dated Sep. 30, 2010, issued in Japanese Application No. 2007-131146 (7 pages).
KIPO Notice of Decision for Patent Application No. 10-2010-7012925 dated Nov. 30, 2011 with translation (4 pages).
Korean Application No. 10-2008-0092802, filed on Oct. 16, 2008, including English equivalent EP 1981224 (31 total pages).
Korean Notice of Decision for Patent, for Korean Patent Application No. 10-2010-7012701, dated Mar. 8, 2012 (3 pages).
Korean Notice of Decision for Patent, for Korean Patent Application No. 10-2010-7012778, dated Mar. 26, 2012 (7 pages).
Korean Notice Requesting Submission of Opinion dated Aug. 28, 2008, issued in Korean Application No. 10-2006-0128027 (this reference relates to U.S. Appl. 11/302,263) (6 pgs).
Korean Notice Requesting Submission of Opinion dated Nov. 26, 2007, issued in Korean Application No. 10-2006-0128027 (this reference relates to U.S. Application 11/302,263) (8 pgs).
Korean Office Action dated Aug. 13, 2012, issued in Korean Application No. 10-2011-7012708 (6 pages).
Korean Office Action dated Feb. 26, 2013, issued in Korean Application No. 10-2011-7012708 (9 pages).
Korean Office Action dated Jan. 17, 2013, issued in Korean Application No. 10-2012-7026886 (8 pages).
Korean Office Action dated Jul. 11, 2011, issued in Korean Application No. 10-2010-7012701 (11 pages, including translation).
Korean Office Action dated Jul. 11, 2011, issued in Korean Application No. 10-2010-7012925 (6 pages, including translation).
Mexican Office Action dated Feb. 13, 2012, issued in Mexican Application No. MX/a/2010/005255 (9 pages).
Mexican Office Action dated Jan. 11, 2013, issued in Mexican Application No. MX/a/2010/005249 (4 pages).
Mexican Office Action dated Jan. 11, 2013, issued in Mexican Application No. MX/a/2010/005251 (4 pages).
Mexican Office Action dated Jul. 13, 2012, issued in Mexican Application No. MX/a/2011/004888 (7 pages).
Notice of Allowance dated Apr. 5, 2012, issued in U.S. Appl. No. 12/270,562 (27 pages).
Notice of Allowance dated Feb. 28, 2011, issued in U.S. Appl. No. 11/302,263 (15 pages).
Notice of Allowance dated Jun. 25, 2012, issued U.S. Appl. No. 13/244,749 (13 pages).
Notice of Allowance dated Jun. 28, 2012, issued in U.S. Appl. No. 13/244,765 (8 pages).

(56) References Cited

OTHER PUBLICATIONS

Notice of Allowance dated Mar. 10, 2011, issued in U.S. Appl. No. 12/270,522 (34 pages).
Notice of Allowance dated May 2, 2012, issued in U.S. Appl. No. 12/195,018 (4 pages).
Notice of Allowance dated Nov. 28, 2011, issued in U.S. Appl. No. 13/244,792 (19 pages).
Office Action dated Apr. 14, 2011, issued in U.S. Appl. No. 12/107,514 (38 pages).
Office Action dated Apr. 17, 2012, issued in U.S. Appl. No. 13/244,765 (12 pages).
Office Action dated Apr. 19, 2013, issued in U.S. Appl. No. 13/157,724 (44 pages).
Office Action dated Apr. 7, 2011, issued in U.S. Appl. No. 12/270,562 (19 pages).
Office Action dated Dec. 15, 2011, issued in U.S. Appl. No. 13/244,761 (35 pages).
Office Action dated Dec. 15, 2011, issued in U.S. Appl. No. 13/244,849 (26 pages).
Office Action dated Dec. 21, 2011, issued in U.S. Appl. No. 13/244,749 (29 pages).
Office Action dated Dec. 22, 2011, issued in U.S. Appl. No. 12/953,049 (19 pages).
Office Action dated Feb. 15, 2012, issued in U.S. Appl. No. 13/244,765 (22 pages).
Office Action dated Feb. 7, 2013, issued in U.S. Appl. No. 12/953,049 (8 pages).
Office Action dated Jan. 16, 2013, issued in U.S. Appl. No. 13/532,353 (23 pages).
Office Action dated Jan. 22, 2013, issued in U.S. Appl. No. 13/244,761 (10 pages).
Office Action dated Jan. 5, 2011, issued in U.S. Appl. No. 12/195,018 (14 pages).
Office Action dated Jan. 7, 2013, issued in U.S. Appl. No. 11/464,380 (12 pages).
Office Action dated Jul. 20, 2012, issued in U.S. Appl. No. 11/464,380 (15 pages).
Office Action dated Jul. 31, 2012, issued in U.S. Appl. No. 12/953,144 (30 pages).
Office Action dated Jun. 12, 2009, issued in U.S. Appl. No. 11/467,309 (21 pages).
Office Action dated Jun. 26, 2013, issued in U.S. Appl. No. 12/844,302 (19 pages).
Office Action dated Jun. 3, 2011, issued in U.S. Appl. No. 11/467,309 (22 pages).
Office Action dated Mar. 10, 2011, issued in U.S. Appl. No. 12/270,562 (36 pages).
Office Action dated Mar. 25, 2011, issued in U.S. Appl. No. 12/844,302 (27 pages).
Office Action dated Nov. 18, 2010, issued in U.S. Appl. No. 12/270,562 (19 pages).
Office Action dated Nov. 20, 2012, issued in U.S. Appl. No. 12/897,959 (42 pages).
Office Action dated Oct. 18, 2012, issued in U.S. Appl. No. 12/897,945 (34 pages).
Office Action dated Oct. 6, 2011, issued in U.S. Appl. No. 12/195,018 (21 pages).
PCT Communication dated Feb. 17, 2010, issued in International Application No. PCT/US2009/063912 (9 pages).
PCT International Preliminary Report on Patentability dated Dec. 18, 2008, issued in International Application PCT/CA2007/001497 (9 pages).
PCT International Search Report and Written Opinion dated Apr. 12, 2011, issued in International Application No. PCT/CA2010/002031 (8 pages).
PCT International Search Report and Written Opinion dated Dec. 12, 2007, issued in International Application PCT/CA2007/001497 (12 pages).
PCT International Search Report and Written Opinion dated Feb. 11, 2011, issued in International Application No. PCT/EP2010/068064 (16 pages).
PCT International Search Report and Written Opinion dated Feb. 11, 2011, issued in International Application No. PCT/EP2010/068065 (17 pages).
PCT International Search Report and Written Opinion dated Feb. 13, 2009, issued in International Application No. PCT/CA2008/002000 (10 pages).
PCT International Search Report and Written Opinion dated Feb. 2, 2009, issued in International Application No. PCT/CA2008/002001 (10 pages).
PCT International Search Report and Written Opinion dated Feb. 9, 2011, issued in International Application No. PCT/EP2010/064859 (17 pages).
PCT International Search Report and Written Opinion dated Jan. 15, 2009, issued in International Application No. PCT/CA2008/002002 (10 pages).
PCT International Search Report and Written Opinion dated Jan. 21, 2013, issued in International Application No. PCT/US2012/064499 (11 pages).
PCT International Search Report and Written Opinion dated Jan. 28, 2011, issued in International Application No. PCT/EP2010/064860 (12 pages).
PCT International Search Report and Written Opinion dated Mar. 25, 2011, issued in International Application No. PCT/EP2010/068063 (15 pages).
PCT International Search Report and Written Opinion dated May 3, 2010, issued in International Application PCT/US2009/063912 (22 pages).
PCT Preliminary Report on Patentability dated Mar. 9, 2012, issued in International Application No. PCT/CA2010/002031 (8 pages).
SDO Review Comment Form, SP-3-4617.12-UGR (TIA-707-B.12) C.P0017.12-A (5 pgs.).
Taiwan Office Action dated Aug. 30, 2012, issued in Taiwan Application No. 096131703 (8 pages).
Taiwan Office Action dated Jul. 29, 2011, issued in Taiwan Application No. 095146891 (5 pages).
Taiwan Office Action dated May 20, 2013, issued in Taiwan Application No. 096131703 (19 pages).
U.S. Appl. No. 12/649,461, filed Dec. 30, 2009 (87 pages).
U.S. Appl. No. 12/844,302, filed Jul. 27, 2010 (35 pages).
U.S. Appl. No. 12/897,945, filed Oct. 5, 2010 (144 pages).
U.S. Appl. No. 12/897,959, filed Oct. 5, 2010 (144 pages).
U.S. Appl. No. 12/953,049, filed Nov. 23, 2010 (146 pages).
U.S. Appl. No. 12/953,144, filed Nov. 23, 2010 (178 pages).
U.S. Appl. No. 12/953,223, filed Nov. 23, 2010 (146 pages).
U.S. Appl. No. 13/546,926, filed Jul. 11, 2012 (54 pages).
U.S. Appl. No. 13/673,398, filed Nov. 9, 2012 (42 pages).
U.S. Appl. No. 13/751,369, filed Jan. 28, 2013 (142 pages).
Universal Mobile Telecommunications System (UMTS); Radio Resource Control (RRC); Protocol specification (3GPP TS 25.331 version 10.5.0 Release 10), ETSI TS 125 331 (Nov. 2011), Sections 8.1.14.1 (p. 152), 8.1.14.2 (pp. 152-154), 8.2.2.2 (pp. 166-168), 8.2.2.3 (pp. 168-185), and 8.3.1.7 (pp. 235-239).
Japanese Office Action in Japanese Patent Application No. 2011-083176, dated May 30, 2012, 6 pages.
Korean Final Office Action dated Mar. 31, 2014, issued in Korean Application No. 10-2012-7016424, (3 pages).
Korean Final Office Action dated Mar. 31, 2014, issued in Korean Application No. 10-2012-7016425, (3 pages).
Korean Final Office Action dated Aug. 4, 2014, issued in Korean Application No. 10-2012-7016425, (4 pages).
Korean Office Action dated Apr. 15, 2014, issued in Korean Application No. 10-2012-7016423, (3 pages).
Korean Office Action dated Aug. 6, 2014, issued in Korean Application No. 10-2014-7012197, (4 pages).
Mexican Office Action dated Mar. 24, 2014, issued in Mexican Application No. MX/a/2012/005871, (8 pages).
Mexican Office Action dated Mar. 24, 2014, issued in Mexican Application No. MX/a/2012/005874 (4 pages).
"Mexican Office Action dated May 12, 2014, issued in Mexican Application No. MX/a/2012/005875, (6 pages)."

(56) References Cited

OTHER PUBLICATIONS

"Taiwan Office Action dated Jun. 3, 2014, issued in Taiwanese Application No. 096131703. (9 pages)."
Taiwanese Office Action dated Mar. 7, 2014, issued in Taiwan Application No. 096117599, (7 pages).
Taiwanese Office Action dated Mar. 7, 2014, issued in Taiwan Application No. 100110649, (9 pages).
Indonesian Office Action in Indonesian Application No. W00201202452, dated Dec. 24, 2014, 4 pages, (with English Translation).
International Preliminary Report on Patentability in International Application No. PCT/EP2010/064860, dated Jun. 7, 2012, 9 pages.
International Preliminary Report on Patentability in International Application No. PCT/EP2010/068063, dated Jun. 7, 2012, 10 pages.
International Preliminary Report on Patentability in International Application No. PCT/EP2010/064859, dated Jun. 7, 2012, 11 pages.
PCT Search Report for Application PCT/US2009/063912 dated Feb. 17, 2010 (9 pages).
PCT Written Opinion and Search Report for Application PCT/US2009/063912 dated Apr. 13, 2010 (22 pages).
PCT Written Opinion for PCT Application PCT/US2009/063912 dated May 3, 2010 (22 pages).
Canadian Office Action dated Feb. 27, 2014, issued in Canadian Application No. 2,589,373, (3 pages).
European Examination Report dated Jan. 3, 2014, issued in European Application No. 09752972.1, (8 pages).
Final Office Action dated Feb. 10, 2014, issued in U.S. Appl. No. 13/921,728, (16 pages).
Final Office Action dated Feb. 13, 2014, issued in U.S. Appl. No. 13/532,353, (14 pages).
Indonesian Office Action dated Dec. 23, 2013, issued in Indonesian Application No. W00201202454, (6 pages).
Indonesian Office Action dated Feb. 27, 2014, issued in Indonesian Appl. No. W00201102002, (4 pages).
Indonesian Office Action dated Feb. 27, 2014, issued in Indonesian Appl. No. W00201202452, (4 pages).
Korean Final Office Action dated Feb. 3, 2014, issued in Korean Application No. 10-2012-7016427, (3 pages).
Korean Notice of Allowance dated Feb. 5, 2014, issued in Korean Application No. 10-2011-7021074, (5 pages).
Korean Notice of Allowance dated Feb. 7, 2014, issued in Korean Application No. 10-2011-7021393, (7 pages).
Korean Office Action dated Jan. 24, 2014, issued in Korean Application No. KR-10-2011-7021391, (3 pages).
Office Action dated Feb. 10, 2014, issued in U.S. Appl. No. 12/953,223, (53 pages).
Office Action dated Jan. 2, 2014, issued in U.S. Appl. No. 13/673,398, (33 pages).
Office Action dated Jan. 30, 2014, issued in U.S. Appl. No. 11/467,309, (57 pages).
Office Action dated Mar. 6, 2014, issued in U.S. Appl. No. 12/953,049, (9 pages).
Office Action dated Mar. 6, 2014, issued in U.S. Appl. No. 13/244,761, (8 pages).
3GPP TS 25.331, v6.7.0, Sep. 2005 (9 pages).
3GPP TSG RAN WG2, #46bis, Tdoc R2-051493, Siemens, "Stored Configurations in UTRAN—Principles and Mechanism", Athens, Greece, May 8-13, 2005 (7 pages).
3GPP TSG RAN-WG#2 Meeting #17, Tdoc R2-002255, Sophia Antipolis, France, Nov. 13-17, 2000 (19 pages).
3GPP TSG-RAN WG2 Meeting #11, R2-000660, Turin, Italy, Feb. 28-Mar. 3, 2000 (9 pages).
3GPP TSG-RAN WG2, #59, R2-073707, Motorola, "DRX for NRT and RT services", Athens, Greece, Aug. 20-24, 2007 (1 page).
Australian Examination Report dated Jul. 8, 2013, issued in Australian Application No. 2010320843, (3 pages).
Australian Examination Report dated Nov. 18, 2013, issued in Australian Application No. 2010323195, (4 pages).
Australian Examination Report dated Nov. 18, 2013, issued in Australian Application No. 2012207044, (4 pages).
Australian First Examination Report dated Jul. 30, 2013, issued in Australian Application No. 2010321205, (2 pages).
Australian First Examination Report dated Sep. 26, 2013, issued in Australian Application No. 2010321204, (4 pages).
Canadian Office Action dated Aug. 9, 2013, issued in Canadian Application No. 2,743,128, (3 pages).
Canadian Office Action dated Oct. 11, 2013, issued in Canadian Application No. 2,571,101, (7 pages).
Chinese Fourth Office Action dated Oct. 11, 2013, issued in Chinese Application No. 200880124457.6, (3 pages).
Chinese Second Office Action dated Jun. 5, 2013, issued in Chinese Application No. 200880124414.8, (8 pages).
Chinese Second Office Action dated Nov. 5, 2013, issued in Chinese Application No. 200980144537.2, (10 pages).
Chinese Third Office Action dated Jul. 11, 2013, issued in Chinese Application No. 200880124457.6, (29 pages).
European Examination Report dated Oct. 30, 2013, issued in European Application No. 09180936.8, (7 pages).
Final Office Action dated Aug. 30, 2013, issued in U.S. Appl. No. 12/953,049, (19 pages).
Final Office Action dated Sep. 27, 2013, issued in U.S. Appl. No. 13/157,724, (9 pages).
3GPP TSG-RAN WG2 #63 bis, R2-085726, Prague, CZ, Sep. 29-Oct. 3, 2008 (6 pages).
Indonesian Office Action dated Nov. 15, 2013, issued in Indonesian Application No. W00201202451, (4 pages).
Japanese Office Action dated Aug. 2, 2013, issued in Japanese Application No. 2012-539362, (9 pages).
Japanese Office Action dated Aug. 27, 2013, issued in Japanese Application No. 2010-085595, (9 pages).
Japanese Office Action dated Aug. 7, 2013, issued in Japanese Application No. 2012-539244, (5 pages).
Japanese Office Action dated Aug. 7, 2013, issued in Japanese Application No. 2012-539245, (5 pages).
Japanese Office Action dated Dec. 6, 2013, issued in Japanese Application No. 2013-023208, (4 pages).
Japanese Office Action dated Jul. 25, 2013, issued in Japanese Application No. 2012-539363, (5 pages).
Japanese Office Action dated Nov. 25, 2013, issued in Japanese Application No. 2012-185846, (8 pages).
Japanese Office Action dated Nov. 25, 2013, issued in Japanese Application No. 2012-539363, (8 pages).
Japanese Office Action dated Nov. 26, 2013, issued in Japanese Application No. 2012-241734, (7 pages).
Japanese Office Action dated Nov. 28, 2013, issued in Japanese Application No. 2012-241739, (8 pages).
Japanese Office Action dated Sep. 3, 2013, issued in Japanese Application No. 2012-549266, (7 pages).
Korean Office Action dated Oct. 18, 2013, issued in Korean Application No. 10-2011-7021074, (6 pages).
Korean Office Action dated Oct. 18, 2013, issued in Korean Application No. 10-2011-7021393, (6 pages).
Korean Office Action dated Oct. 25, 2013, issued in Korean Application No. 10-2012-7016424, (9 pages).
Korean Office Action dated Oct. 28, 2013, issued in Korean Application No. 10-2012-7016425, (9 pages).
Korean Office Action dated Oct. 29, 2013, issued in Korean Application No. KR-10-2012-7016426, (8 pages).
Korean Office Action dated Oct. 29, 2013, issued in Korean Application No. KR-10-2012-7016427, (7 pages).
Mexican Notice of Allowance dated Nov. 8, 2013, issued in Mexican Application No. MX/a/2013/003651, (6 pages).
Mexican Notice of Allowance dated Sep. 6, 2013, issued in Mexican Application No. MX/A/2012/009440, (8 pages).
Mexican Third Office Action dated May 30, 2012, issued in Mexican Application No. MX/a/2010/005255, (7 pages).
Notice of Allowance dated Nov. 5, 2013, issued in U.S. Appl. No. 12/844,302, (26 pages).
Notice of Allowance dated Sep. 30, 2013, issued in U.S. Appl. No. 11/464,380, (20 pages).

(56) References Cited

OTHER PUBLICATIONS

Office Action dated Dec. 20, 2013, issued in U.S. Appl. No. 13/584,381, (36 pages).
Office Action dated Oct. 15, 2013, issued in U.S. Appl. No. 13/532,353, (12 pages).
Office Action dated Sep. 17, 2013, issued in U.S. Appl. No. 13/921,728, (25 pages).
Office Action dated Sep. 18, 2013, issued in U.S. Appl. No. 12/616,024, (19 pages).
TSG-RAN Working Group 2 (Radio layer 2 and Radio layer 3), R2-002259, Ericsson, "Handling of "out of service" area", Sophia Antipolis, France, Nov. 13-17, 2000 (3 pages).
3GPP2 R2-002479, "Revised: Use of 'new' BA_RANGE for improved RPLMN selection," Nov. 17, 2000, 12 pages.

* cited by examiner

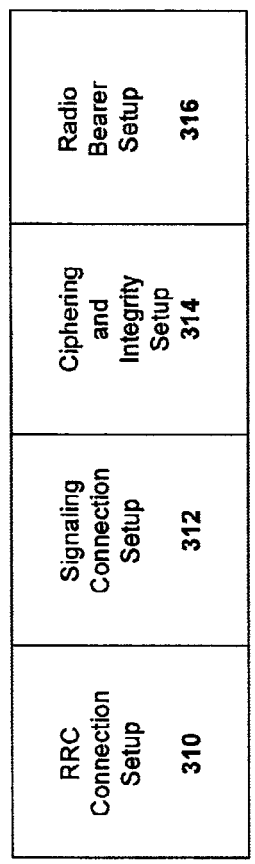

METHOD AND APPARATUS FOR STATE/MODE TRANSITIONING

CROSS-REFERENCE TO RELATED APPLICATIONS

This application is a continuation of U.S. patent application Ser. No. 13/751,369 filed Jan. 28, 2013, and claims the benefit of U.S. patent application Ser. No. 13/751,369, which is a continuation of U.S. patent application Ser. No. 12/897,945 filed Oct. 5, 2010, which claims the benefit of U.S. provisional patent application No. 61/263,823 filed on Nov. 23, 2009, all of which are hereby incorporated by reference in their entirety.

FIELD OF THE DISCLOSURE

The present disclosure relates to radio resource control between User Equipment (UE) or other wireless or mobile device and a wireless network, and in particular to transitioning between states and modes of operation in a wireless network such as for example, a Universal Mobile Telecommunication System (UMTS) network.

BACKGROUND

A Universal Mobile Telecommunication System (UMTS) is a broadband, packet based system for the transmission of text, digitized voice, video and multi-media. It is a highly subscribed to standard for third generation and is generally based on Wideband Coded Division Multiple Access (W-CDMA).

In a UMTS network, a Radio Resource Control (RRC) part of the protocol stack is responsible for the assignment, configuration and release of radio resources between the UE and the UTRAN. This RRC protocol is described in detail in the 3GPP TS 25.331 specifications. Two basic modes that the UE can be in are defined as "idle mode" and "UTRA RRC connected mode" (or simply "connected mode", as used herein). UTRA stands for UMTS Terrestrial Radio Access. In idle mode, the UE or other mobile device is required to request a RRC connection whenever it wants to send any user data or in response to a page whenever the UTRAN or the Serving General Packet Radio Service (GPRS) Support Node (SGSN) pages it to receive data from an external data network such as a push server. Idle and Connected mode behaviors are described in detail in the Third Generation Partnership Project (3GPP) specifications TS 25.304 and TS 25.331.

When in a UTRA RRC connected mode, the device can be in one of four states. These are:

CELL_DCH: A dedicated channel is allocated to the UE in uplink and downlink in this state to exchange data. The UE must perform actions as outlined in 3GPP 25.331.

CELL_FACH: no dedicated channel is allocated to the user equipment in this state. Instead, common channels are used to exchange a small amount of bursty data. The UE must perform actions as outlined in 3GPP 25.331 which includes the cell selection process as defined in 3GPP TS 25.304.

CELL_PCH: the UE uses Discontinuous Reception (DRX) to monitor broadcast messages and pages via a Paging Indicator Channel (PICH). No uplink activity is possible. The UE must perform actions as outlined in 3GPP 25.331 which includes the cell selection process as defined in 3GPP TS 25.304. The UE must perform the CELL UPDATE procedure after cell reselection.

URA_PCH: the UE uses Discontinuous Reception (DRX) to monitor broadcast messages and pages via a Paging Indicator Channel (PICH). No uplink activity is possible. The UE must perform actions as outlined in 3GPP 25.331 including the cell selection process as defined in 3GPP TS 25.304. This state is similar to CELL_PCH, except that URA UPDATE procedure is only triggered via UTRAN Registration Area (URA) reselection.

The transition from an idle mode to the connected mode and vise-versa is controlled by the UTRAN. When an idle mode UE requests an RRC connection, the network decides whether to move the UE to the CELL_DCH or CELL_FACH state. When the UE is in an RRC connected mode, again it is the network that decides when to release the RRC connection. The network may also move the UE from one RRC state to another prior to releasing the connection or in some cases instead of releasing the connection. The state transitions are typically triggered by data activity or inactivity between the UE and network. Since the network may not know when the UE has completed the data exchange for a given application, it typically keeps the RRC connection for some time in anticipation of more data to/from the UE. This is typically done to reduce the latency of call set-up and subsequent radio resource setup. The RRC connection release message can only be sent by the UTRAN. This message releases the signal link connection and all radio resources between the UE and the UTRAN. Generally, the term "radio bearer" refers to radio resources assigned between the UE and the UTRAN. And, the term "radio access bearer" generally refers to radio resources assigned between the UE and, e.g., an SGSN (Serving GPRS Service Node). The present disclosure shall, at times, refer to the term radio resource, and such term shall refer, as appropriate, to either or both the radio bearer and/or the radio access bearer.

The problem with the above is that even if an application on the UE has completed its data transaction and is not expecting any further data exchange, it still waits for the network to move it to the correct state. The network may not be even aware of the fact that the application on the UE has completed its data exchange. For example, an application on the UE may use its own acknowledgement-based protocol to exchange data with its application server, which is accessed through the UMTS core network. Examples are applications that run over User Datagram Protocol/Internet Protocol (UDP/IP) implementing their own guaranteed delivery. In such a case, the UE knows whether the application server has sent or received all the data packets or not and is in a better position to determine if any further data exchange is to take place and hence decide when to terminate the RRC connection associated with Packet Service (PS) domain. Since the UTRAN controls when the RRC connected state is changed to a different state or into an idle mode and the UTRAN is not aware of the status of data delivery between the UE and external server, the UE may be forced to stay in a higher data rate state or mode than what is required, possibly resulting in decreased battery life for the mobile station and also possibly resulting in wasted network resources due to the fact that the radio resources are unnecessarily being kept occupied and are thus not available for another user.

One solution to the above is to have the UE send a signaling release indication to the UTRAN when the UE realizes that it is finished with a data transaction. Pursuant to section 8.1.14.3 of the 3GPP TS 25.331 specification, the UTRAN may release the signaling connection upon receipt of the signaling release indication from the UE, causing the UE to transition to an idle mode or some other RRC state. A problem with the above solution is that the UTRAN might become inundated with signaling release indication messages from the UE and other UEs

BRIEF DESCRIPTION OF THE DRAWINGS

The present disclosure will be better understood with reference to the drawings in which:

FIG. 3 is a block diagram showing the various stages in an RRC connection setup;

DETAILED DESCRIPTION

Figure 1:
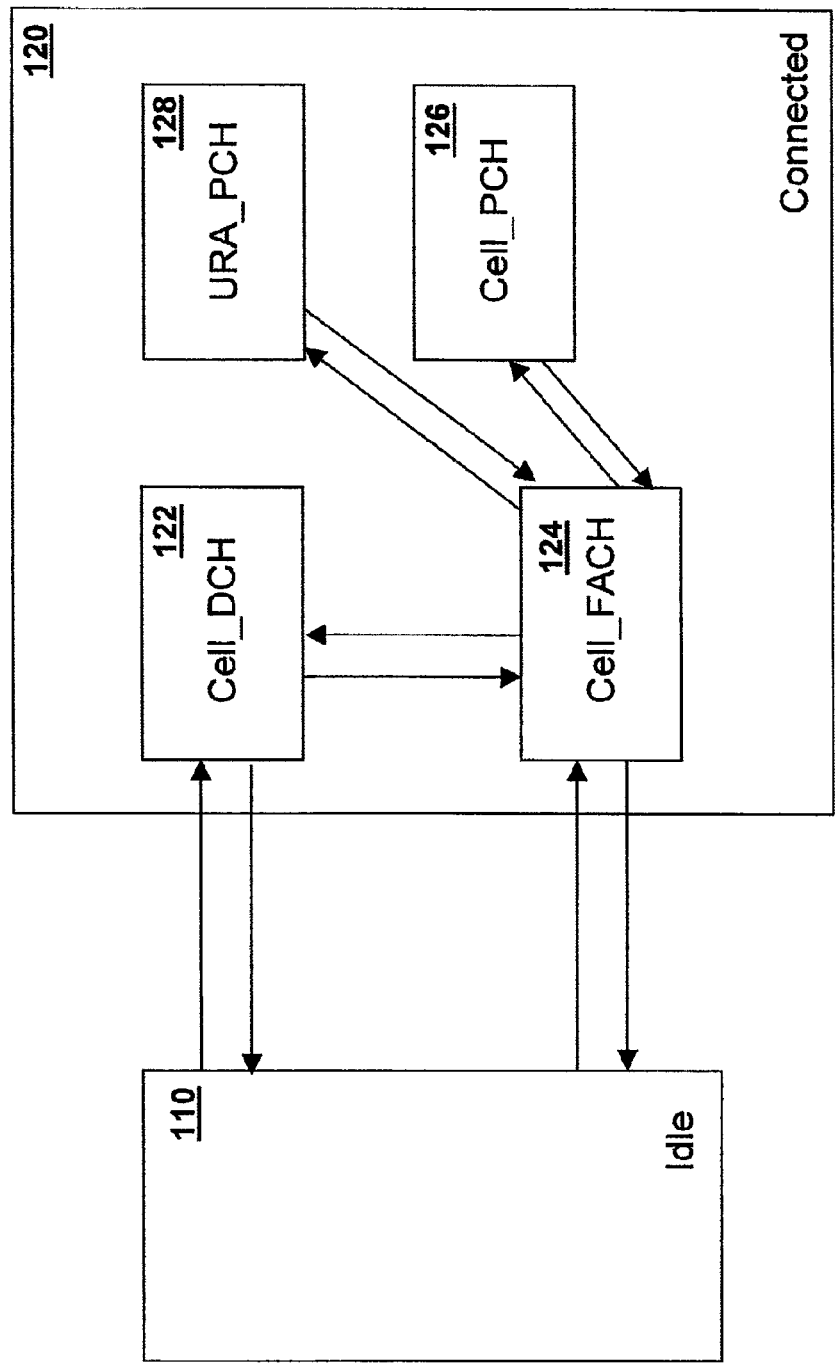
FIG. 1 is a block diagram showing RRC states and transitions.

According to one aspect of the present application, there is provided a method of processing indication messages in a user equipment, the method comprising: for at least one RRC state, if the current RRC state of the UE is a result of a previously sent indication message, the UE inhibiting itself from sending a further indication message.

According to another aspect of the present application, there is provided a user equipment configured to process indication messages, the user equipment configured to: for at least one RRC state, if the current RRC state of the UE is a result of a previously sent indication message, inhibit itself from sending a further indication message.

The examples and embodiments provided below describe various methods and systems for transitioning a User Equipment (UE) or other mobile device between various states/modes of operation in a wireless network such as, for example, a UMTS network. It is to be understood that other implementations in other types of networks are also possible. For example, the same teachings could also be applied to a Code-Division-Multiple-Access (CDMA) network (e.g. 3GPP2 IS-2000), Wideband-CDMA (W-CDMA) network (e.g. 3GPP UMTS/High-Speed Packet Access (HSPA)) network, an Evolved UTRAN network (e.g. LTE), or by way of generalization, to any network based on radio access technologies that utilize network-controlled radio resources or that does not maintain any knowledge of the status of device application level data exchanges. The specific examples and implementations described below although presented for simplicity in relation to UMTS networks are also applicable to these other network environments. Further, the network element is sometimes described below as the UTRAN. However, if other network types besides UMTS are utilized, the network element can be selected appropriately based on the network type. Further, the network element can be the core network in a UMTS system or any other appropriate network system, where the network element is the entity that makes transition decisions.

In a particular example, the present system and method provide for the transitioning from an RRC connected mode to a more battery efficient or radio resource efficient state or mode while providing for decision making capabilities at the network. In particular, the present method and apparatus provide for transitioning based on receipt of an indication from a UE indicating, either implicitly or explicitly, that a transition of the RRC state or mode associated with a particular signaling connection with radio resources to another state or mode should occur. As will be appreciated, such a transition indication or request could utilize an existing communication under current standards, for example a SIGNALING CONNECTION RELEASE INDICATION message, or could be a new dedicated message to change the state of the UE, such as a "preferred RRC state request" or a "data transfer complete indication message". A data transfer complete indication message is a message which indicates the completion of higher layer data transfer. As used herein, an indication could refer to either scenario, and could incorporate a request.

The transition indication originated by the UE can be sent in some situations when one or more applications on the UE have completed an exchange of data and/or when a determination is made that the UE application(s) are not expected to exchange any further data. The network element can then use the indication and any information provided therein, as well as other information related to the radio resource, such a quality of service, Access Point Name (APN), Packet Data Protocol (PDP) context, historical information, among others, defined herein as a radio resource profile, to make a network specific decision about whether to transition the mobile device to another mode or state, or do nothing. The transition indication provided by the UE or mobile device can take several forms and can be sent under different conditions. In a first example, the transition indication can be sent based on a composite status of all of the applications residing on the UE. Specifically, in a UMTS environment, if an application on the UE determines that it is done with the exchange of data, it can send a "done" indication to a "connection manager" component of UE software. The connection manager can, in one embodiment, keep track of all existing applications (including those providing a service over one or multiple protocols), associated Packet Data Protocol (PDP) contexts, associated packet switched (PS) radio resources and associated circuit switched (CS) radio resources. A PDP Context is a logical association between a UE and PDN (Public Data Network) running across a UMTS core network. One or multiple applications (e.g. an e-mail application and a browser application) on the UE may be associated with one PDP context. In some cases, one application on the UE is associated with one primary PDP context and multiple applications may be tied with secondary PDP contexts. The Connection Manager receives "done" indications from different applications on the UE that are simultaneously active. For example, a user may receive an e-mail from a push server while browsing the web. After the e-mail application has sent an acknowledgment, it may indicate that it has completed its data transaction. The browser application may behave differently and instead make a predictive determination (for e.g. using an inactivity timer) of when to send a "done" indication to the connection manager.

Based on a composite status of such indications from active applications, UE software can decide to send a transition indication to indicate or request of the network that a transition from one state or mode to another should occur. Alternatively, the UE software can instead wait before it sends the transition indication and introduce a delay to ensure that the application is truly finished with data exchange and does not require to be maintained in a battery or radio resource intensive state or mode. The delay can be dynamic based on traffic history and/or application profiles. Whenever the connection manager determines with some probability that no application is expected to exchange data, it can send a transition indication to the network to indicate that a transition should occur. In a specific example, the transition indication can be a signaling connection release indication for the appropriate domain (e.g. PS domain) to request a transition to an idle mode. Alternatively, the transition indication could be a request for state transition within connected mode to the UTRAN.

As described below in further detail, based on the receipt of a transition indication and optionally a radio resource profile, a network element such as the UTRAN in a UMTS environment can decide to transition the UE from one state or mode to another.

Other transition indications are possible. For example, instead of relying on a composite status of all active applications on the UE, the UE software can, in an alternative embodiment, send a transition indication every time a UE application has completed an exchange or data and/or the application is not expected to exchange further data. In this case, the network element (e.g. the UTRAN), based on an optional radio resource profile for the UE as described with reference to FIG. 18 below, can utilize the indication to make a transitioning decision.

In yet another example, the transition indication could simply indicate that one or more applications on the UE completed a data exchange and/or that the UE application(s) are not expected to exchange any further data. Based on that indication and an optional radio resource profile for the UE, the network (e.g. UTRAN), can decide whether or not to transition the UE to a more appropriate state or mode or operation.

In a further example, the transition indication could be implicit rather than explicit. For example, the indication may be part of a status report sent periodically. Such a status report could include information such as whether a radio link buffer has data or could include information on outbound traffic.

When the UE sends a transition indication it may include additional information in order to assist the network element in making a decision to act on the indication. This additional information would include the reason or cause for the UE to send the message. This cause or reason (explained below in greater detail) would be based on the UE determining a need for "fast dormancy" like behavior. Such additional information may be by way of a new information element or a new parameter within the transition indication message.

In a further embodiment, a timer could exist on the UE to ensure that a transition indication may not be sent until a time duration has elapsed (inhibit duration) since a previous transition indication was sent. This inhibit timer restricts the UE from sending the transition indication message too frequently and further allows the network to make a determination by relying on messages that are triggered only with a given maximum frequency. The time duration could be determined by a timer whose value is preconfigured, or set by a network (indicated or signaled). If the value is set by a network, it could be conveyed in new or existing messages such as RRC Connection Request, RRC Connection release, Radio Bearer Setup, UTRAN Mobility Information or a System Information Block, among others, and could be an information element in those messages. The value could alternatively be conveyed in an inhibit transition indication portion of an RRC connection setup message sent by the UTRAN in response to an RRC connection request message received from the UE, for example.

In an alternative embodiment, the value could be conveyed to a UE in a message whose type depends on a state of the UE. For example, the network could send the value to all the UEs in a cell as a portion of a system information message which is read by the UE when it is in an IDLE, URA_PCH, Cell_PCH or CELL_FACH state.

In yet another embodiment, the value could be sent as a portion of an RRC connection setup message.

Network generated messages may also convey an implied inhibit timer value through non-inclusion of an inhibit timer in the message or in an information element within the message. For example, upon determining that an inhibit timer is omitted from a received message, a UE applies a pre-determined value for use as an inhibit timer value. One exemplary use of inhibit timer value omission is to prohibit the UE from sending a transition indication message. In such a situation, when a UE detects the omission of an expected inhibit timer value in a received message, the UE may, based on the omission, be prohibited from sending any transition indication messages. One way to achieve this is for the UE to adopt an inhibit timer value of infinity.

In another embodiment when the UE detects the omission of an inhibit timer value (and for example, adopts an inhibit timer value of infinity), it may send transition indications but without including any additional information, specifically it may omit the cause for triggering the sending of the transition indication (further described below in greater detail). The omission of a cause element in a transition indication message may ensure backward-compatibility by allowing UEs to use an existing transition indication message (e.g. SIGNALING CONNECTION RELEASE INDICATION) to request or indicate a transition.

Non-inclusion of an inhibit timer in the received message is further detailed with reference to an exemplary embodiment wherein a System Information Block is broadcast in a cell, or sent to a UE and the System Information Block is configured to convey an inhibit timer value. In this embodiment, if the UE receives a System Information Block which does not contain an inhibit timer, known as T3xx, in the message or an information element within the message, in which case the UE may determine to not enable the UE to send the transition indication message, for example by setting the inhibit timer, T3xx, to infinity.

Non-inclusion of an inhibit timer is further detailed with reference to another exemplary embodiment wherein an inhibit timer, T3xx, is omitted from a UTRAN Mobility Information message. In such a situation a recipient UE may continue to apply a previously stored inhibit timer value. Alternatively, the UE, on detecting the omission of the inhibit timer T3xx, may determine to not enable the UE to send the transition indication message, for example by setting the inhibit timer, T3xx, to infinity.

In yet another exemplary embodiment, a UE, on detecting the omission of an inhibit timer in the received message or in an information element within the message, sets the inhibit timer value to another preset value (e.g. one of 0 seconds, 5 seconds, 10 seconds, 15 seconds, 20 seconds, 30 seconds, 1 minute, 1 minute 30 seconds, 2 minutes). Alternatively or in addition, these examples may apply to other network generated messages.

In other embodiments, if the inhibit timer (value) is not sent or signaled to the UE in a message or information element, or the inhibit timer is not read from broadcast system information or received from other dedicated UTRAN messages on transitioning from one cell to another, the sending of a transition indication may or may not occur.

Specifically in one embodiment the UE on detecting that there is no inhibit timer present, does not initiate a transition indication based on a higher layer determining that it has no more PS data to transmit.

In an alternative embodiment the UE on detecting that there is no inhibit timer present, may initiate a transition indication based on the higher layer determining that it has no more PS data to transmit.

In yet another embodiment, if no timer value is received from the UTRAN within a message, or within an information element in a message (via broadcasting or otherwise), rather than setting the timer value at the UE to infinity the UE may set the inhibit timer to zero or alternatively delete any configuration for the timer, and instead be permitted to send a transition indication. In this case, the UE could omit or be prohibited from attaching a cause in the transition indication message. In one embodiment a SIGNALING CONNECTION RELEASE INDICATION message is used as one example of a transition indication.

In an embodiment the transition indication is conveyed using the signaling connection release indication procedure. The signaling connection release indication procedure is used by the UE to indicate to the UTRAN that one of its signaling connections has been released.

Specifically in accordance with TS 25.331 Section 8.1.14.2 the UE shall, on receiving a request to release the signaling connection from the upper layers for a specific CN domain, check if the signaling connection in the variable "ESTABLISHED_SIGNALLING_CONNECTIONS for the specific CN domain identified in the information element "CN domain identity" exists. If it does, the UE may initiate the signaling connection release indication procedure.

In the case of the inhibit timer value not being signaled or otherwise conveyed to the UE, no signaling connection release indication cause is specified in the SIGNALING CONNECTION RELEASE INDICATION message. Those skilled in the art will appreciate that in this alternative embodiment the lack of a timer value does not result in the timer value being set to infinity.

On the UTRAN side, upon receipt of a SIGNALING CONNECTION RELEASE INDICATION message without a cause, the UTRAN indicates the release of the signaling connection for the identified CN domain identity to the upper layers. This may then initiate the release of the established radio resource control connection.

Under another alternative embodiment, when the UTRAN signals or conveys a timer value to the UE, for example, inhibit timer T3xx in information element "UE timers and constants in connected mode" (or using system information, such as SIB1, SIB3 or SIB4, or with a dedicated UTRAN mobility information message), the release procedure occurs in accordance with the following. First, the UE can check whether there are any circuit switched domain connections indicated. Such connections may be indicated in the variable "ESTABLISHED_-SIGNALLING_CONNECTIONS". If there are no circuit switched domain connections, a second check to determine whether an upper layer indicates that there will be no packet switched domain data for a prolonged period could occur.

If there are no circuit switched domain connections and no packet switched domain data is expected for a prolonged period, the UE may next check whether the timer T3xx is running.

If the timer T3xx is not running, the UE sets information element "CN Domain Identity" to the packet switched (PS) domain. Further, the information element "Signaling Connection Release Indication Cause" is set to "UE requested PS data session end". The SIGNALING CONNECTION RELEASE INDICATION message is transmitted on the DCCH using AM RLC. Further, after the transmission the timer T3xx is started.

The procedure above ends on successful delivery of the SIGNALING CONNECTION RELEASE INDICATION message, as confirmed by the RLC in the above procedure. In this embodiment, the UE is inhibited from sending the SIGNALING CONNECTION RELEASE INDICATION message with a signaling connection release indication cause set to "UE Requested PS data session end" while the timer T3xx is running or until the timer T3xx has expired.

When the T3xx timer is running, if the signaling connection release indication procedure is initiated due to no further packet switched domain data for a prolonged duration, the UE is responsible for implementing whether to initiate the procedure on the expiry of the T3xx timer. The UE decision may be based on determining whether it has any subsequent signaling connection release indication or request messages to send and if so, the UE decision may include re-checking some or all of the same checks for initiating the procedure as outlined herein.

On the UTRAN side, if the SIGNALING CONNECTION RELEASE INDICATION message received does not include a signaling connection release indication cause, the UTRAN may request the release of the signaling connection from an upper layer and the upper layer may then initiate the release of the signaling connection. If on the other hand the SIGNALING CONNECTION RELEASE INDICATION message received includes a cause, the UTRAN may either release the signaling connection or initiate a state transition to a more battery efficient state (e.g CELL_FACH, CELL_PCH, URA_PCH or IDLE_MODE).

The inhibit duration above may be based on the state the UE would like to transition to. For example the inhibit duration may be different, whether the mobile indicated its last preference for some RRC States/modes versus others. For example, it could be different if the mobile indicated a preference for idle mode, versus Cell_FACH, or versus Cell_PCH/URA PCH States. In the case where the Inhibit Duration is set by the network, this may be achieved by the network indicating/sending two (or more) sets of values to the mobile, to be used depending on the scenario. Alternatively, the indication could be done in such a way that the appropriate Inhibit duration value only is indicated/signaled to the mobile: for example, if the UE wants to transition to Cell_PCH, a different elapsed time duration could be set than if the UE wants to transition to Idle.

The inhibit duration from above may be different, depending on which RRC State/mode the mobile currently is in (e.g. Cell_DCH/Cell_FACH versus Cell_PCH/URA_PCH, or in Cell_DCH versus Cell_FACH, or Cell_PCH/URA_PCH).

The inhibit duration from above may be different, depending if the network has already acted on preference RRC State information from the mobile. Such recognition may be happen on the network, or on the mobile side. In the first case, this may affect the Inhibit values indicated/signaled by the network to the mobile. In this second case, different sets of Inhibit duration values may be preconfigured or indicated/signaled by the network. As a particular case, the inhibit duration/functionality may be reduced or cancelled if the network has acted on preference RRC State information from the mobile, e.g. has initiated a state transition to a state indicated by the UE.

The inhibit duration from above may be different, depending on, for example, preferences, features, capabilities, loads or capacities of the network. A network may indicate a short inhibit duration if it is able to receive frequent transition indication messages. A network may indicate a long inhibit duration if it is unable or does not want to receive frequent transition indication messages. A network may indicate a specific period of time during which a UE cannot send transition indication messages. The specific period of time can be indicated numerically (i.e. 0 seconds, 30 seconds, 1 minute, 1 minute 30 seconds, 2 minutes or infinity) for example. A UE which receives an inhibit duration of 0 seconds is able to send transition indications without delay. A UE which receives an inhibit duration of infinity is unable to send transition indications.

A maximum number of messages per time-window (e.g. "no more than 15 messages every 10 minutes") may be used/specified instead of, or in addition to, the Inhibit duration.

Combinations of the above inhibition durations/maximum messages per time-window are possible.

By way of example, the present disclosure generally describes the reception of an RRC CONNECTION REQUEST message by a UTRAN from a UE. Upon receiving an RRC CONNECTION REQUEST message, the UTRAN should, for example, accept the request and send an RRC CONNECTION SETUP message to the UE. The RRC CONNECTION SETUP message may include an Inhibit Transition Indication, which is known as Timer T3xx. Upon reception of the RRC CONNECTION SETUP message by the UE, the UE should, for example, store the value of the Timer T3xx, replacing any previously stored value, or, if the Timer T3xx is not in the RRC CONNECTION SETUP message, set the value of the timer to infinity. In some embodiments, the RRC CONNECTION SETUP message must include an Inhibit Transition Indication to ensure that the UE knows that the UTRAN supports the Inhibit Transition Indication signaling.

In an embodiment it is assumed that during mobility in a DCH state, the UE will maintain its currently stored value for the inhibit timer. In some cases where the inhibit timer is set to infinity this may mean that the UE must wait for network data inactivity timers to expire and for the network to move the UE to an RRC state where it can receive or determine a new value for the inhibit timer. In other cases where the inhibit timer is some value other than infinity before the handover, this other value is continued to be used until the UE is able to update the timer value to that indicated in the new cell.

In some instances the inhibit timer and the transition indication (e.g. SIGNALING CONNECTION RELEASE INDICATION) message may not be implemented in some networks or in some cells within a network. For mobility purposes, if there is no support available for the feature of sending a transition indication or request message (particularly in the case where a cause is used), the UE should default to not sending the message. This avoids unnecessary transmissions and the associated waste of network resources and battery resources.

In addition, for mobility purposes, different vendor's network equipment used within a network may lead to adjacent cells using different inhibit timers which need to be updated on the UE when the UE moves between cells.

In one alternative embodiment this is handled by providing that all handover and related bearer control messages include a value for an inhibit timer T3xx. Such messages are referred to herein as mobility messages. This allows the UE to receive new inhibit timer values when moving between cells. It also allows the UE to set a default timer value for the inhibit timer if one of these mobility messages does not contain an inhibit timer value. As will be appreciated, if no inhibit timer value is received in the mobility messages, this indicates that the cell is not enabled for fast dormancy.

As another example of a transition indication procedure, a Data Transfer Complete Indication procedure may be used by the UE to indicate to the UTRAN that it has determined that it does not need to transfer any more PS domain data. In connection with the example described above, the UE would not send the Data Transfer Complete Indication message before the timer T3xx has expired, if the timer T3xx was running.

The Data Transfer Complete Indication procedure commences with an indication that the RRC or upper layers will have no more PS domain data for a prolonged duration. If a CS domain connection is indicated in the variable ESTABLISHED_SIGNALLING_CONNECTIONS or if timer T3xx is set to infinity the procedure ends. Otherwise if timer T3xx is not running (i.e. has expired) or is set to 0 seconds, a DATA TRANSFER COMPLETE INDICATION message is submitted to the lower layers for transmission using AM RLC on DCCH after which the timer T3xx is started or reset when the message has been delivered to the lower layers;

The UTRAN on receipt of the DATA TRANSFER COMPLETE INDICATION may decide to initiate a UE transition to a more battery efficient RRC state or idle mode.

The UE shall not send the Data Transfer Complete Indication message while timer T3xx is running.

The present disclosure provides method to control use of a transition indication message by a user equipment, comprising including an inhibit transition indication in a configuration message; and sending the configuration message with the inhibit transition indication to the user equipment.

The present disclosure further provides a network element configured to control use of a transition indication message by a user equipment, the network element configured to: include an inhibit transition indication in a configuration message; and send the configuration message with the inhibit transition indication to the user equipment.

The present disclosure further provides a method at a user equipment (UE) for sending a transition indication, the method comprising setting a timer according to an inhibit transition indication received from a network element; detecting that a data transfer is complete; and sending the transition indication upon detecting that the timer is not running.

The present disclosure still further provides user equipment configured to send a transition indication, the user equipment configured to: set a timer according to an inhibit transition indication received from a network element; detect that a data transfer is complete; and send the transition indication upon detecting that the timer is not running.

Reference is now made to FIG. 1. FIG. 1 is a block diagram showing the various modes and states for the radio resource control portion of a protocol stack in a UMTS network. In particular, the RRC can be either in an RRC idle mode 110 or an RRC connected mode 120.

Figure 8:
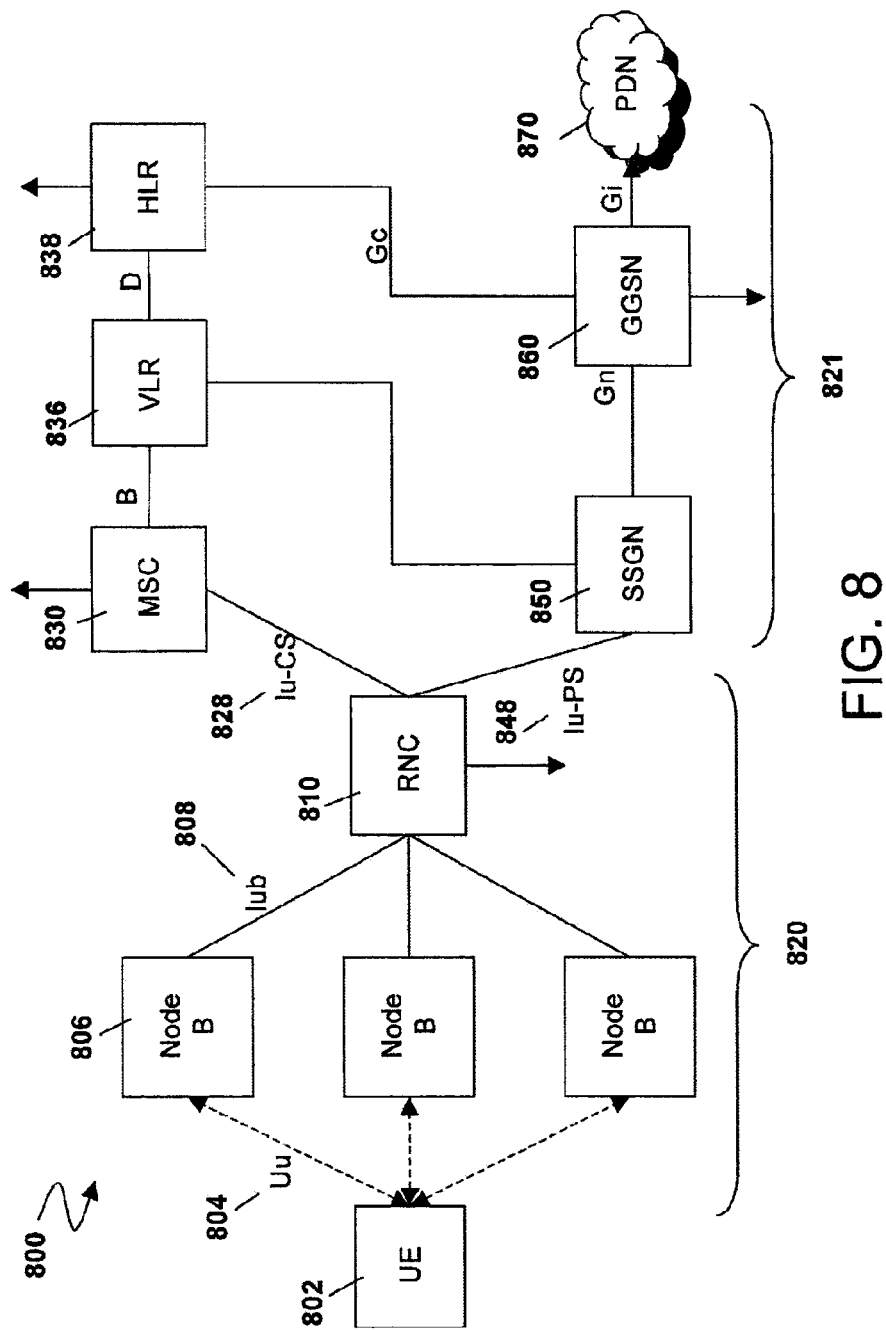
FIG. 8 is an exemplary network for use in association with the present method and system.

As will be appreciated by those skilled in the art, a UMTS network consists of two land-based network segments. These are the Core Network (CN) and the Universal Terrestrial Radio-Access Network (UTRAN) (as illustrated in FIG. 8). The Core Network is responsible for the switching and routing of data calls and data connections to the external networks while the UTRAN handles all radio related functionalities.

In idle mode 110, the UE must request an RRC connection to set up the radio resource whenever data needs to be exchanged between the UE and the network. This can be as a result of either an application on the UE requiring a connection to send data, or as a result of the UE monitoring a paging channel to indicate whether the UTRAN or SGSN has paged the UE to receive data from an external data network such as a push server. In addition, the UE also requests an RRC connection whenever it needs to send Mobility Management signaling messages such as Location Area Update.

Once the UE has sent a request to the UTRAN to establish a radio connection, the UTRAN chooses a state for the RRC connection to be in. Specifically, the RRC connected mode 120 includes four separate states. These are CELL_DCH state 122, CELL_FACH state 124, CELL_PCH state 126 and URA_PCH state 128.

From idle mode 110 the UE autonomously transitions to the CELL_FACH state 124, in which it makes its initial data transfer, subsequent to which the network determines which RRC connected state to use for continued data transfer. This may include the network either moving the UE into the Cell Dedicated Channel (CELL_DCH) state 122 or keeping the UE in the Cell Forward Access Channel (CELL_FACH) state 124.

In CELL_DCH state 122, a dedicated channel is allocated to the UE for both uplink and downlink to exchange data. This state, since it has a dedicated physical channel allocated to the UE, typically requires the most battery power from the UE.

Alternatively, the UTRAN can maintain the UE in a CELL_FACH state 124. In a CELL_FACH state no dedicated channel is allocated to the UE. Instead, common channels are used to send signaling in a small amount of bursty data. However, the UE still has to continuously monitor the FACH, and therefore it consumes more battery power than in a CELL_PCH state, a URA_PCH state, and in idle mode.

Within the RRC connected mode 120, the RRC state can be changed at the discretion of the UTRAN. Specifically, if data inactivity is detected for a specific amount of time or data throughput below a certain threshold is detected, the UTRAN may move the RRC state from CELL_DCH state 122 to the CELL_FACH state 124, CELL_PCH state 126 or URA_PCH state 128. Similarly, if the payload is detected to be above a certain threshold then the RRC state can be moved from CELL_FACH state 124 to CELL_DCH state 122.

From CELL_FACH state 124, if data inactivity is detected for a predetermined time in some networks, the UTRAN can move the RRC state from CELL_FACH state 124 to a paging channel (PCH) state. This can be either the CELL_PCH state 126 or URA_PCH state 128.

From CELL_PCH state 126 or URA_PCH state 128 the UE must move to CELL_FACH state 124 in order to initiate an update procedure to request a dedicated channel. This is the only state transition that the UE controls.

Idle mode 110 and CELL_PCH state 126 and URA_PCH state 128 use a discontinuous reception cycle (DRX) to monitor broadcast messages and pages by a Paging Indicator Channel (PICH). No uplink activity is possible.

Figure 2:
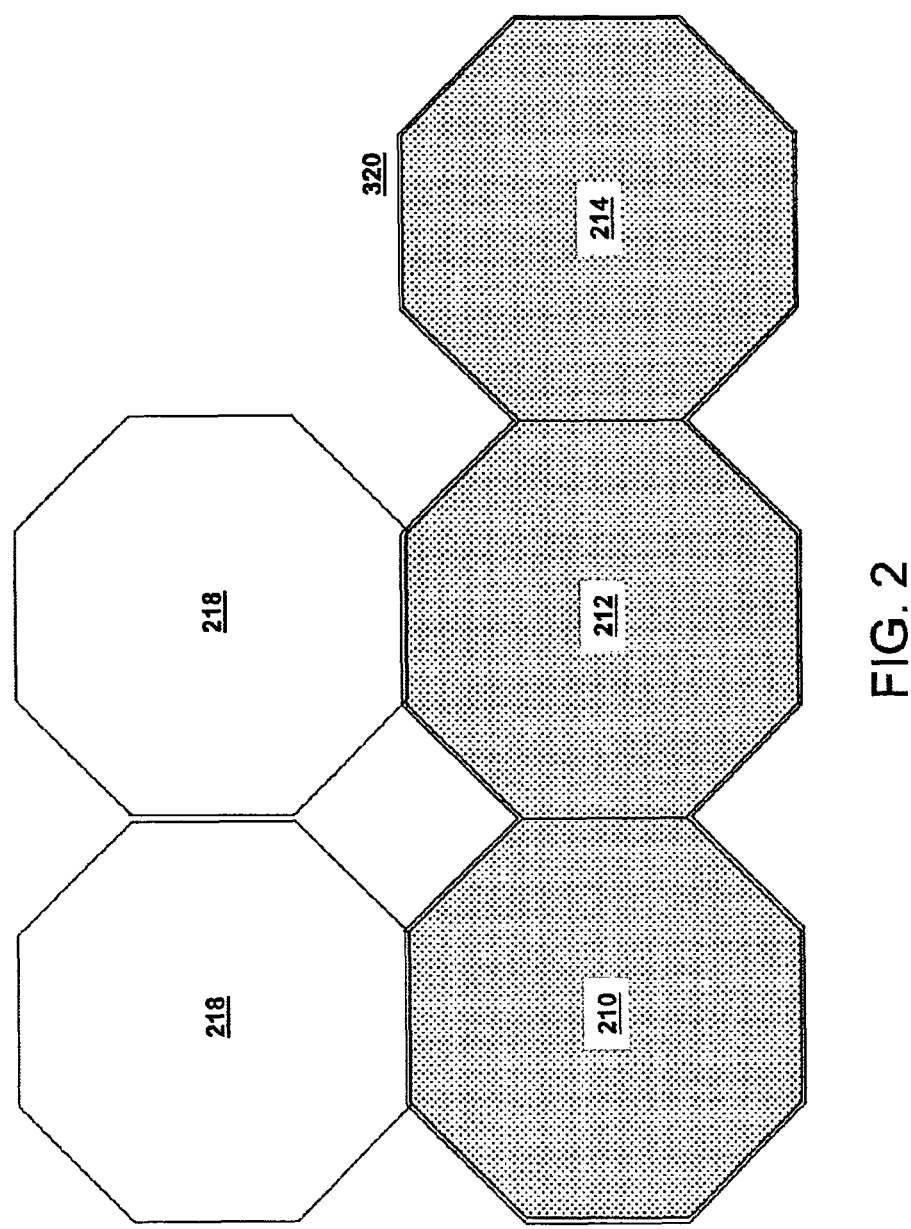
FIG. 2 is a schematic of a UMTS network showing various UMTS cells and a URA.

The difference between CELL_PCH state 126 and URA_PCH state 128 is that the URA_PCH state 128 only triggers a URA Update procedure if the UE's current UTRAN registration area (URA) is not among the list of URA identities present in the current cell. Specifically, reference is made to FIG. 2. FIG. 2 shows an illustration of various UMTS cells 210, 212 and 214. All of these cells require a cell update procedure if reselected to a CELL_PCH state. However, in a UTRAN registration area, each will be within the same UTRAN registration area (URA) 320, and thus a URA update procedure is not triggered when moving between 210, 212 and 214 when in a URA_PCH mode.

As seen in FIG. 2, other cells 218 are outside the URA 320, and can be part of a separate URA or no URA.

As will be appreciated by those skilled in the art, from a battery life perspective the idle state provides the lowest battery usage compared with the states above. Specifically, because the UE is required to monitor the paging channel only at intervals, the radio does not need to continuously be on, but will instead wake up periodically. The trade-off for this is the latency to send data. However, if this latency is not too great, the advantages of being in the idle mode and saving battery power outweigh the disadvantages of the connection latency.

Reference is again made to FIG. 1. Various UMTS infrastructure vendors move between states 122, 124, 126 and 128 based on various criteria. These criteria could be the network operator's preferences regarding the saving of signaling or the saving of radio resources, among others. Exemplary infrastructures are outlined below.

In a first exemplary infrastructure, the RRC moves between an idle mode and a Cell_DCH state directly after initiating access in a CELL_FACH state. In the Cell_DCH state, if two seconds of inactivity are detected, the RRC state changes to a Cell_FACH state 124. If, in Cell_FACH state 124, ten seconds of inactivity are detected then the RRC state changes to Cell_PCH state 126. Forty five minutes of inactivity in Cell_PCH state 126 will result in the RRC state moving back to idle mode 110.

In a second exemplary infrastructure, RRC transition can occur between an idle mode 110 and connected mode 120 depending on a payload threshold. In the second infrastructure, if the payload is below a certain threshold then the UTRAN moves the RRC state to CELL_FACH state 124. Conversely, if the data payload is above a certain payload threshold then the UTRAN moves the RRC state to a CELL_DCH state 122. In the second infrastructure, if two minutes of inactivity are detected in CELL_DCH state 122, the UTRAN moves the RRC state to CELL_FACH state 124. After five minutes of inactivity in the CELL_FACH state 124, the UTRAN moves the RRC state to CELL_PCH state 126. In CELL_PCH state 126, two hours of inactivity are required before moving back to idle mode 110.

In a third exemplary infrastructure, movement between idle mode 110 and connected mode 120 is always to CELL_DCH state 122. After five seconds of inactivity in CELL_DCH state 122 the UTRAN moves the RRC state to CELL_FACH state 124. Thirty seconds of inactivity in CELL_FACH state 124 results in the movement back to idle mode 110.

In a fourth exemplary infrastructure the RRC transitions from an idle mode to a connected mode directly into a CELL_DCH state 122. In the fourth exemplary infrastructure, CELL_DCH state 122 includes two configurations. The first includes a configuration which has a high data rate and a second configuration includes a lower data rate, but still within the CELL_DCH state. In the fourth exemplary infrastructure, the RRC transitions from idle mode 110 directly into the high data rate CELL_DCH sub-state. After 10 seconds of inactivity the RRC state transitions to a low data rate CELL_DCH sub-state. Seventeen seconds of inactivity from the low data sub-state of CELL_DCH state 122 results in the RRC state changing it to idle mode 110.

The above four exemplary infrastructures show how various UMTS infrastructure vendors are implementing the states. As will be appreciated by those skilled in the art, in each case, if the time spent on exchanging actual data (such as an email) is significantly short compared to the time that is required to stay in the CELL_DCH or the CELL_FACH states. This causes unnecessary current drain, making the user experience in newer generation networks such as UMTS worse than in prior generation networks such as GPRS.

Further, although the CELL_PCH state 126 is more optimal than the CELL_FACH state 124 from a battery life perspective, the DRX cycle in a CELL_PCH state 126 is typically set to a lower value than the idle mode 110. As a result, the UE is required to wake up more frequently in the CELL_PCH state 126 than in an idle mode 110.

The URA_PCH state 128 with a DRX cycle similar to that of the idle state 110 is likely the optimal trade up between battery life and latency for connection. However, URA_PCH state 128 is currently not implemented in the UTRAN. In some cases, it is therefore desirable to quickly transition to the idle mode as quickly as possible after an application is finished with the data exchange, from a battery life perspective.

Reference is now made to FIG. 3. When transitioning from an idle mode to a connected mode, various signaling and data connections need to be made. Referring to FIG. 3, the first item to be performed is an RRC connection setup 310. As indicated above, this RRC connection setup 310 can only be torn down by the UTRAN.

Once RRC connection setup 310 is accomplished, a signaling connection setup 312 is started.

Once signaling connection setup 312 is finished, a ciphering and integrity setup 314 is started. Upon completion of this, a radio bearer setup 316 is accomplished. At this point, data can be exchanged between the UE and UTRAN.

Tearing down a connection is similarly accomplished in the reverse order, in general. The radio bearer setup 316 is taken down and then the RRC connection setup 310 is taken down. At this point, the RRC moves into idle mode 110 as illustrated in FIG. 1.

Although the current 3GPP specification does not allow the UE to release the RRC connection or indicate its preference for RRC state, the UE can still indicate termination of a signaling connection for a specified core network domain such as the Packet Switched (PS) domain used by packet-switched applications. According to section 8.1.14.1 of 3GPP TS 25.331, the SIGNALING CONNECTION RELEASE INDICATION procedure is used by the UE to indicate to the UTRAN that one of its signaling connections has been released. This procedure may in turn initiate the RRC connection release procedure.

Thus staying within the current 3GPP specifications, signaling connection release may be initiated upon the tearing down of the signaling connection setup 312. It is within the ability of the UE to tear down signaling connection setup 312, and this in turn according to the specification "may" initiate the RRC connection release.

As will be appreciated by those skilled in the art, if signaling connection setup 312 is torn down, the UTRAN will also need to clean up deciphering and integrity setup 314 and radio bearer setup 316 after the signaling connection setup 312 has been torn down.

If signaling connection setup 312 is torn down, the RRC connection setup is typically brought down by the network for current vendor infrastructures if no CS connection is active.

Using this for one of the specific transition indication examples mentioned above, if the UE determines that it is done with the exchange of data, for example if a "connection manager" component of the UE software is provided with an indication that the exchange of data is complete, then the connection manager may determine whether or not to tear down the signaling setup 312. For example, an email application on the device sends an indication that it has received an acknowledgement from the push email server that the email was indeed received by the push server. The connection manager can, in one embodiment, keep track of all existing applications, associated PDP contexts, associated PS radio resources and associated circuit switched (CS) radio bearers. In other embodiments a network element (e.g., the UTRAN) can keep track of existing applications, associated PDP contexts, QoS, associated PS radio resources and associated CS radio bearers. A delay can be introduced at either the UE or network element to ensure that the application(s) is (are) truly finished with data exchange and no longer require an RRC connection even after the "done" indication(s) have been sent. This delay can be made equivalent to an inactivity timeout associated with the application(s) or the UE. Each application can have its own inactivity timeout and thus the delay can be a composite of all of the application timeouts. For example, an email application can have an inactivity timeout of five seconds, whereas an active browser application can have a timeout of sixty seconds. An inhibit duration timer can further delay sending of a transition indication. Based on a composite status of all such indications from active applications, as well as a radio resource profile and/or inhibit duration timer delay in some embodiments, the UE software decides how long it should or must wait before it sends a transition indication (for e.g., a signaling connection release indication or state change request) for the appropriate core network (e.g. PS Domain). If the delay is implemented at the network element, the element makes a determination of whether to and how to transition the UE, but only operates the transition after the delay has run its course.

The inactivity timeout can be made dynamic based on a traffic pattern history and/or application profile.

If the network element transitions the UE to idle mode 110, which can happen in any stage of the RRC connected mode 120 as illustrated in FIG. 1, the network element releases the RRC connection and moves the UE to idle mode 110 as illustrated in FIG. 1. This is also applicable when the UE is performing any packet data services during a voice call. In this case, the network may choose to release only the PS domain signaling connection, and maintain the CS domain signaling connection or alternatively may choose not to release anything and instead maintain the signaling connections to both the PS and CS domains.

In a further embodiment, a cause could be added to the transition indication indicating to the UTRAN the reason for the indication. In a preferred embodiment, the cause could be an indication that an abnormal state caused the indication or that the indication was initiated by the UE as a result of a requested transition. Other normal (i.e. non-abnormal) transactions could also result in the sending of the transition indication.

In a further preferred embodiment, various timeouts can cause a transition indication to be sent for an abnormal condition. The examples of timers below are not exhaustive, and other timers or abnormal conditions are possible. For example, 10.2.47 3GPP TS 24.008 specifies timer T3310 as:

| TIMER T3310 | | | | | |
|---|---|---|---|---|---|
| TIMER NUM. | TIMER VALUE | STATE | CAUSE OF START | NORMAL STOP | ON THE $1^{st}, 2^{nd}, 3^{rd}, 4^{th}$ EXPIRY Note 3 |
| T3310 | 15 s | GMM-REG-INIT | ATTACH REQ sent | ATTACH ACCEPT received ATTACH REJECT received | Retransmission of ATTACH REQ |

This timer is used to indicate an attachment failure. The failure to attach could be a result of the network or could be a radio frequency (RF) problem such as a collision or bad RF.

The attachment attempt could occur multiple times, and an attachment failure results from either a predetermined number of failures or an explicit rejection.

A second timer of 10.2.47 of 3GPP is timer T3330, which is specified as:

| TIMER T3330 | | | | | |
|---|---|---|---|---|---|
| TIMER NUM. | TIMER VALUE | STATE | CAUSE OF START | NORMAL STOP | ON THE $1^{st}, 2^{nd}, 3^{rd}, 4^{th}$ EXPIRY Note 3 |
| T3330 | 15 s | GMM-ROUTING-UPDATING-INITIATED | ROUTING AREA UPDATE REQUEST sent | ROUTING AREA UPDATE ACC received ROUTING AREA UPDATE REJ received | Retransmission of the ROUTING AREA UPDATE REQUEST message |

This timer is used to indicate a routing area update failure. Upon expiry of the timer, a further routing area update could be requested multiple times and a routing area update failure results from either a predetermined number of failures or an explicit rejection.

A third timer of 10.2.47 of 3GPP is timer T3340, which is specified as:

| TIMER T3340 | | | | | |
|---|---|---|---|---|---|
| TIMER NUM. | TIMER VALUE | STATE | CAUSE OF START | NORMAL STOP | ON THE 1st, 2nd, 3rd, 4th EXPIRY Note 3 |
| T3340 (Iu mode only) | 10 s | GMM-REG-INIT GMM-DEREG-INIT GMM-RA-UPDATING-INT GMM-SERV-REQ-INIT (Iu mode only) GMM-ATTEMPTING-TO-UPDATE-MM GMM-REG-NORMAL-SERVICE | ATTACH REJ, DETACH REQ, ROUTING AREA UPDATE REJ or SERVICE REJ with any of the causes #11, #12, #13 or #15. ATTACH ACCEPT or ROUTING AREA UPDATE ACCEPT is received with "no follow-on proceed" indication. | PS signalling connection released | Release the PS signalling connection and proceed as described in subclause 4.7.1.9 |

This timer is used to indicate a GMM service request failure. Upon expiry of the timer, a further GMM service request could be initiated multiple times and a GMM service request failure results from either a predetermined number of failures or an explicit rejection.

Thus, instead of a transition indication cause limited to an abnormal condition and a release by the UE, the transition indication cause could further include information about which timer failed for an abnormal condition. In a specific example where a signaling connection release indication is used as a transition indication, the indication could be structured as:

| SIGNALING CONNECTION RELEASE INDICATION | | | | |
|---|---|---|---|---|
| Information Element/Group name | Need | Multi | IE type and reference | Semantics description |
| Message Type | MP | | Message type | |
| UE Information Elements | | | | |
| Integrity check info | CH | | Integrity check info 10.3.3.16 | |
| CN information elements | | | | |
| CN domain identity | MP | | CN domain identity 10.3.1.1 | |
| Signaling Connection Release Indication Cause | OP | | Signaling Release Indication Cause | t3310 timeout, t3330 timeout, t3340 timeout, UE Requested Idle Transition |

This message is used by the UE to indicate to the UTRAN a request to release an existing signaling connection. The addition of the signaling connection release indication cause allows the UTRAN or other network element to receive the cause of the signaling connection release indication, whether it was due to an abnormal condition, and what the abnormal condition was. Based on the receipt of the SIGNALING CONNECTION RELEASE INDICATION, an RRC connection release procedure is, in turn, permitted to be initiated at the UTRAN.

In one implementation of this example, the UE, upon receiving a request to release, or abort, a signaling connection from upper layers for a specific CN (core network) domain, initiates the signaling connection release indication procedure if a signaling connection is identified in a variable. For example, a variable ESTABLISHED_SIGNALING_CONNECTIONS, for the specific CN domain identified with the IE (information element) "CN domain identity" exists. If the variable does not identify any existing signaling connection, any ongoing establishment of a signaling connection for that specific CN domain is aborted in another manner. Upon initiation of the signaling connection release indication procedures in the Cell_PCH or URA_PCH states, the UE performs a cell update procedure using a cause "uplink data transmission". When a cell update procedure is completed successfully, the UE continues with the signaling connection release indication procedures that follow.

Namely, the UE sets the information element (1E) "CN domain identity" to the value indicated by upper logical layers. The value of the IE indicates the CN domain whose associated signaling connection the upper layers are marking to be released. If the CN domain identity is set to the PS domain, and if the upper layer indicates the cause to initiate this request, then the IE "SIGNALING RELEASE INDICATION CAUSE" is accordingly set. The UE further removes the signaling connection with the identity indicated by upper layers from the variable "ESTABLISHED_SIGNALING_CONNECTIONS". The UE transmits a SIGNALING CONNECTION RELEASE INDICATION message on, e.g., the Dedicated Control Channel (DCCH) using acknowledged mode radio link control (AM RLC). Upon confirmation of successful delivery of the release indication message by the RLC, the procedure ends.

An IE "Signaling Connection Release Indication Cause is also used pursuant to an embodiment of the present disclosure. The release cause is aligned, for instance, with existing message definitions. The upper layer release cause message is structured, e.g., as:

| Information Element/Group name | Need | Multi | IE type and reference | Semantics description |
|---|---|---|---|---|
| Signaling Connection Release Indication Cause | MP | | Enumerated (UE Requested | |

| Information Element/Group name | Need | Multi | IE type and reference | Semantics description |
|---|---|---|---|---|
| | | | PS Data session end, T3310 expiry, T3330 expiry, T3340 expiry) | |

In this example, the T3310, T330, and T3340 expires correspond to expiration of correspondingly-numbered timers, identified previously. A cause value is settable, in one implementation, as a "UE Requested PS Data session end" rather than a "UE Requested idle transition" to remove the UE indication of a preference for an idle transition and provide for the UTRAN to decide upon the state transition, although the expected result corresponds to that identified by the cause value. The extension to the signaling connection release indication is preferably, but not necessarily, a non-critical extension.

Figure 9:
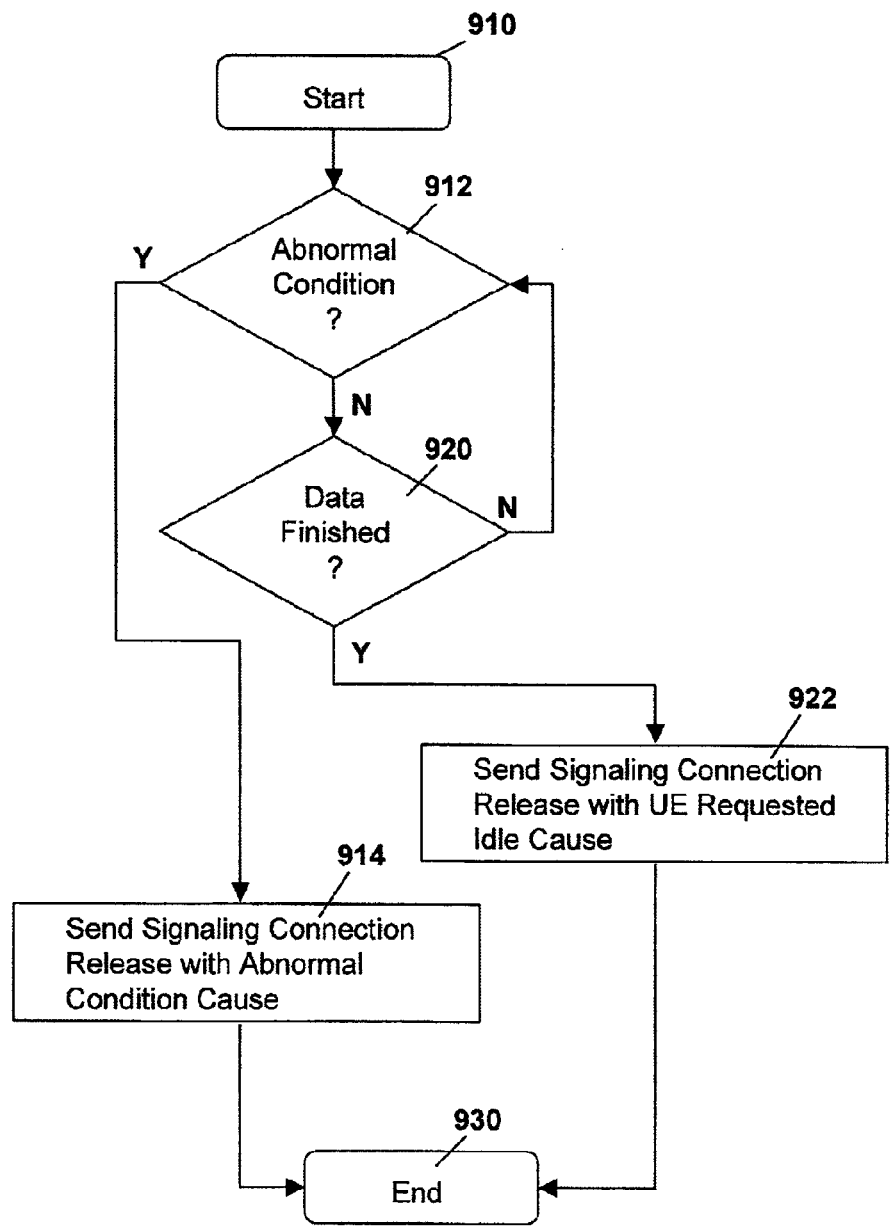
FIG. 9 is a flow diagram showing the steps of adding a cause for a signaling connection release indication at the UE.

Reference is now made to FIG. 9. FIG. 9 is a flow chart of an exemplary UE monitoring whether or not to send a signaling connection release indication for various domains (e.g. PS or CS). The process starts in step 910.

The UE transitions to step 912 in which it checks to see whether an abnormal condition exists. Such an abnormal condition can include, for example, timer T3310, timer T3320, or timer T3340 expiring as described above. If these timers expire a certain predetermined number of times or if an explicit rejection is received based on the expiry of any of these timers, the UE proceeds to step 914 in which it sends a signaling connection release indication. The SIGNALING CONNECTION RELEASE INDICATION message is appended with a signaling release indication cause field. The signaling release indication cause field includes at least that the signaling release indication is based on an abnormal condition or state and one embodiment includes the specific timer that timed out to result in the abnormal condition.

Conversely, if in steps 912 the UE finds that no abnormal condition exists, the UE proceeds to step 920 in which it checks whether further data is expected at the UE. This can, as described above, include when an email is sent and confirmation of the sending of the email is received back at the UE. Other examples of where the UE will determine that no further data is expected would be known to those skilled in the art.

If in step 920 the UE determines that the data transfer is finished (or in the case of a circuit switched domain that a call is finished) the UE proceeds to step 922 in which it sends a signaling connection release indication in which the signaling release indication cause field has been added and includes the fact that the UE requested an idle transition or simply indicate an end to the PS session.

From step 920, if the data is not finished the UE loops back and continues to check whether an abnormal condition exists in step 912 and whether the data is finished in step 920.

Once the signaling connection release indication is sent in step 914 or step 922, the process proceeds to step 930 and ends.

The UE includes functional elements, implementable, for instance, by applications or algorithms carried out through operation of a UE microprocessor or by hardware implementation, that form a checker and a transition indication sender. The checker is configured to check whether a transition indication should be sent. And, a transition indication sender is configured to send a transition indication responsive to an indication by the checker that the transition indication should be sent. The transition indication may include a transition indication cause field.

In one implementation, the network is, instead, implicitly made aware of timing out of a timer, and the UE need not send a cause value indicating the timing out of the timer. That is to say, the timer starts timing upon authorization of the network. Cause codes are defined, and the cause codes are provided by the network to the UE. Such cause codes are used by the UE to initiate the timer. The network is implicitly aware of the reason for subsequent timing out of the timer as the cause code sent earlier by the network causes the timer to start timing. As a result, the UE need not send a cause value indicating the timing out of the timer.

As suggested by FIG. 9 as well as the foregoing description, a cause is includable and sent together with a transition indication (e.g. a SIGNALING CONNECTION RELEASE INDICATION) to indicate: 1.) an abnormal condition as well as 2.) a normal condition (not an abnormal condition such as for example a request for a PS data session end and/or a transition to an idle mode)). In various implementations, therefore, operations at the UE provide for the adding of the cause to the transition indication to indicate an abnormal condition, or, alternately, to indicate a preference for a request of an idle transition or of a PS data session end, i.e., normal operation. Such operation, of course, also includes UE operation in which a cause is added to the transition indication only when an indication of an abnormal condition is to be made. And, conversely, such operation also includes UE operation in which a cause is added to a transition indication only to indicate normal, i.e., non-abnormal, operations and transactions. That is to say, with respect to FIG. 9, in such alternative operation, if, at step 912, an abnormal condition exists, the yes branch is taken to the step 914 while, if an abnormal condition does not exist, then the UE proceeds directly to the end step 930. Conversely, in the other such alternative operation, subsequent to the start step 912 a path is taken directly to the data finished step 920. If the data is finished, the yes branch is taken to the step 920 and, thereafter, to the step 930. If the data is not finished at the step 920, the no branch is taken back to the same step, i.e., step 920.

Figure 10:
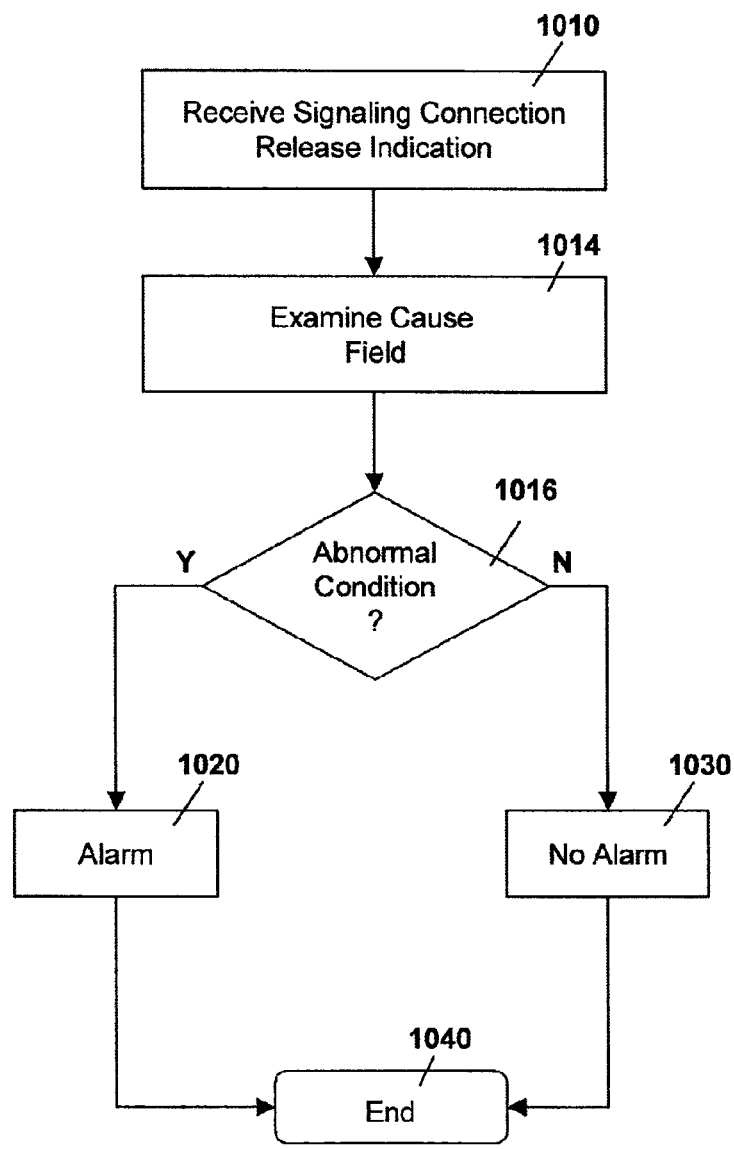
FIG. 10 is a flow diagram showing the steps taken by a UE upon receipt of a signaling connection release indication having a cause.

Referring to FIG. 10, when a network element receives the transition indication in step 1010 (e.g. a signaling connection release indication as shown), the network element examines the transition indication cause field if present in step 1014 and in step 1016 checks whether the cause is an abnormal cause or whether it is due to the UE requesting an idle transition and/or PS data session end. If, in step 1016, the signaling connection release indication is of abnormal cause, the network node proceeds to step 1020 in which an alarm may be noted for performance monitoring and alarm monitoring purposes. The key performance indicator can be updated appropriately.

Conversely, if in step 1016 the cause of the transition indication (e.g. signaling connection release indication) is not a result of an abnormal condition, or in other words is a result of the UE requesting a PS data session end or idle transition, the network node proceeds to step 1030 in which no alarm is raised and the indication can be filtered from the performance statistics, thereby preventing the performance statistics from being skewed. From step 1020 or step 1030 the network node proceeds to step 1040 in which the process ends.

The reception and examination of the transition indication may result in the initiation by the network element of packet switched data connection termination or alternatively to a transition into another more suitable state, for example CELL_FACH, CELL_PCH, URA_PCH or IDLE_MODE.

As suggested above, in some implementations, the absence of a cause in a transition indication may also be used to determine whether the transition indication is a result of a normal or an abnormal condition and whether an alarm must be raised. For example, if a cause is added only to denote normal conditions (i.e. non-abnormal such as for e.g. a request for PS data session end and/or transition to idle mode), and the network element receives a transition indication with no cause added, the network element may infer from the absence of a cause that the transition indication is a result of an abnormal condition and optionally raise an alarm. Conversely, in another example, if a cause is added only to denote abnormal conditions, and the network element receives a transition indication with no cause, the network element may infer from the absence of a cause that the transition indication is a result of a normal condition (e.g. request for PS data session end and/or transition to idle mode) and not raise an alarm.

As will be appreciated by those skilled in the art, step 1020 can be used to further distinguish between various alarm conditions. For example, a T3310 time out could be used to keep a first set of statistics and a T3330 time out could be used to keep a second set of statistics. Step 1020 can distinguish between the causes of the abnormal condition, thereby allowing the network operator to track performance more efficiently.

The network includes functional elements, implementable, for instance, by applications or algorithms carried out through operation of a processor or by hardware implementation, that form an examiner and an alarm generator. The examiner is configured to examine a transition indication cause field of the transition indication. The examiner checks whether the transition indication cause field indicates an abnormal condition. The alarm generator is configured to selectably generate an alarm if examination by the examiner determines the signaling connection release indication cause field indicates the abnormal condition.

In one implementation, upon reception of a signaling connection release indication, the UTRAN forwards the cause that is received and requests, from upper layers, for the release of the signaling connection. The upper layers then are able to initiate the release of the signaling connection. The IE signaling release indication cause indicates the UE's upper layer cause to trigger the RRC of the UE to send the message. The cause is possibly the result of an abnormal upper layer procedure. Differentiation of the cause of the message is assured through successful reception of the IE.

A possible scenario includes a scenario in which, prior to confirmation by the RLC of successful delivery of the SIGNALING CONNECTION RELEASE INDICATION message, reestablishment of the transmitting side of the RLC entity on the signaling radio bearer RB2 occurs. In the event of such an occurrence, the UE retransmits the SIGNALING CONNECTION RELEASE INDICATION message, e.g., on the uplink DCCH using AM RLC on signaling radio bearer RB2. In the event that an inter-RAT (radio access technology) handover from UTRAN procedure occurs prior to confirmation by the RLC of the successful delivery of the SIGNALING CONNECTION RELEASE INDICATION or request message, the UE aborts the signaling connection when in the new RAT.

In a further embodiment, instead of a "signaling connection release indication" or request, a "data transfer complete indication" could be utilized. Functionality similar to that described in FIGS. 9 and 10 above would be applicable to this data transfer complete indication.

In one embodiment, the data transfer complete indication is used by the UE to inform the UTRAN that the UE has determined that there is no on-going CS domain data transfer, and it has completed its PS data transfer. Such a message is sent from the UE to UTRAN on the DCCH using AM RLC, for example. An exemplary message is shown below.

10.2.x Data Transfer Complete Indication

This message is used by the UE to inform the UTRAN that the UE has determined that there is no on-going CS domain data transfer, and it has completed its PS data transfer.

RLC-SAP: AM
Logical channel: DCCH
Direction: UE→UTRAN

| Data Transfer Complete Indication | | | | |
|---|---|---|---|---|
| Information Element/Group name | Need | Multi | IE type and reference | Semantics description |
| Message Type | MP | | Message type | |
| UE Information Elements | | | | |
| Integrity check info | MP | | Integrity check info 10.3.3.16 | |

Figure 20:
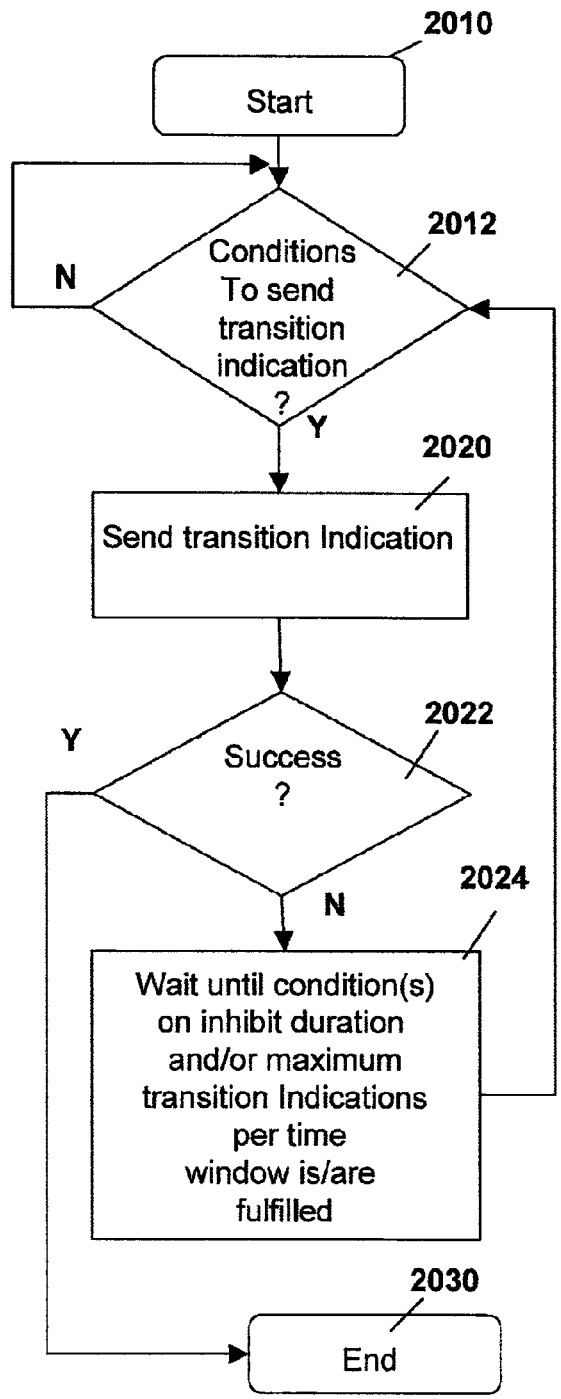
FIG. 20 illustrates a data flow diagram for the sending of a transition indication or request message.

Reference is now made to FIG. 20. FIG. 20 illustrates the embodiment within which a transition indication or request (for e.g. a signaling connection release indication or a data transfer complete indication) is sent from the UE to the UTRAN. The process starts at step 2010 and proceeds to step 2012 in which a check is made on the UE to determine whether the conditions at the UE are appropriate to send a transition indication message. Such conditions are described in the present disclosure, for example with reference to FIG. 11 below, and could include one or more applications on the UE determining that they are finished with data exchange. Such conditions may also include waiting for some time duration for the timer T3xx to expire if it is running.

In a further and alternative embodiment, the conditions may include precluding the sending of the transition indication if timer T3xx is set to infinity. As will be appreciated, T3xx could include a number of discrete values, one of which represents an infinity value.

If, in step 2012, the conditions are not appropriate to send the transition indication or request message, the process loops on itself and continues to monitor until conditions are appropriate to send the transition indication or request message.

Once the conditions are appropriate the process proceeds to step 2020 in which a transition indication is sent to the UTRAN. Exemplary indications are shown in the tables above.

The process then proceeds to step 2022 in which a check is made to determine whether the transition indication was successful. As would be appreciated by those skilled in the art this could mean that the UTRAN has successfully received the transition indication and has initiated a state transition. If yes, the process proceeds to step 2030 and ends.

Conversely, if it is determined in step 2022 that the transition indication was not successful the process proceeds to step 2024 and waits for a time period. Such a wait could be implemented using an "inhibit duration", e.g. T3xx, that would not allow the mobile to send another transition indication message before a given duration has elapsed. Alternatively, the process could limit the number of transition indication messages within a given time period (e.g. no more than 15 messages in 10 minutes). A combination of the inhibition duration and limiting the number of messages within a given time period is also possible.

The duration could be predetermined, such as a value defined in the standards, could be set by a network element, for example, as part of a RRC connection request, a RRC connection setup message, a RRC connection release, a radio bearer set up, a system information broadcast message, a system information block message, an ACTIVE SET UPDATE, a CELL UPDATE CONFIRM, UTRAN Mobility Information Message, a Handover to UTRAN Command, a Physical Channel Reconfiguration Message, a Radio Bearer Reconfiguration Message, a Radio Bearer Release Message, a Transport Channel Reconfiguration Message, or any request, configuration or reconfiguration message. Further, the duration could be set based on a parameter within the transition indication message. Thus, the duration could be longer if the UE is requesting a transition to Cell_PCH rather than Idle.

The signaling or sending of the duration by a network element could take the form of an information element. As used herein, signaling or sending could include directly sending the information to a UE, or broadcasting the information. Similarly, receiving at the UE could include direct reception or reading of a broadcast channel. One exemplary information element includes:

| Inhibit Transition Indication | | | | |
|---|---|---|---|---|
| Information Element/Group name | Need | Multi | Type and reference | Semantics description |
| Inhibit Transition Indication | MP | | Enumerated (T3xx, 1 spare value) | |

The values of T3xx, in one embodiment are defined as:

| T3xx Definition | | | | |
|---|---|---|---|---|
| Information Element/Group name | Need | Multi | Type and reference | Semantics description |
| T3xx | MD | | Enumerated (0, 30, 60, 90, 120, infinity) | Value in seconds. Two spare values are needed. The use of 0 seconds indicates no need to apply the inhibit timer, and may be sent to override a previous non 0 setting. The use of infinity indicates never send the Transition Indication Message. |

In one embodiment T3xx can be included in the existing UMTS Information Element "UE Timers and Constants in connected mode". This can therefore be broadcast in a cell by inclusion in System Information Block Type 1. In an alternative embodiment the timer value could also be signaled using other system information messages, such as SIB3 or SIB4, or either alternatively or additionally could be signaled with a dedicated UTRAN mobility information message.

As indicated in the Table above, the T3xx value can vary between set values and include a zero value or an infinity value. The zero value is used to indicate that no inhibition needs to occur. The infinity value indicates that a Transition Indication Message should never be sent.

In one mobility embodiment, the UE resets the T3xx value whenever a new network or cell is transitioned to. In this example, the value is set to infinity. This ensures that if a transitioning messages or Radio Bearer Messages does not contain an inhibit timer value then by default the UE is not to send the Transition Indication Message. Thus, for example, if the transition or Radio Bearer Messages do not contain an "Inhibit Transition Indication", the value of the timer is set to infinity and otherwise the value of the timer received in the indication replaces any previously stored value.

In another alternative embodiment the values of T3xx, are defined as follows. The inclusion of the timer T3xx is optional thereby ensuring that if not included the UE need not have to support configuring or using this timer:

| An alternative T3xx Definition | | | | |
|---|---|---|---|---|
| Information Element/Group name | Need | Multi | Type and reference | Semantics description |
| T3xx | OP | | Enumerated (0, 5, 10, 20, 30, 60, 90, 120) | Value in seconds. The use of 0 seconds indicates no need to apply the inhibit timer, and may be sent to override a previous non 0 setting. |

The reception of the inhibit timer in a cell is thus an indication to the UE that the cell recognizes the use of the transition indication message. The UE may determine, if initiated by the RRC or higher layers due to a determination of no more PS domain data for a prolonged duration, to signal a transition indication using a cause value. When the network receives a transition indication message (of whatever form, as captured in this document) with this cause value it may determine to signal to the UE a state transition change to a more battery efficient RRC State.

Whereas in an alternative embodiment when the inhibit timer is not received or read in a cell the UE can determine that the cause for sending the transition indication message, is not supported by the UTRAN. In this case the UE can determine to not configure a value for T3xx and also not to use the T3xx in relation to sending or inhibiting the sending of the transition indication message.

If the UE determines that the inhibit timer is omitted then it may omit to include the cause value from the transition indication message and just send the transition indication message, based on higher layer determining that it has no more PS data to transmit.

In an alternative embodiment the UE on determining that the inhibit timer is omitted the UE shall not initiate a transition indication based on higher layer determining that it has no more PS data to transmit.

In one embodiment of this described behavior, the transition indication message is the SIGNALING CONNECTION RELEASE INDICATION message.

In a first alternative embodiment, the reception of the inhibit timer in a cell is thus an indication that the cell recognizes the use of the transition indication messages. Where the sending of this message is permitted when the T3xx is not set to infinity value, then when the network receives a transition indication it may determine to signal to the UE a state transition to a more battery efficient RRC State (e.g. CELL_FACH, CELL_PCH, URA_PCH or IDLE_MODE).

In a particular example utilizing 3GPP TSG-RAN2 25.331 standard, the following is added to the sections identified below:

| Inhibit Transition Indication | | |
|---|---|---|
| Inhibit Transition Indication | OP | Inhibit Transition Indication 10.3.3.14b |

This is added to sections:
10.2.48.8.6 System Information Block Type 3;
10.2.48.8.7 System Information Block Type 4;
10.2.1 Active Set Update;
10.2.8 Cell Update Confirm;
10.2.16a Handover to UTRAN Command;
10.2.22 Physical Channel Reconfiguration;
10.2.27 Radio Bearer Reconfiguration;
10.2.30 Radio Bearer Release;
10.2.33 Radio Bearer Setup;
10.2.40 RRC Connection Setup;
10.2.50 Transport Channel Reconfiguration;

The messages described above, besides messages 10.2.48.8.6 System Information Block Type 3 and 10.2.48.8.7 System Information Block Type 4, are all examples of mobility information messages.

The above covers connections and system operations, as well as transitions between various cells, ensuring that a UE has an inhibit timer value if that cell supports the transition indication message. For example, the Handover to UTRAN Command ensures that a transition from another Radio Access Technology such as a second generation network to a third generation network will provide an inhibit timer value if supported by the third generation network's target cell.

Figure 21:
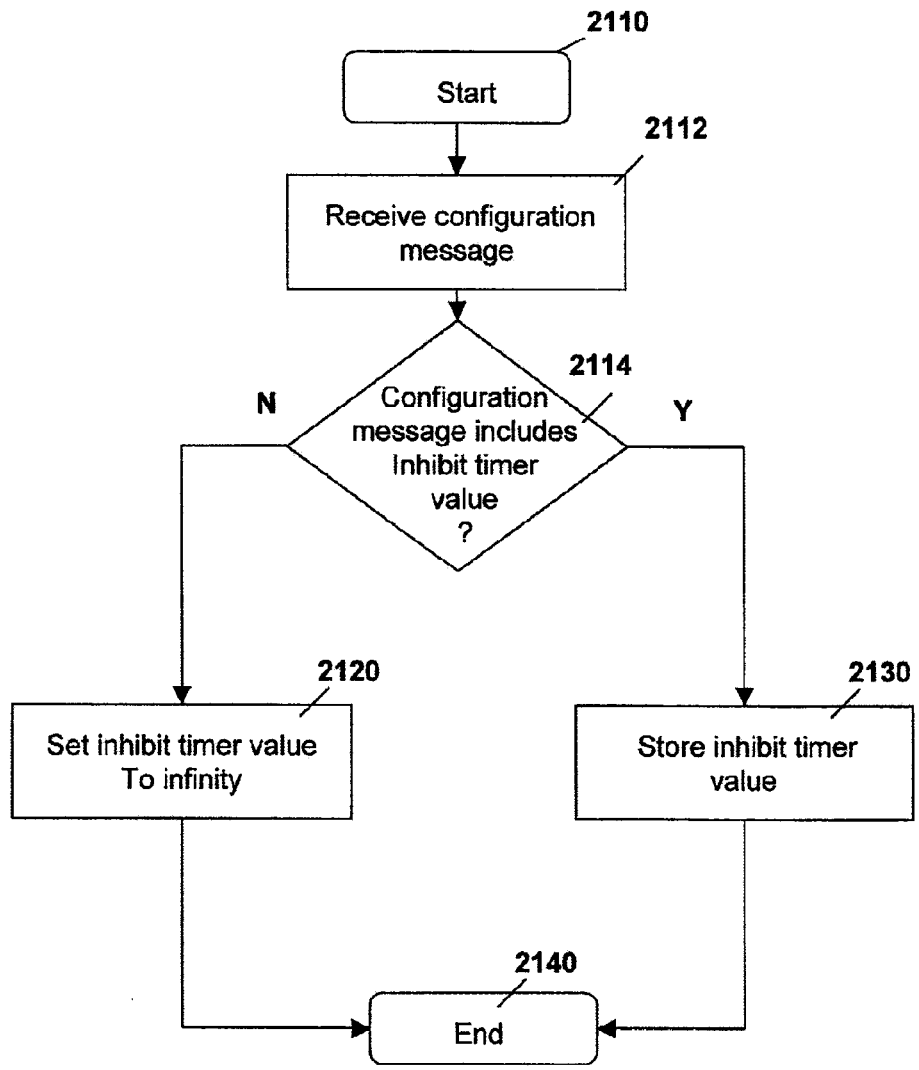
FIG. 21 illustrates a data flow diagram for setting an inhibit timer value at a UE.

In particular referring to FIG. 21, a transition between cells has occurred as a precondition or during other operation of the UE, as shown by reference numeral 2110 as 'Start'. The process proceeds to block 2112 in which a configuration message is received. This can be any of the messages identified above, and includes both mobility and non-mobility messages. The process then proceeds to block 2114 in which a check is made to see whether the configuration message includes an inhibit timer value.

If not, the process proceeds to block 2120 in which the inhibit timer value is set to infinity. Conversely, from block 2114 the process proceeds to block 2130 if it is determined that the configuration message does include an inhibit timer value. In block 2130 the inhibit timer value is stored on the UE, replacing the previous value for the inhibit timer. The process then proceeds to block 2140 and ends. As will be appreciated, in one embodiment the process of FIG. 21 is invoked whenever a change in network or cell occurs, or whenever a transition indication needs to be sent.

Once the process has waited for a predetermined time in step 2024 the process proceeds back to step 2012 to determine whether the conditions for sending a transition indication still exist. If yes, the process loops back to step 2020 and 2022.

Based on the above, the inhibit timer value may be provided in various embodiments. In a first embodiment it can be provided only using an RRC Connection Setup Message to convey an inhibit timer value.

In a second embodiment, system information can be used to convey the inhibit timer value.

In a third embodiment the RRC Connection Setup and System Information Messages can both be utilized to send the inhibit timer value to ensure that UEs in idle mode and Cell_PCH/Cell_FACH and DCH states have the latest information.

In a fourth embodiment the inhibit timer value can be sent as in the third embodiment, with the addition of sending an inhibit timer value in a Radio Bearer Setup so that when a PDP context is established having no Radio Bearer, when a Radio Bearer is subsequently established to send a data message the inhibit timer value can be conveyed at that time.

In a fifth embodiment the fourth embodiment can be combined with all mobility related messages as described above and including reconfiguration, cell update confirmation and a Handover to UTRAN command to convey the inhibit timer value.

In the first to fourth embodiments, during mobility the UE maintains its currently stored inhibit timer value. As indicated above, in some cases where the inhibit timer is set to infinity this may mean that the UE must wait for network timers to expire and for the network to move the UE to an RRC state where it can receive or determine a new value for the inhibit timer. In other cases where the inhibit timer is some value other than infinity before the handover, this other value is continued to be used until the UE is able to update the timer value to that indicated in the new cell.

For the fifth embodiment, the process FIG. 21 is utilized to ensure that the inhibit timer value is updated during mobility, and that transition indication messages are not sent unnecessarily from a UE.

An exception may occur on RLC re-establishment or inter-RAT change. If a re-establishment of the transmitting side of the RLC entity occurs before the successful delivery of the transition indication message has been confirmed by the RLC, in one embodiment the UE retransmits the transition indication message on the uplink DCCH using AM RLC.

In one embodiment, if an inter-RAT handover from UTRAN procedure occurs before the successful delivery of the transition indication message has been confirmed by the RLC the UE aborts the signaling connection while in the new RAT.

On the network side, the process is handled similarly to that described with reference to FIG. 18 below.

Referring again to FIG. 1, in some cases it may be more desirable to be in the connected mode 120 in a state such as URA_PCH state 128 than in idle mode 110. For example, if the latency for connection to the CELL_DCH state 122 or the CELL_FACH state 124 in connected mode 120 is required to be lower, it is preferable to be in a connected mode 120 PCH state. There are a number of ways of accomplishing this such as, for example, by amending standards to allow for the UE to request the UTRAN move it to a specific state (e.g. in this case the URA_PCH state 128).

Alternatively, the connection manager may take into account other factors such as what state the RRC connection is currently in. If, for example, the RRC connection is in the URA_PCH state it may decide that it is unnecessary to move to idle mode 110 and thus no signaling connection release procedure is initiated.

In a further alternative, the network element (e.g. the UTRAN) may itself take into account other factors such as what state the RRC connection is currently in and if, for example, the RRC connection is in the URA_PCH state it may decide that it is unnecessary to move to idle mode 110 and instead simply transition the UE into a more suitable state instead of releasing the connection.

Figure 4A:
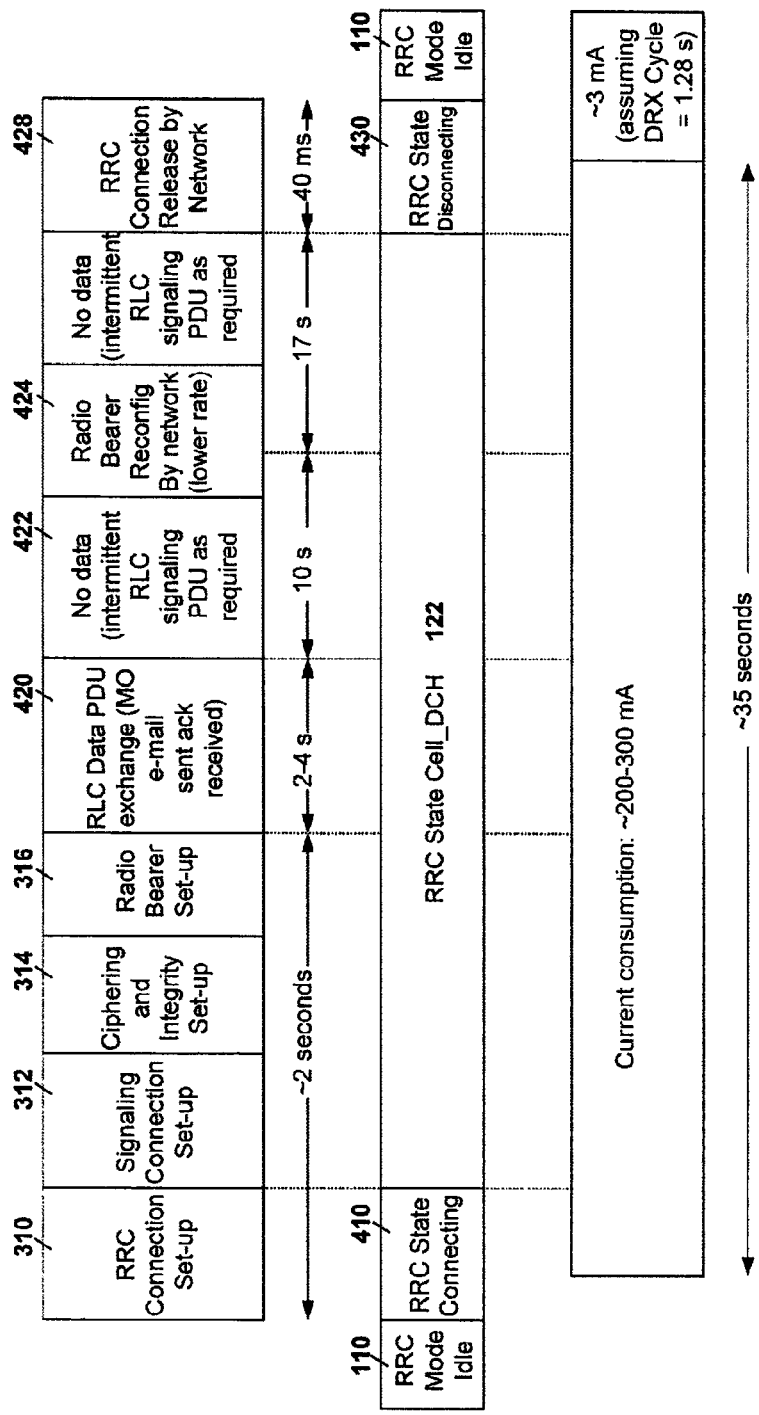
FIG. 4A is a block diagram of an exemplary transition between a CELL_DCH connected mode state and an idle mode initiated by the UTRAN according to current method.

Reference is made to FIG. 4. FIG. 4A shows a current UMTS implementation according to the infrastructure "four" example above. As illustrated in FIG. 4, time is across the horizontal axes.

The UE starts in RRC idle state 110 and based on local or mobile generated data needing to be transmitted or a page received from the UTRAN, starts to establish an RRC connection.

As illustrated in FIG. 4A, RRC connection setup 310 occurs first, and the RRC state is in a connecting state 410 during this time.

Next, signaling connections setup 312, ciphering and integrity setup 314, and radio bearer setup 316 occurs. The RRC state is CELL_DCH state 122 during these procedures. As illustrated in FIG. 4A, the elapsed time for moving from RRC idle to the time that the radio bearer is setup is approximately two seconds in this example.

Data is next exchanged. In the example of FIG. 4A this is achieved in about two to four seconds and is illustrated by step 420.

After data is exchanged in step 420, no data is being exchanged except for intermittent RLC signaling PDU as required and thus the radio resource is reconfigured by the network to move into a lower data rate DCH configuration after approximately ten seconds. This is illustrated in steps 422 and 424.

In the lower data rate DCH configuration, nothing is received for seventeen seconds, at which point the RRC connection is released by the network in step 428.

Once the RRC connection release is initiated in step 428, the RRC state proceeds to a disconnecting state 430 for approximately forty milliseconds, after which the UE is in a RRC idle state 110.

Also illustrated in FIG. 4A, the UE current consumption is illustrated for the period in which the RRC is in CELL_DCH state 122. As seen, the current consumption is approximately 200 to 300 milliamps for the entire duration of the CELL_DCH state. During disconnect and idle, about 3 milliamps are utilized, assuming a DRX cycle of 1.28 seconds. However, the 35 seconds of current consumption at 200 to 300 milliamps is draining on the battery.

Figure 4B:
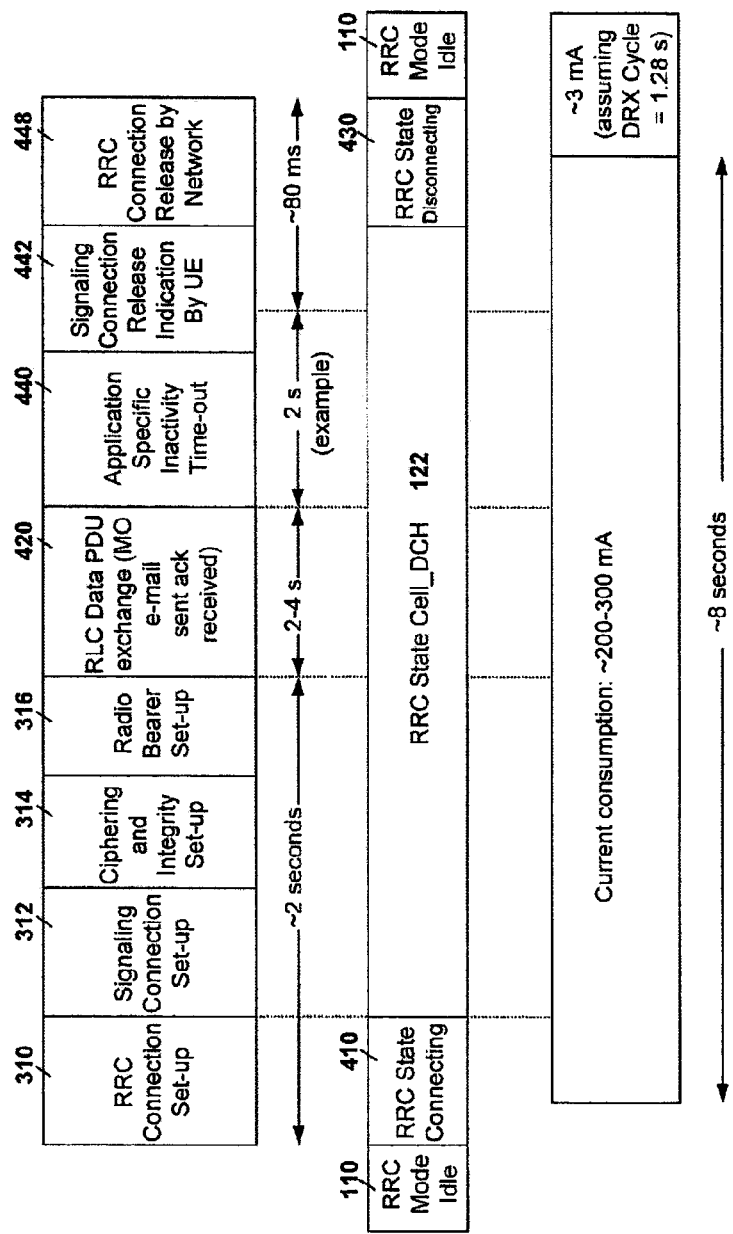
FIG. 4B is a block diagram showing an exemplary transition between a CELL_DCH state connected mode transition to an idle mode utilizing signaling release indications.

Reference is now made to FIG. 4B. FIG. 4B utilizes the same exemplary infrastructure "four" from above, only now implementing the signaling connection release As illustrated in FIG. 4B, the same setup steps 310, 312, 314 and 316 occur and this takes the same amount of time when moving between RRC idle state 110 and RRC CELL_DCH state 122.

Further, the RRC data PDU exchange for the exemplary email at step 420 of FIG. 4A is also done at FIG. 4B and this takes approximately two to four seconds.

The UE in the example of FIG. 4B has an application specific inactivity timeout, which in the example of FIG. 4B is two seconds and is illustrated by step 440. After the connection manager has determined that there is inactivity for the specific amount of time, the UE sends a transition indication, which in this case is a signaling connection release indication in step 442 and in step 448, the network proceeds, based on the receipt of the indication and on a radio resource profile for the UE, to release the RRC connection.

As illustrated in FIG. 4B, the current consumption during the CELL_DCH step 122 is still about 200 to 300 milliamps. However, the connection time is only about eight seconds. As will appreciated by those skilled in the art, the considerably shorter amount of time that the mobile stays in the cell DCH state 122 results in significant battery savings for UE device.

Reference is now made to FIG. 5. FIG. 5 shows a second example using the infrastructure indicated above as Infrastructure "three". As with FIGS. 4A and 4B, a connection setup occurs which takes approximately two seconds. This requires the RRC connection setup 310, the signaling connection setup 312, the ciphering and integrity setup 314 and the radio bearer setup 316.

During this setup, the UE moves from RRC idle mode 110 to a CELL_DCH state 122 with a RRC state connecting step 410 in between.

Figure 5A:
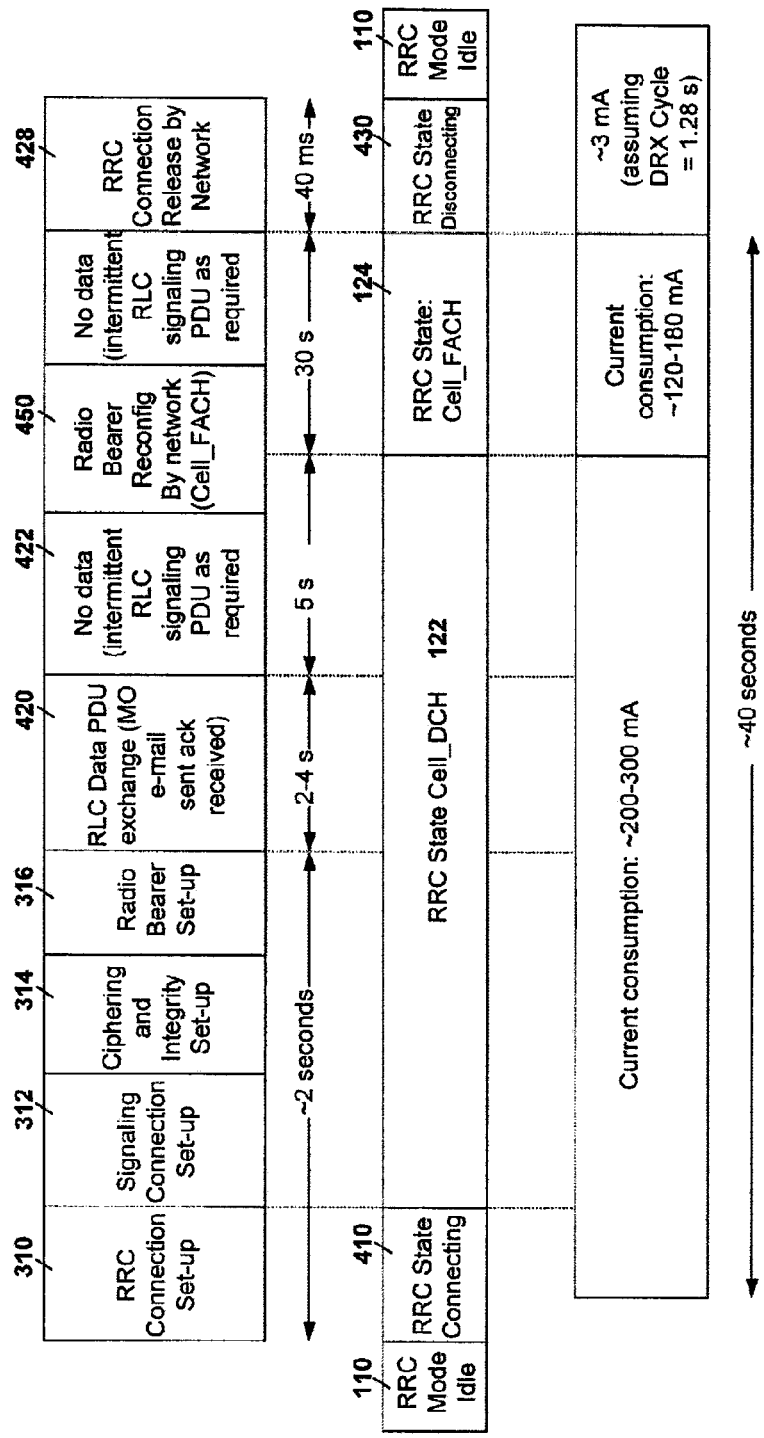
FIG. 5A is a block diagram of an exemplary transition between a CELL_DCH inactivity state to a CELL_FACH inactivity state to an idle mode initiated by the UTRAN.

As with FIG. 4A, in FIG. 5A RLC data PDU exchange occurs at step 420, and in the example of FIG. 5A takes two to four seconds.

According to the infrastructure three, RLC signaling PDU exchange receives no data and thus is idle for period of five seconds in step 422, except for intermittent RLC signaling PDU as required, at which point the radio resource reconfigures the UE to move into a CELL_FACH state 124 from CELL_DCH state 122. This is done in step 450.

In the CELL_FACH state 124, the RLC signaling PDU exchange finds that there is no data except for intermittent RLC signaling PDU as required for a predetermined amount of time, in this case thirty seconds, at which point a RRC connection release by network is performed in step 428.

As seen in FIG. 5A, this moves the RRC state to idle mode 110.

As further seen in FIG. 5A, the current consumption during the DCH mode is between 200 and 300 milliamps. When moving into CELL_FACH state 124 the current consumption lowers to approximately 120 to 180 milliamps. After the RRC connector is released and the RRC moves into idle mode 110 the power consumption is approximately 3 milliamps.

The UTRA RRC Connected Mode state being CELL_DCH state 122 or CELL_FACH state 124 lasts for approximately forty seconds in the example of FIG. 5A.

Figure 5B:
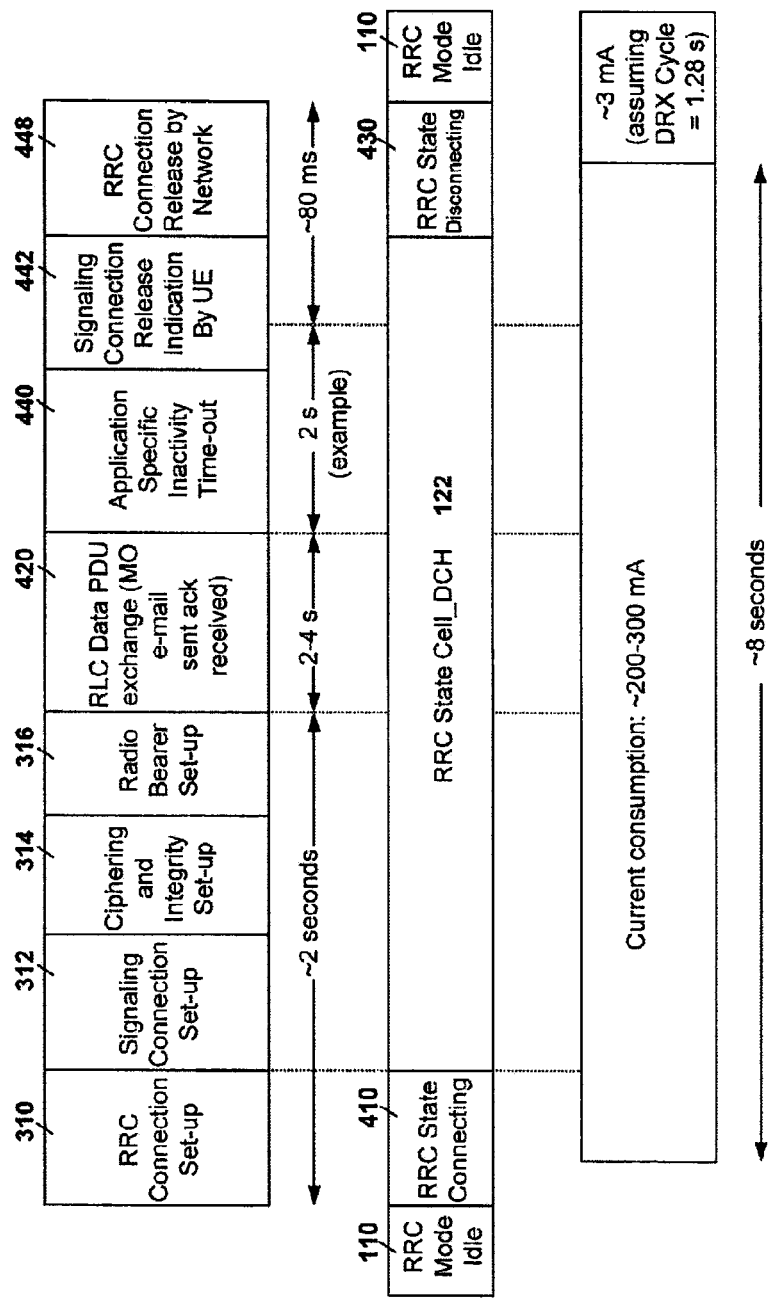
FIG. 5B is a block diagram of an exemplary transition between CELL_DCH inactivity state and an idle mode utilizing signaling release indications.

Reference is now made to FIG. 5B. FIG. 5B illustrates the same infrastructure "three" as FIG. 5A with the same connection time of about two seconds to get the RRC connection setup 310, signaling connection setup 312, ciphering integrity setup 314 and radio bearer setup 316. Further, RLC data PDU exchange 420 take approximately two to four seconds.

As with FIG. 4B, a UE application detects a specific inactivity timeout in step 440, at which point the transition indication (e.g. signaling connection release indication 442) is sent by the UE and as a consequence, the network releases the RRC connection in step 448.

As can be seen further in FIG. 5B, the RRC starts in a idle mode 110, moves to a CELL_DCH state 122 without proceeding into the CELL_FACH state.

As will be seen further in FIG. 5B, current consumption is approximately 200 to 300 milliamps in the time that the RRC stage is in CELL_DCH state 122 which according to the example of FIG. 5 is approximate eight seconds.

Therefore, a comparison between FIGS. 4A and 4B, and FIGS. 5A and 5B shows that a significant amount of current consumption is eliminated, thereby extending the battery life of the UE. As will be appreciated by those skilled in the art, the above can further be used in the context of current 3GPP specs.

Figure 6:
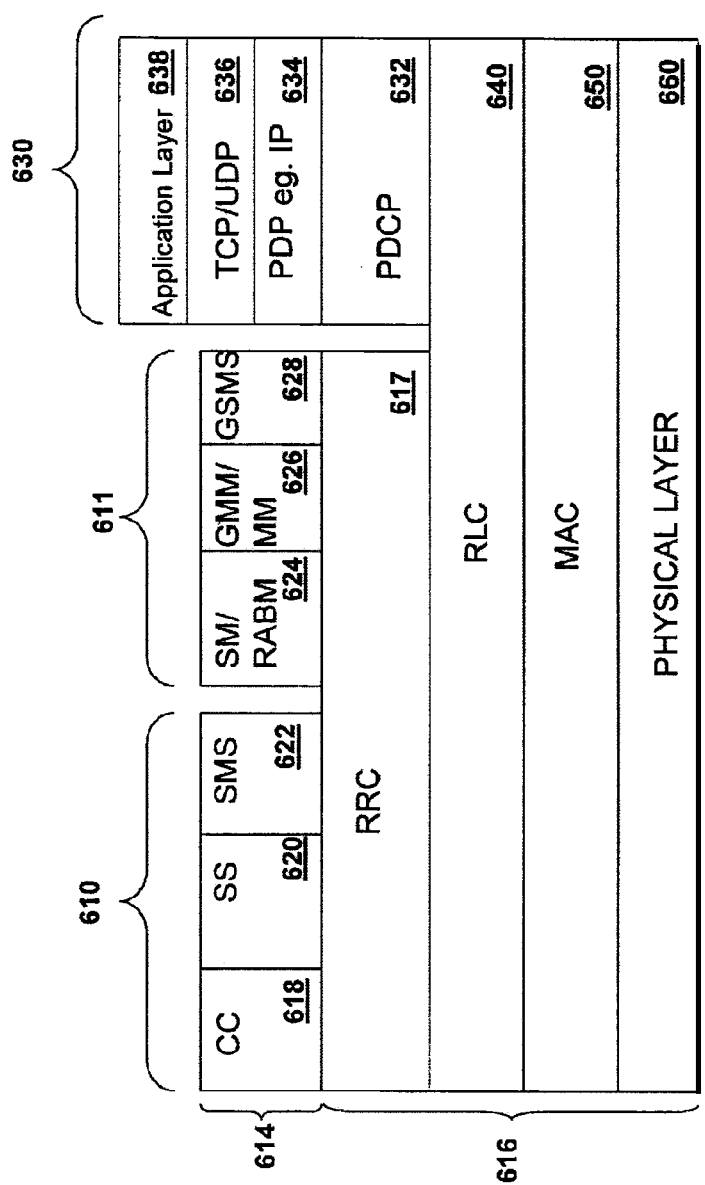
FIG. 6 is a block diagram of a UMTS protocol stack.

Reference is now made to FIG. 6. FIG. 6 illustrates a protocol stack for a UMTS network.

As seen in FIG. 6, the UMTS includes a CS control plane 610, PS control plane 611, and PS user plane 630

Within these three planes, a non-access stratum (NAS) portion 614 and an access stratum portion 616 exist.

NAS portion 614 in CS control plane 610 includes a call control (CC) 618, supplementary services (SS) 620, and short message service (SMS) 622.

NAS portion 614 in PS control plane 611 includes both mobility management (MM) and GPRS mobility management (GMM) 626. It further includes session management/radio access bearer management SM/RABM 624 and GSMS 628.

CC 618 provides for call management signaling for circuit switched services. The session management portion of SM/RABM 624 provides for PDP context activation, deactivation and modification. SM/RABM 624 also provides for quality of service negotiation.

The main function of the RABM portion of the SM/RABM 624 is to connect a PDP context to a Radio Access Bearer. Thus SM/RABM 624 is responsible for the setup, modification and release of radio resources.

CS control plane 610 and PS control plane 611, in the access stratum 616 sit on radio resource control (RRC) 617.

NAS portion 614 in PS user plane 630 includes an application layer 638, TCP/UDP layer 636, and PDP layer 634. PDP layer 634 can, for example, include Internet Protocol (IP).

Access Stratum 616, in PS user plane 630 includes packet data convergence protocol (PDCP) 632. PDCP 632 is designed to make the WCDMA protocol suitable to carry TCP/IP protocol between UE and RNC (as seen in FIG. 8), and is optionally for IP traffic stream protocol header compression and decompression.

The UMTS Radio Link Control (RLC) 640 and Medium Access Control (MAC) layers 650 form the data link sublayers of the UMTS radio interface and reside on the RNC node and the User Equipment.

The Layer 1 (L1) UMTS layer (physical layer 660) is below the RLC/MAC layers 640 and 650. This layer is the physical layer for communications.

Figure 7:
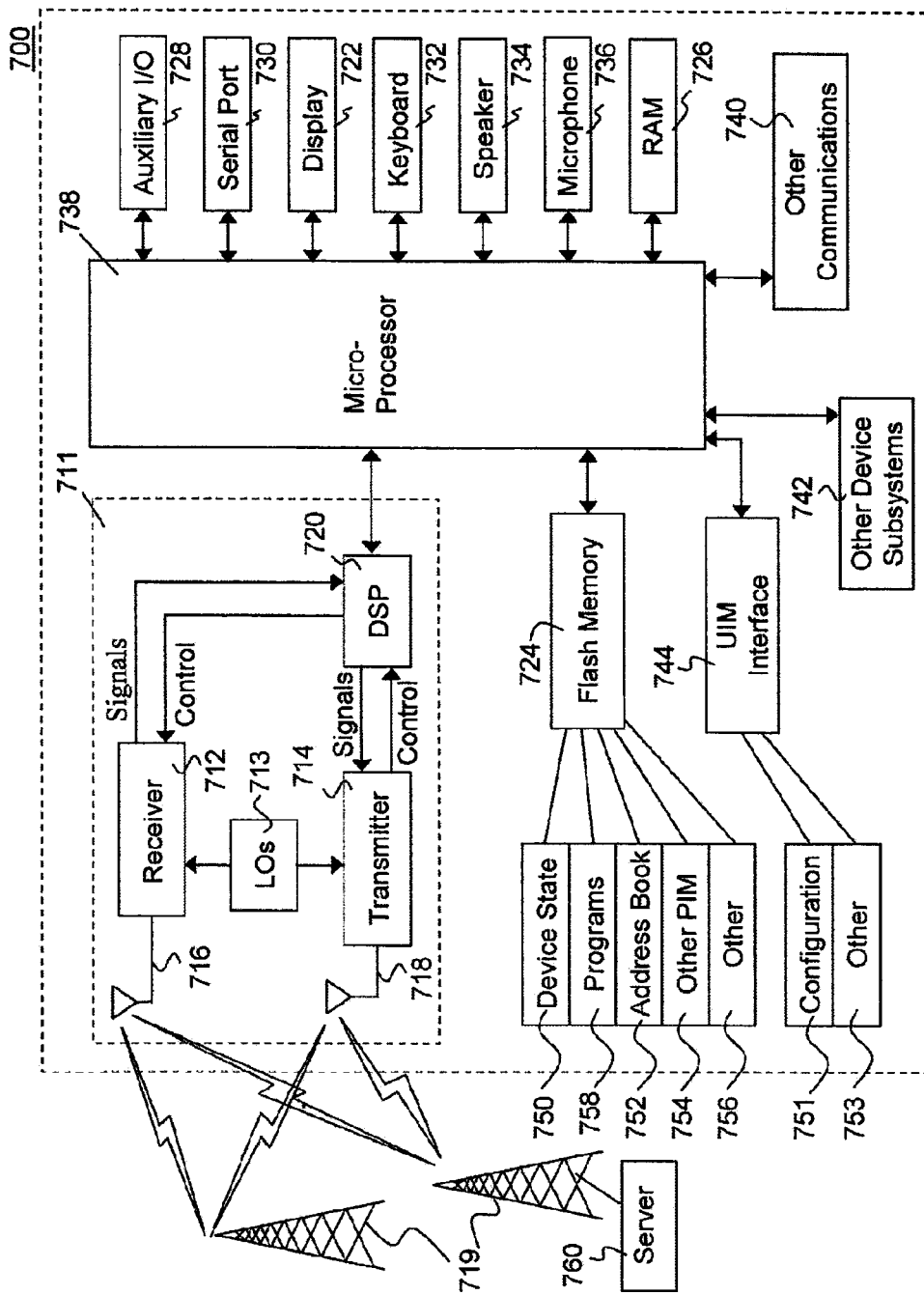
FIG. 7 is an exemplary UE that can be used in association with the present method.

While the above can be implemented on a variety of mobile or wireless devices, an example of one mobile device is outlined below with respect to FIG. 7. Reference is now made to FIG. 7.

UE 700 is preferably a two-way wireless communication device having at least voice and data communication capabilities. UE 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, UE 700 may include a communication subsystem 711 designed to operate within the GPRS network or UMTS network.

Network access requirements will also vary depending upon the type of network 719. For example, In UMTS and GPRS networks, network access is associated with a subscriber or user of UE 700. For example, a GPRS mobile device therefore requires a subscriber identity module (SIM) card in order to operate on a GPRS network. In UMTS a USIM or SIM module is required. In CDMA a RUIM card or module is required. These will be referred to as a UIM interface herein. Without a valid UIM interface, a mobile device may not be fully functional. Local or non-network communication functions, as well as legally required functions (if any) such as emergency calling, may be available, but mobile device 700 will be unable to carry out any other functions involving communications over the network 700. The UIM interface 744 is normally similar to a card-slot into which a card can be inserted and ejected like a diskette or PCMCIA card. The UIM card can have approximately 64K of memory and hold many key configurations 751, and other information 753 such as identification, and subscriber related information.

When required network registration or activation procedures have been completed, UE 700 may send and receive communication signals over the network 719. Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Network 719 may further communicate with multiple systems, including a server 760 and other elements (not shown). For example, network 719 may communicate with both an enterprise system and a web client system in order to accommodate various clients with various service levels.

UE 700 preferably includes a microprocessor 738, which controls the overall operation of the device. Communication functions, including at least data communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726. Further, a unique identifier is also preferably stored in read-only memory.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile device. A predetermined set of applications that control basic operations, including at least data and voice communication applications for example, will normally be installed on UE 700 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the UE 700. These applications will however, according to the above, in many cases need to be approved by a carrier.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of UE 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of UE 700 is similar, except that received signals would preferably be output to a speaker 734 and signals for transmission would be generated by a microphone 736. Alternative voice or audio I/O subsystems, such as a voice message recording subsystem, may also be implemented on UE 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable. Such a port 730 would enable a user to set preferences through an external device or software application and would extend the capabilities of mobile device 700 by providing for information or software downloads to UE 700 other than through a wireless communication network. The alternate download path may for example be used to load an encryption key onto the device through a direct and thus reliable and trusted connection to thereby enable secure device communication.

Alternatively, serial port 730 could be used for other communications, and could include as a universal serial bus (USB) port. An interface is associated with serial port 730.

Other communications subsystems 740, such as a short-range communications subsystem, is a further optional component which may provide for communication between UE 700 and different systems or devices, which need not necessarily be similar devices. For example, the subsystem 740 may include an infrared device and associated circuits and components or a Bluetooth™ communication module to provide for communication with similarly enabled systems and devices.

Reference is now made to FIG. 8. FIG. 8 is a block diagram of a communication system 800 that includes a UE 802 which communicates through the wireless communication network.

UE 802 communicates wirelessly with one or multiple Node Bs 806. Each Node B 806 is responsible for air interface processing and some radio resource management functions. Node B 806 provides functionality similar to a Base Transceiver Station in a GSM/GPRS networks.

The wireless link shown in communication system 800 of FIG. 8 represents one or more different channels, typically different radio frequency (RF) channels, and associated protocols used between the wireless network and UE 802. A Uu air interface 804 is used between UE 802 and Node B 806.

An RF channel is a limited resource that must be conserved, typically due to limits in overall bandwidth and a limited battery power of UE 802. Those skilled in art will appreciate that a wireless network in actual practice may include hundreds of cells depending upon desired overall expanse of network coverage. All pertinent components may be connected by multiple switches and routers (not shown), controlled by multiple network controllers.

Each Node B 806 communicates with a radio network controller (RNC) 810. The RNC 810 is responsible for control of the radio resources in its area. One RNC 810 controls multiple Node Bs 806.

The RNC 810 in UMTS networks provides functions equivalent to the Base Station Controller (BSC) functions in GSM/GPRS networks. However, an RNC 810 includes more intelligence, including, for example, autonomous handovers management without involving MSCs and SGSNs.

The interface used between Node B 806 and RNC 810 is an Iub interface 808. An NBAP (Node B application part) signaling protocol is primarily used, as defined in 3GPP TS 25.433 V3.11.0 (2002-09) and 3GPP TS 25.433 V5.7.0 (2004-01).

Universal Terrestrial Radio Access Network (UTRAN) 820 comprises the RNC 810, Node B 806 and the Uu air interface 804.

Circuit switched traffic is routed to Mobile Switching Centre (MSC) 830. MSC 830 is the computer that places the calls, and takes and receives data from the subscriber or from PSTN (not shown).

Traffic between RNC 810 and MSC 830 uses the Iu-CS interface 828. Iu-CS interface 828 is the circuit-switched connection for carrying (typically) voice traffic and signaling between UTRAN 820 and the core voice network. The main signaling protocol used is RANAP (Radio Access Network Application Part). The RANAP protocol is used in UMTS signaling between the Core Network 821, which can be a MSC 830 or SGSN 850 (defined in more detail below) and UTRAN 820. RANAP protocol is defined in 3GPP TS 25.413 V3.11.1 (2002-09) and TS 25.413 V5.7.0 (2004-01).

For all UEs 802 registered with a network operator, permanent data (such as UE 802 user's profile) as well as temporary data (such as UE's 802 current location) are stored in a home location registry (HLR) 838. In case of a voice call to UE 802, HLR 838 is queried to determine the current location of UE 802. A Visitor Location Register (VLR) 836 of MSC 830 is responsible for a group of location areas and stores the data of those mobile stations that are currently in its area of responsibility. This includes parts of the permanent mobile station data that have been transmitted from HLR 838 to the VLR 836 for faster access. However, the VLR 836 of MSC 830 may also assign and store local data, such as temporary identifications. UE 802 is also authenticated on system access by HLR 838.

Packet data is routed through Service GPRS Support Node (SGSN) 850. SGSN 850 is the gateway between the RNC and the core network in a GPRS/UMTS network and is responsible for the delivery of data packets from and to the UEs within its geographical service area. Iu-PS interface 848 is used between the RNC 810 and SGSN 850, and is the packet-switched connection for carrying (typically) data traffic and signaling between the UTRAN 820 and the core data network. The main signaling protocol used is RANAP (described above).

The SGSN 850 communicates with the Gateway GPRS Support Node (GGSN) 860. GGSN 860 is the interface between the UMTS/GPRS network and other networks such as the Internet or private networks. GGSN 860 is connected to a public data network PDN 870 over a Gi interface.

Those skilled in art will appreciate that wireless network may be connected to other systems, possibly including other networks, not explicitly shown in FIG. 8. A network will normally be transmitting at very least some sort of paging and system information on an ongoing basis, even if there is no actual packet data exchanged. Although the network consists of many parts, these parts all work together to result in certain behaviours at the wireless link.

Figure 11:
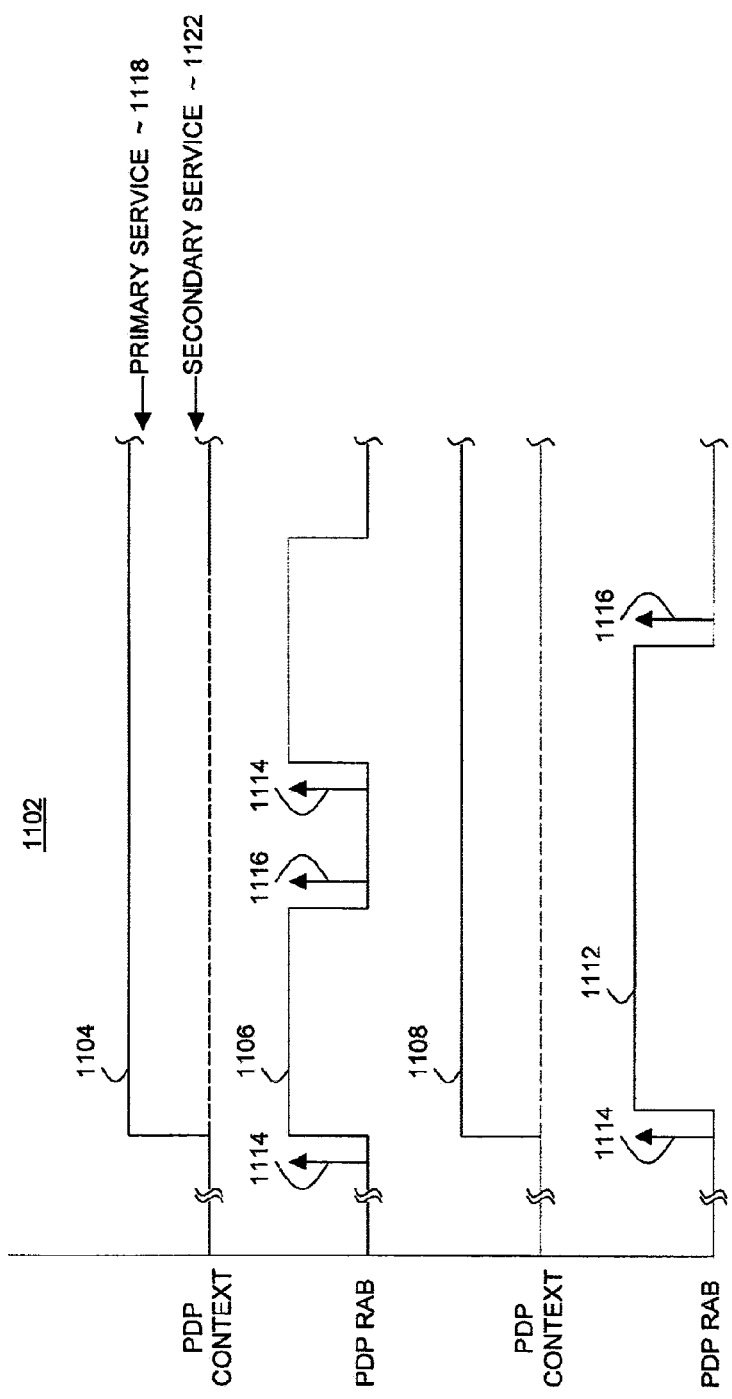
FIG. 11 illustrates a graphical representation of exemplary logical and physical channel allocation during exemplary operation of the network shown in FIG. 8 in which multiple, concurrent packet data communication service sessions are provided with the UE.

FIG. 11 illustrates a representation, shown generally at 1102, representative of operation of the UE pursuant to multiple, concurrent packet data communication service sessions. Here, two packet data services, each associated with a particular PDP context designated as $PDP_1$ and $PDP_2$ are concurrently active. The plot 1104 represents the PDP context activated to the first packet data service, and the plot 1106 represents the radio resource allocated to the first packet data service. And, the plot 1108 represents the PDP context activated to the second packet data service, and the plot 1112 represents the radio resource allocated to the second packet data service. The UE requests radio access bearer allocation by way of a service request, indicated by the segments 1114. And, the UE also requests radio bearer service release, indicated by the segments 1116 pursuant to an embodiment of the present disclosure. The service requests and service releases for the separate services are independent of one another, that is to say, are generated independently. In the exemplary illustration of FIG. 11, the PDP context and the radio resource for the associated PDP context are assigned at substantially concurrent times. And, the radio resource release is granted upon request by the UE, as shown, or when the RNC (Radio Network Controller) decides to release the radio resource.

Responsive to a radio resource release request, or other decision to release the radio resource, the network selectably tears down the radio resource associated with the packet data service. Radio release requests are made on a radio access bearer-by-radio access bearer basis and not on an entire signaling connection basis, thereby permitting improved granularity control of resource allocation.

In the exemplary implementation, a single packet data service is further formable as a primary service and one or more secondary services, such as indicated by the designations 1118 and 1122. The radio resource release is further permitting of identifying which of one or more primary and secondary services whose radio resource allocations are no longer needed, or otherwise are desired to be released. Efficient radio resource allocation is thereby provided. In addition, optimal utilization of the processor on the UE is provided since the processor power that would have been allocated to unnecessary processing can now be better utilized for other purposes.

Figure 12:
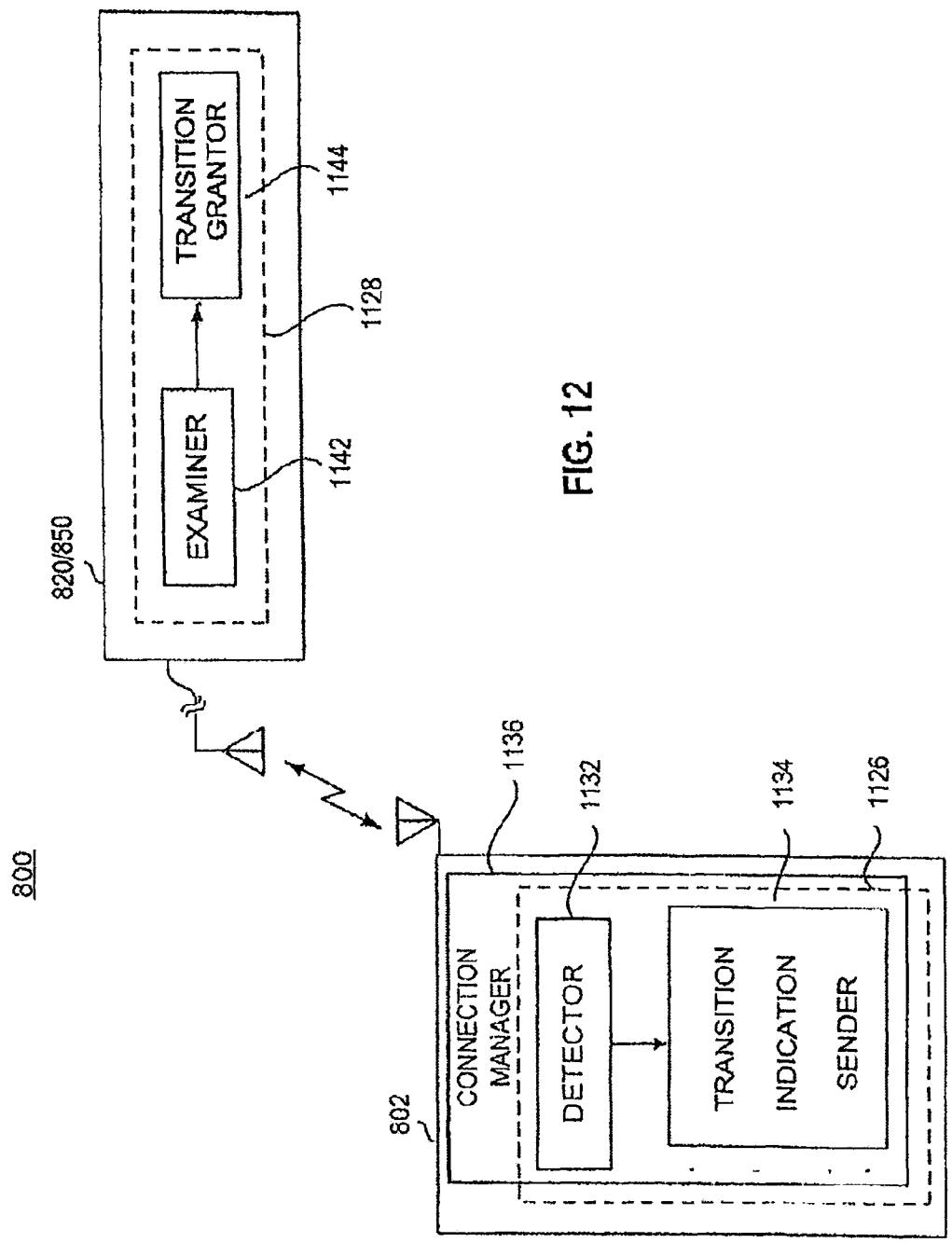
FIG. 12 illustrates a functional block diagram of UE and network elements that provide for radio resource release function to release radio resources of individual packet data services pursuant to an embodiment of the present disclosure.

FIG. 12 illustrates parts of the communication system 800, namely, the UE 802 and the radio network controller (RNC)/SGSN 810/850 that operate pursuant to an embodiment of the present disclosure pertaining to the multiple, contiguous packet data service sessions. The UE includes apparatus 1126 and the RNC/SGSN includes apparatus 1128 of an embodiment of the present disclosure. The elements forming the apparatus 1126 and 1128 are functionally represented, implementable in any desired manner, including by algorithms executable by processing circuitry as well as hardware or firmware implementations. The elements of the apparatus 1128, while represented to be embodied at the RNC/SGSN, are, in other implementations, formed elsewhere at other network locations, or distributed across more than one network location.

The apparatus 1126 includes a detector 1132 and a transition indication sender 1134. In one exemplary implementation, the elements 1132 and 1134 are embodied at a session management layer, e.g., the Non-Access Stratum (NAS) layer defined in UMTS, of the UE.

In another exemplary implementation, the elements are embodied at an Access Stratum (AS) sublayer. When implemented at the AS sublayer, the elements are implemented as part of a connection manager, shown at 1136. When implemented in this manner, the elements need not be aware of the PDP context behavior or of the application layer behavior.

The detector detects when a determination is made to send a transition indication associated with a packet communication service. The determination is made, e.g., at an application layer, or other logical layer, and provided to the session management layer and the detector embodied thereat. Indications of detections made by the detector are provided to the radio resource release indication sender. The sender generates and causes the UE to send a transition indication that forms the service release request 1116, shown in FIG. 11.

In a further implementation, the transition indication includes a cause field containing a cause, such as any of the aforementioned causes described here and above, as appropriate or the cause field identifies a preferred state into which the UE prefers the network to cause the UE to be transitioned.

The apparatus 1128 embodied at the network includes an examiner 1142 and a grantor 1144. The examiner examines the transition indication, when received thereat. And, the transition grantor 1144 operates selectably to transition the UE as requested in the transition indication.

In an implementation in which the signaling is performed at a radio resource control (RRC) layer, the radio network controller (RNC), rather than the SGSN performs the examination and transitioning of the UE. And, correspondingly, the apparatus embodied at the UE is formed at the RRC layer, or the apparatus otherwise causes the generated indication to be sent at the RRC level.

In an exemplary control flow, a higher layer informs the NAS/RRC layer, as appropriate, that the radio resource is allocated to a particular PDP context is no longer required. An RRC-layer indication message is sent to the network. The message includes an RAB ID or RB ID that, e.g., identifies the packet data service, to the radio network controller. And, in response, operation of the radio network controller triggers a procedure to resolve to end the radio resource release, radio resource reconfiguration, or radio resource control (RRC) connection release message to be returned to the UE. The RNC procedure is, e.g., similar, or equivalent to, the procedure set forth in 3GPP document TS 23.060, Section 9.2.5. The RAB ID is, e.g., advantageously utilized as the ID is the same as the Network Service Access Point Identifier (NSAPI) which identifies the associated PDP context, and application layers are generally aware of the NSAPI.

In a specific example, a radio resource release indication formed at, or otherwise provided to the RRC layer, and sent at the RRC layer is represented, together with associated information, below. The indication when embodied at the RRC layer is also referred to as, e.g., a radio resource release indication.

| Information Element/ Group name | Need | Multi | IE type and reference | Semantics description |
|---|---|---|---|---|
| Message Type | MP | | Message type | |
| UE Information Elements | | | | |
| Integrity check info | CH | | Integrity check info | |
| RAB Information | | | | |
| RAB List for release indication | MP | 1 to maxRABIDs | | |
| >RAB ID for release indication | MP | | RAB ID | |
| Preferred RRC state | OP | | RRC state | |

Figure 13:
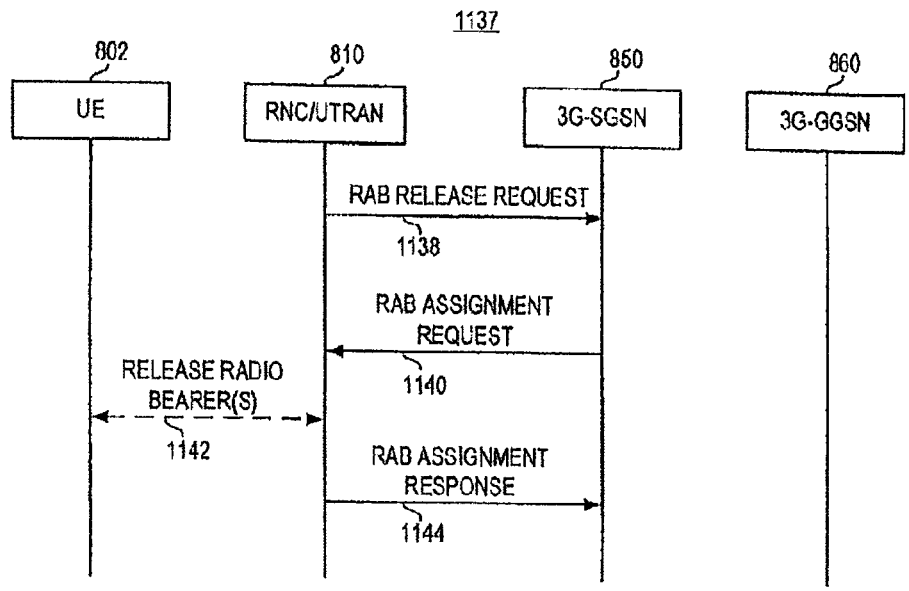
FIG. 13 illustrates a message sequence diagram representative of signaling generated pursuant to operation of an embodiment of the present disclosure by which to release radio resource allocation to a PDP context.

FIG. 13 illustrates a message sequence diagram, shown generally at 1137, representing exemplary signaling generated pursuant to release of radio resources associated with a PDP context, such as that shown graphically in part of the graphical representation shown in FIG. 11. Release is initiated either by the UE or at the RNC, or other UTRAN entity. When initiated at the UE, e.g., the UE sends a radio resource release indication to the UTRAN.

Upon initiation, a radio access bearer (RAB) release request is generated, and sent, indicated by the segment 1138 by the RNC/UTRAN and delivered to the SGSN. In response, an RAB assignment request is returned, indicated by the segment 1140, to the RNC/UTRAN. And, then, as indicated by the segment 1142, the radio resources extending between the UE 802 and the UTRAN are released. A response is then sent, as indicated by segment 1144.

Figure 14:
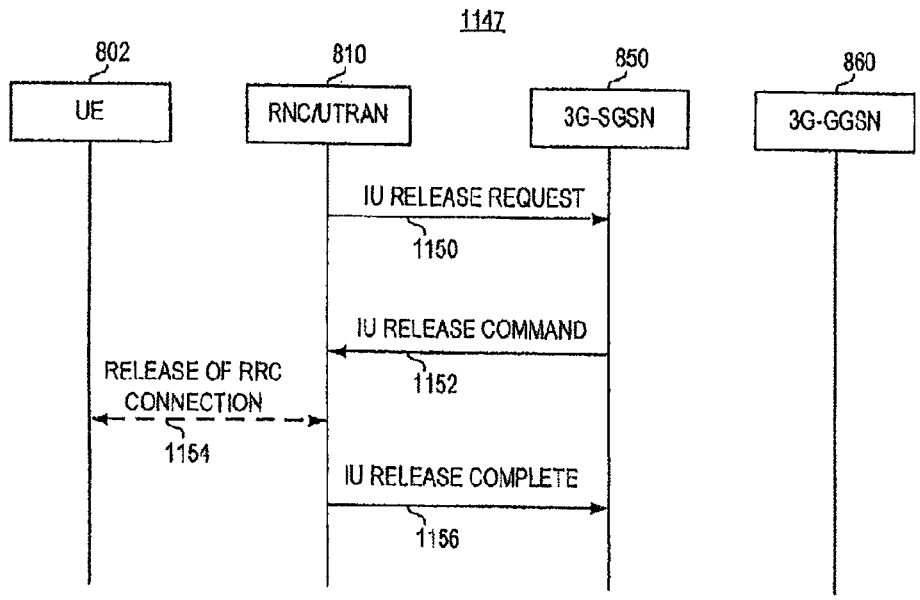
FIG. 14 illustrates a message sequence diagram, similar to that shown in FIG. 13, also representative of signaling generated pursuant to operation of an embodiment of the present disclosure by which to release radio resource allocation.

FIG. 14 illustrates a message sequence diagram shown generally at 1147, similar to the message sequence diagram shown in FIG. 13, but here in which resources of a final PDP context are released. Upon initiation, the RNC generates an Iu release request 1150 is communicated to the SGSN and responsive thereto, the SGSN returns an Iu release command, indicated by the segment 1152. Thereafter, and as indicated by the segments 1154, the radio bearer formed between the UE and the UTRAN is released. And, as indicated by the segment 1156, the RNC/UTRAN returns an Iu release complete to the SGSN.

Figure 15:
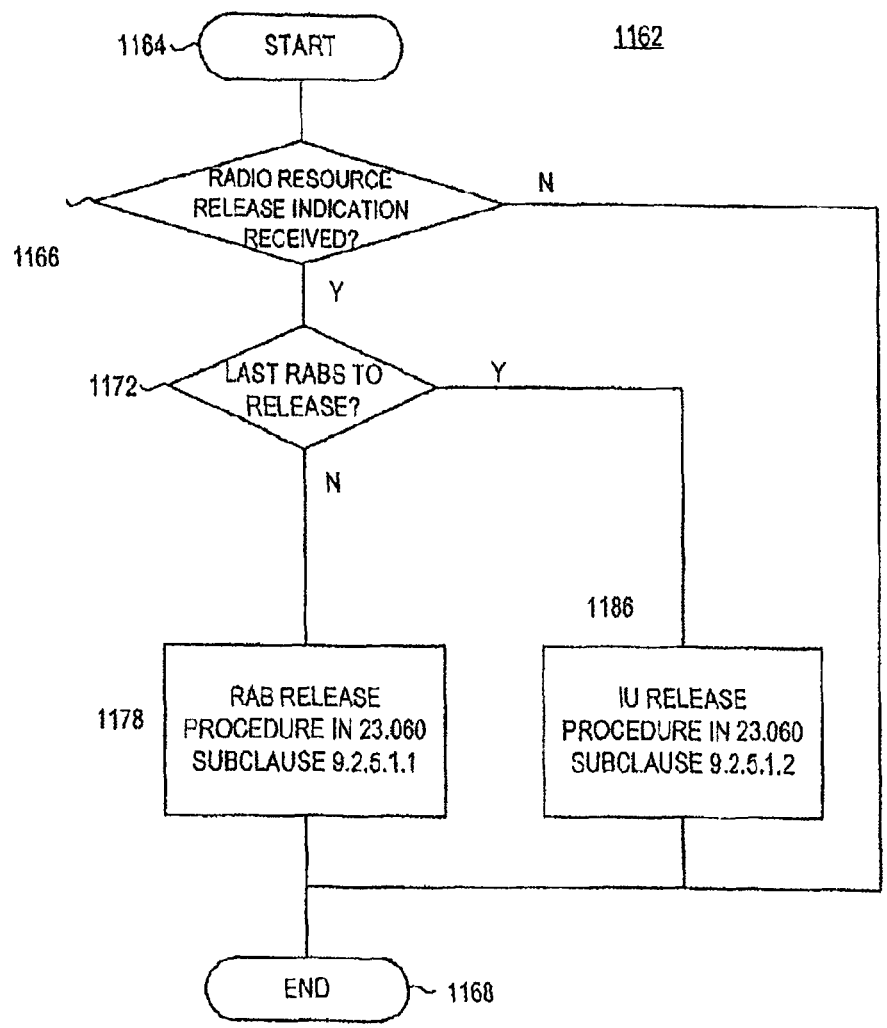
FIG. 15 illustrates a process diagram representative of the process of an embodiment of the present disclosure.

FIG. 15 illustrates a method flow diagram, shown generally at 1162, representative of the process of an embodiment of the present disclosure to release radio resources allocated pursuant to a PDP context.

After start of the process, indicated by the block 1164, a determination is made, indicated by the decision block 1166 as to whether a radio resource release indication has been received. If not, the no branch is taken to the end block 1168.

If, conversely, a radio access bearer release has been requested, the yes branch is taken to the decision block 1172. At the decision block 1172, a determination is made as to whether the radio access bearer that is to be released is the final radio access bearer to be released. If not, the no branch is taken to the block 1178, and the preferred state is set. Then radio access bearer release procedures are performed, such as that shown in FIG. 13 or such as that described in 3GPP document Section 23.060, subclause 9.2.5.1.1.

Conversely, if a determination is made at the decision block 1172 that the RAB is the last to be released, the yes branch is taken to the block 1186, an Iu release procedure, such as that shown in FIG. 14 or such as that described in 3GPP document section 23.060, subclause 9.2.5.1.2 is performed.

Figure 16:
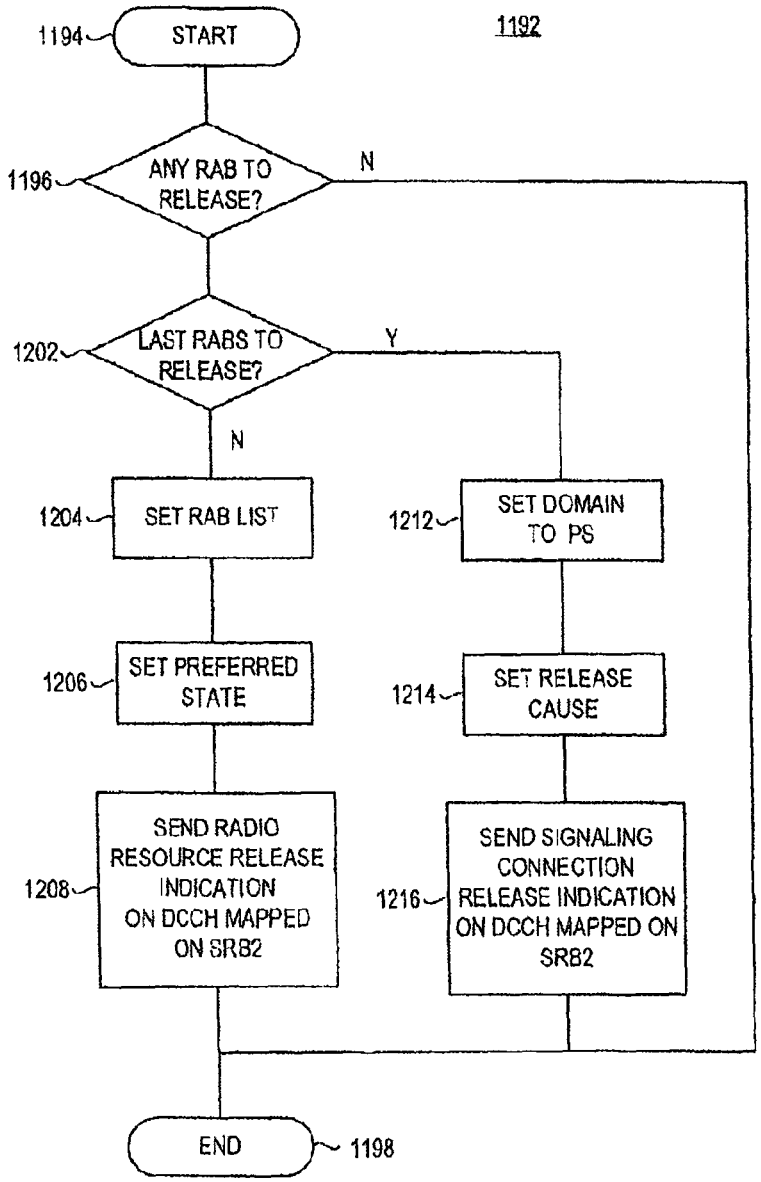
FIG. 16 illustrates a method flow diagram illustrating the method of operation of an embodiment of the present disclosure.

FIG. 16 illustrates a method flow diagram, shown generally at 1192, representative of the process of an embodiment of the present disclosure to release radio resources allocated pursuant to a PDP context.

After start of the process, indicated by the block 1194, a determination is made, indicated by the decision block 1196 as to whether there is an RAB (Radio Access Bearer) to release. If not, the no branch is taken to the end block 1198.

If, conversely, a radio access bearer release has been requested, the yes branch is taken to the decision block 1202. At the decision block 1202, a determination is made as to whether the radio access bearer that is to be released is the final radio access bearer to be released. If not, the no branch is taken to the block 1204, where the RAB list is set, block 1206 where the preferred state is set, and block 1208 where radio access bearer release procedures are performed, such as that shown in FIG. 13 or such as that described in 3GPP document Section 23.060, subclause 9.2.5.1.1.

Conversely, if a determination is made at the decision block 1202 that the RAB is the last to be released, the yes branch is taken to the block 1212, and the domain is set to PS (Packet Switched). Then, as indicated by block 1214, a release cause is set. And, as indicated by the block 1216, a SIGNALING CONNECTION RELEASE INDICATION is sent on a DCCH. An Iu release procedure, such as that shown in FIG. 14 or such as that described in 3GPP document section 23.060, subclause 9.2.5.1.2 is performed.

Figure 17:
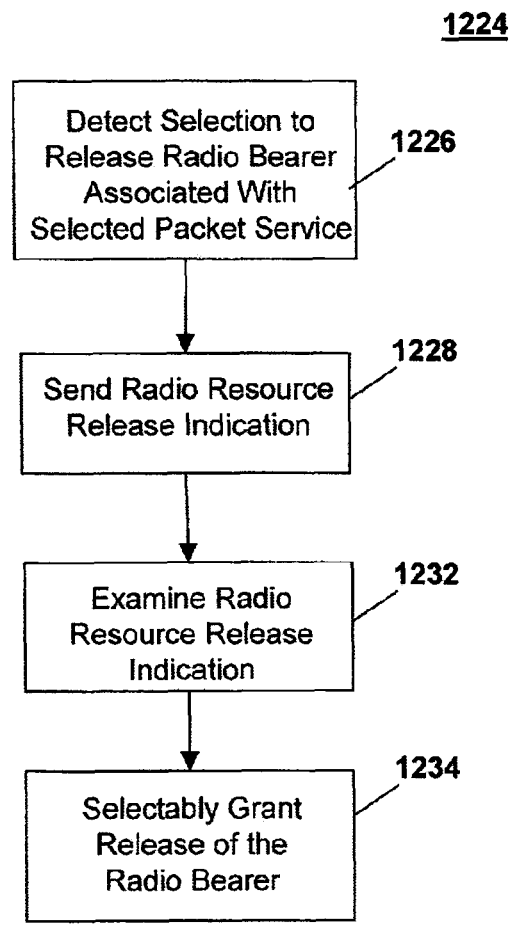
FIG. 17 illustrates a method flow diagram, also illustrating the method of operation of an embodiment of the present disclosure.

FIG. 17 illustrates a method, shown generally at 1224, representative of the method of operation of an embodiment of the present disclosure. The method facilitates efficient utilization of radio resources in a radio communication system that provides for concurrent running of a first packet service and a second packet service. First, and as indicated by the block 1226, detection is made of selection to release a radio resource associated with a selected packet service of the first packet service and the second packet service. Then, and as indicated by the block 1228, a radio resource release indication is sent responsive to the detection of the selection to release the radio resource.

Then, at block 1212 the radio resource release indication is examined and then at block 1214 the grant of the release of the radio bearer is selectably granted.

In a further embodiment, the network may initiate a transition based on both the receipt of an indication from the user equipment or another network element and on a radio resource profile for the user equipment.

An indication as received from the user equipment or other network element could be any of the different transition indications described above. The indication can be passive and thus be merely a blank indication that a less battery intensive radio state should be entered. Alternatively the indication could be part of the regular indications sent from the UE which the network determines, possibly over time or a number of received indications, and the UE's radio resource profile that a less battery or radio resource intensive radio state should be entered. Alternatively, the indication could be dynamic and provide information to the network element about a preferred state or mode in which to transition. As with the above, the indication could contain a cause for the indication (e.g. normal or abnormal). In a further embodiment, the indication could provide other information about a radio resource profile, such as a probability that the user equipment is correct about the ability to transition to a different state or mode, or information about the application(s) that triggered the indication.

An indication from another network element could include, for example, an indication from a media or push-to-talk network entity. In this example, the indication is sent to the network entity responsible for transitioning (e.g. the UTRAN) when traffic conditions allow. This second network entity could look at traffic at an Internet protocol (IP) level to determine whether and when to send a transition indication.

In a further embodiment, the indication from the UE or second network element could be implicit rather than explicit. For example, a transition indication may be implied by the network element responsible for transitioning (e.g. the UTRAN) from device status reports on outbound traffic measurements. Specifically, status reporting could include a radio link buffer status where, if no outbound data exists, could be interpreted as an implicit indication. Such status reporting could be a measurement that can be repetitively sent from the UE that does not, by itself, request or indicate anything.

The indication could thus be any signal and could be application based, radio resource based, or a composite indication providing information concerning all of the user equipment's application and radio resources. The above is not meant to be limiting to any particular indication, and one skilled in the art would appreciate that any indication could be used with the present method and disclosure.

Figure 18:
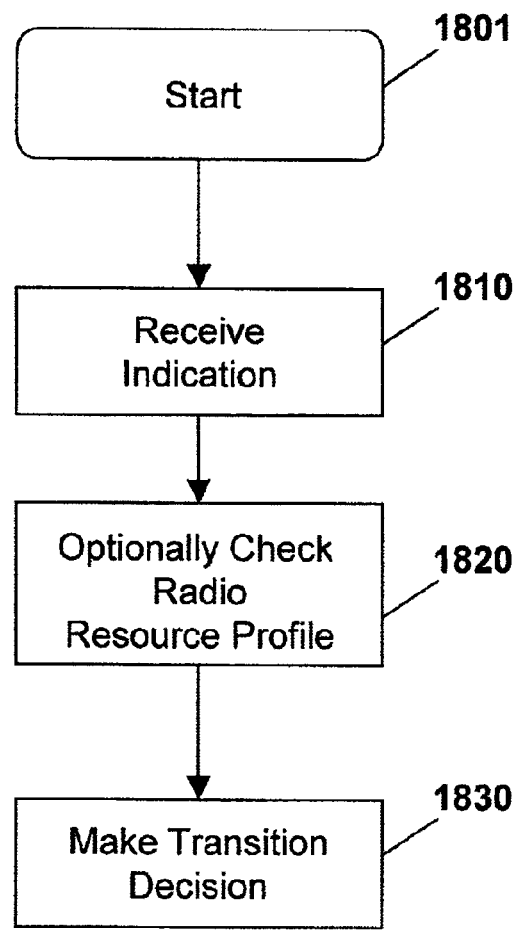
FIG. 18 illustrates a method flow diagram of an embodiment in which transitioning decisions are made based on a Radio Resource Profile at a network element.

Reference is now made to FIG. 18. The process starts at step 1801 and proceeds to step 1810 in which a network element receives the indication.

Once the network receives the indication in step 1810, the process proceeds to step 1820 in which a radio resource profile for the user equipment is optionally checked.

The term "radio resource profile", as used herein, is meant to be a broad term that could apply to a variety of situations, depending on the requirements of a network element. In broad terms, the radio resource profile includes information about radio resources utilized by the user equipment.

The radio resource profile could include either or both static profile elements and dynamic or negotiated profile elements. Such elements could include an "inhibit duration and/or maximum indication/request messages per time-window" value, which could be part of the radio resource profile, either within or apart from the transition profile, and could be negotiated or static.

Static profile elements may include one or more of the quality of service for a radio resource (e.g. RAB or RB), a PDP context, an APN that the network has knowledge of and a subscriber profile.

As will be appreciated by those skilled in the art, various levels of quality service could exist for a radio resource and the level of the quality of service could provide information to a network on whether to transition to a different state or mode. Thus if the quality of service is background, the network element may consider transitioning to idle more readily than if the quality of service is set to interactive. Further, if multiple radio resources have the same quality of service, this could provide an indication to the network on whether to transition the mobile device to a more suitable state or mode or to tear down the radio resources. In some embodiments, a primary and secondary PDP context could have a different quality of service, which could also affect the decision on whether to perform a state/mode transition.

Further, the APN could provide the network with information about the typical services that the PDP context utilizes. For example, if the APN is xyz.com, where xyz.com is typically used for the provision of data services such as email, this could provide an indication to the network about whether or not to transition to a different state or mode. This could further indicate routing characteristics.

In particular, the present method and apparatus can utilize the Access Point Name (APN) specified by the UE to set the transition profile between various states. This may be another way of describing the subscription of the UE. As will be appreciated, the Home Location Register (HLR) may store relevant information about subscribers, and could provide the radio network controller (RNC) with the subscription of the UE. Other network entities could also be used to store subscription information centrally. Whether using the HLR or other network entity, information is preferably pushed to other network components such as the RNC and SGSN, which map subscription information to relevant physical parameters used during data exchange.

The UTRAN could include or have access to a database or table in which various APNs or QoS parameters could be linked to a specific transition profile. Thus, if the UE is an always on device, this will be apparent from the APN and an appropriate transition profile for that APN could be stored at the UTRAN as part of the radio resource profile or be remotely accessible by the UTRAN. Similarly, if the QoS or a portion of the QoS parameter is used, or a dedicated message sent with a profile, this could signify to the UTRAN that a particular transition profile is desired based on a database query or a lookup in a table. Additionally, a multiplicity of behaviors beyond the RRC connected state transition profile can be specified by this means. These include, but are not limited to:
- rate adaptation algorithms (periodicity of step/step size);
- initial granted radio bearer;
- maximal granted radio bearer;
- minimize call setup time (avoid unnecessary steps such as traffic volume measurements); and
- the air interface (GPRS/EDGE/UMTS/HSDPA/HSUPA/LTE, etc.).

Further, if there are multiple PDP contexts that have different QoS requirement but share the same APN IP address, such as a primary context, secondary context, and so forth, a different transition profile can be used for each context. This could be signaled to the UTRAN through QoS or dedicated messages.

If multiple active PDP contexts are concurrently utilized, the lowest common denominator between the contexts can be used. For RRC state transition, if one application has a first PDP context that is associated with a transition profile in which the system moves from CELL_DCH state to a CELL_PCH or Idle state quickly, and a second PDP context is associated with a transition profile in which the system is to stay in the CELL_DCH state longer, the second profile in which the CELL_DCH state is maintained longer will override the first profile.

As will be appreciated by those skilled in the art, the lowest common denominator can be considered in two different ways. Lowest common denominator, as used herein, implies a longest time required before transitioning to a different state. In a first embodiment, the lowest common denominator may be the lowest of the activated PDPs. In an alternative embodiment, the lowest common denominator may be the lowest of the PDPs that actually have active radio resources. The radio resources could be multiplexed in a number of different fashions but the end result is the same.

An exemplary case for such methods can be drawn for always on devices. As described, various APNs or QoS parameters can be linked to a specific behavior for always on. Consider initially granted radio resources that may be desirable based on an 'always on' profile. The network now has a means to 'know' that data bursts are short and bursty for always-on applications, such as email. For those skilled in the art, it is clearly seen that given this information, there is no incentive to save code space for trunking efficiency on the network. Thus a maximum rate may be allocated to an always-on device with little risk of not reserving enough code space for other users. Additionally the UE benefits in receiving data more rapidly and also saves on battery life due to shorter 'on time'. Again, to those skilled in the art, high data rates have very little effect on current draw since power amplifiers are fully biased regardless of data rate.

In the above embodiment, a lookup table can be used by the UTRAN to determine the resource control profile for radio resources(s) to be assigned for different applications for a given RRC connection for the UE. The profile can be based on user subscription and stored on the network side at a network entity such as HSR or alternatively at the RNC since the RNC will have more up to date traffic resources available (i.e. data rates that can be granted). If higher data rates can be achieved shorter timeouts may be possible.

Instead of APN, other alternatives such the Quality of Service (QoS) parameters set in a Packet Data Protocol (PDP) Context activation or Modified PDP Context can be used. The QoS field can further include the QoS "allocation retention priority (Service data unit could be used to infer traffic data volumes)" in case of multiple PDP contexts sharing the same APN address or a subscription profile to set the transition profile. Further alternatives include dedicated messages such as the indication message above to signal a resource control profile and information such as inhibit duration and/or maximum indication/request messages per time-window value.

The transition profile included in the radio resource profile could further include whether the state of the UE should be transition at all based on the type of application. Specifically, if the user equipment is being used as a data modem, a preference may be set either on the user equipment so transition indications are not sent or if knowledge of the preference is maintained at the network, that any transition indication received from the UE while being used as a data modem should be ignored. Thus the nature of the applications that are being run on the user equipment could be used as part of the radio resource profile.

A further parameter of a transition profile could involve the type of transition. Specifically, in a UMTS network, the user equipment may prefer to enter a Cell_PCH state rather than entering an idle state for various reasons. One reason could be that the UE needs to connect to a Cell_DCH state more quickly if data needs to be sent or received, and thus moving to a Cell_PCH state will save some network signaling and battery resources while still providing for a quick transition to the Cell_DCH state. The above is equally applicable in non-UMTS networks and may provide for a transition profile between various connected and idle states.

The transition profile may also include various timers including, but not limited to, inhibit duration and/or maximum indication/request messages per time-window, delay timers and inactivity timers. Delay timers provide a period which the network element will wait prior to transitioning to a new state or mode. As will be appreciated, even if the application has been inactive for a particular time period, a delay may be beneficial in order to ensure that no further data is received or transmitted from the application. An inactivity timer could measure a predetermined time period in which no data is received or sent by an application. If data is received prior to the inactivity timer expiring, typically the inactivity timer will be reset. Once the inactivity timer expires, the user equipment may then send the indication of step 1810 to the network. Alternatively, the user equipment may wait for a certain period, such as that defined for the delay timer, before sending the indication of step 1810.

Further, the delay timer or inhibit duration and/or maximum indication/request messages per time-window could vary based on a profile that is provided to the network element. Thus, if the application that has requested a transition to a different mode or state is a first type of application, such as an email application, the delay timer on the network element can be set to a first delay time, while if the application is of a second type such as an instant messaging application, the delay timer can be set to a second value. The values of the inhibit duration and/or maximum indication/request messages per time-window, delay timer or inactivity timer could also be derived by the network based on the APN utilized for a particular PDP.

As will be appreciated by those skilled in the art, the inactivity timer could similarly vary based on the application utilized. Thus, an email application may have a shorter inactivity timer than a browser application since the email application is expecting a discrete message after which it may not receive data. Conversely the browser application may utilize data even after a longer delay and thus require a longer inactivity timer.

The transition profile may further include a probability that a user equipment is correct requesting a transition. This could be based on compiled statistics on the rate of accuracy of a particular user equipment or application on the user equipment.

The transition profile may further include various discontinuous reception (DRX) time values. Further, a progression profile for DRX times could be provided in a transition profile.

The transition profile could be defined on an application by application basis or be a composite of the various applications on the user equipment.

As will be appreciated by those skilled in the art the transition profile could be created or modified dynamically when a radio resource is allocated and could be done on subscription, PS registration, PDP activation, RAB or RB activation or changed on the fly for the PDP or RAB/RB. The transition profile could also be part of the indication of step 1810. In this case, the network may consider the preferred RRC state indication to determine whether to allow the transition and to what state/mode. Modification could occur based on available network resources, traffic patterns, among others.

The radio resource profile is therefore comprised of static and/or dynamic fields. The radio resource profile used by a particular network may vary from other networks and the description above is not meant to limit the present method and system. In particular, the radio resources profile could include and exclude various elements described above. For example, in some cases the radio resource profile will merely include the quality of service for a particular radio resource and include no other information. In other cases, the radio resource profile will include only the transition profile. Still in other cases, the radio resource profile will include all of the quality of service, APN, PDP context, transition profile, among others.

Optionally, in addition to a radio resource profile, the network element could also utilize safeguards to avoid unnecessary transitions. Such safeguards could include, but are not limited to, the number of indications received in a predetermined time period, the total number of indications received, traffic patterns and historical data.

The number of indications received in a predetermined time period could indicate to the network that a transition should not occur. Thus, if the user equipment has sent, for example, five indications within a thirty second time period, the network may consider that it should ignore the indications and not perform any transitions. Alternatively the network may determine to indicate to the UE that it should not send any further indications either indefinitely or for some configured or predefined time period. This could be independent of any "inhibit duration and/or maximum indication/request messages per time-window" on the UE.

Further, the UE could be configured not to send further indications for a configured, predefined or negotiated time period. The UE configuration could be exclusive of the safeguards on the network side described above.

The traffic patterns and historical data could provide an indication to the network that a transition should not occur. For example, if the user has received a significant amount of data in the past between 8:30 and 8:35 a.m. from Monday to Friday, if the indication is received at 8:32 a.m. on Thursday, the network may decide that it should not transition the user equipment since more data is likely before 8:35 a.m.

If multiple radio resources are allocated for the user equipment, the network may need to consider the complete radio resource profile for the user equipment. In this case, the radio resource profiles for each radio resource can be examined and a composite transition decision made. Based on the radio resource profile of one or multiple radio resources, the network can then decide whether or not a transition should be made.

A Further Limitation on Transition Indications

As described previously, there are various mechanisms by which a UE may have transitioned to its current RRC state. The initiation for the transition may have been entirely driven by the network, for example as a result of observed inactivity. In this example, the network maintains inactivity timers for each of the RRC states. If the inactivity timer for the current RRC state of the UE expires, then the network will send an RRC reconfiguration message to transition the UE to a different state. Alternatively, the initiation of the transition may have been driven by the UE using a transition indication mechanism as described above (e.g. with use of a transition indication message). Since the network has control of the RRC state machine, in this case the UE can send an indication to the network that it does not need to be kept in the current RRC state and is requesting a transition to a less battery consumptive RRC state.

In one embodiment, a limitation is placed on the UE's ability to transmit a transition indication that is a function of whether or not the UE underwent the most recent transition to its current state as a result of a transition indication previously transmitted by the UE.

In another embodiment, the number of transition indications that the UE may send in its current state is a function of whether or not the UE underwent the most recent transition to its current state as a result of a transition indication previously transmitted by the UE.

In another embodiment, the number of transition indications that the UE may send in specific states is limited regardless of the manner in which the UE underwent the most recent transition to its current state where the current state is one of the specific states that this limitation applies to.

Inhibit any Further Transition Indication Following a RRC State Change from a Previously Transmitted Transmission Indication In some embodiments, if the UE is in its current state as a result of having previously transmitted a transition indication, the UE is inhibited from transmitting any further transition indications while in this current state.

The UE may maintain a flag, bit token, or other indicator which indicates whether the UE is permitted to send transition indications to the network while it remains in its current state. If the UE is reconfigured by the network to a new RRC state (e.g. the network sends a reconfiguration message to the UE to effect a transition to the new RRC state) after having sent a transition indication to the network, then this flag, bit token, or other indicator is set (or alternately cleared), indicating the UE is not permitted to send further transition indications while it remains in this current state. If the UE changes RRC state due to a data transaction request by the UE (e.g. because its buffer shows that it has data to be sent) or by the network (e.g. because the network has paged the UE), then this indicator is cleared (or alternatively set) to indicate that the UE is once again permitted to send a transition indication to the network.

Inhibit More than a Predetermined Number of Transition Indications Following a RRC State Change from a Previously Transmitted Transition Indication In some embodiments, if the UE is in its current state as a result of having previously transmitted a transition indication, the UE is inhibited from transmitting any more than a predetermined maximum number of further transition indications while the network maintains the UE in this same current state. In some embodiments, the predetermined number is hard coded in the UE. In other embodiments, the predetermined number is configured by the network, and is subject to be changed as the UE moves between different networks. The network configuration may take place, for example, using a signalling message directly to the mobile station, or as part of a broadcast message.

The UE maintains a flag, bit token, or other indicator which indicates whether the UE is permitted to send a fixed number of transition indications to the network while it remains in its current state. If the UE has transitioned to this current state as a result of having sent a transition indication in a previous state, then this flag, bit token, or other indicator will be set. If the UE has transitioned to this current state as a result of normal network driven transitions based on inactivity timers for example, then this flag, bit token, or other indicator will not be set and there will be no restrictions on the number of transition indications that the UE may send in its current state.

In the case where the flag, bit token, or indicator is set indicating that the UE is only permitted to send a fixed number of transition indicators to the network while it remains in this current state, the UE may, in addition maintain a counter which counts the number of transition indications that are sent by the UE after it has determined that it has just been transitioned to its current state as a result of a previously transmitted transition indication.

In this example, if once in the current state, the UE subsequently wants to transmit a transition indication from this current state, it first looks at the flag, bit token or other indicator to see if it limited in the number of transition indications it may send to the network while it remains in its current state. If it is limited, then the UE keeps count of the number of transition indications it sends provided the network response to the transition indicator is to move the UE to its current RRC state (in the case where the UE needs to transition to another RRC state to send the transition indication message) or to leave the UE in its current state (in the case where the UE may send the transition indicator in its current state).

If when the UE compares the value of its transition indication counter to the predetermined maximum number of further transition indications permitted (possibly indicated by a flag, bit token or other indicator), the value of the transition indication counter is greater than this predetermined maximum number, then the UE will not subsequently send further transition indications to the network.

If the result of a transition indication sent by the UE is that the UE is transitioned to a different RRC state from its current state (by for example a reconfiguration message sent by the network) prior to sending the transition indication, that is more battery intensive than the current state, then the counter is reset and the process begins again in the new current state. This would be the case, for example, if the end result is that the UE is reconfigured from a PCH to CELL_FACH.

If the UE changes RRC state due to a data transaction request by the UE (e.g. because its buffer shows that it has data to be sent) or by the network (e.g. because the network has paged the UE), then this indicator is cleared (or alternatively set) to indicate that the UE is once again permitted to send a transition indication to the network and the counter is reset.

Inhibit More than a Predetermined Number of Transition Indications

In some embodiments, the UE is inhibited from transmitting any more than a predetermined maximum number transition indications while the network maintains the UE in its same current state. In some embodiments, the predetermined number is hard coded on the UE. In other embodiments, the predetermined number is configured by the network, and is subject to be changed as the mobile station moves between different networks. The network configuration may take place, for example, using a signalling message directly to the mobile station, or as part of a broadcast message.

The UE maintains a counter which counts the number of transition indications that are sent by the UE after from its current state. Therefore upon transitioning to the current state, and the UE subsequently wants to transmit a transition indication from this current state, then the UE keeps count of the number of transition indications it sends provided the network response to the transition indicator is to return the UE to its current RRC state (in the case where the UE needs to transition to another RRC state to send the transition indication message) or to leave the UE in its current state (in the case where the UE may send the transition indicator in its current state).

If when the UE compares the value of its transition indication counter to the predetermined maximum number of further transition indications, the value of the transition indication counter is greater than this predetermined maximum number, then the UE will not subsequently send further transition indications to the network.

If the result of a transition indication sent by the UE is that the UE is reconfigured to a different RRC state from its current state prior to sending the transition indication, and the different RRC state is more battery intensive than the current state, then the counter is reset and the process begins again in the new current state.

If the UE changes RRC state due to a data transaction request by the UE (e.g. because its buffer shows that it has data to be sent) or by the network (e.g. because the network has paged the UE), then this indicator is cleared (or alternatively set) to indicate that the UE is once again permitted to send a transition indication to the network and the counter is reset.

Whether or not there is a state transition that resulted from having previously transmitted a transition indication can be used to enable/disable or limit the further transmission of transition indications in various ways:

1) a prerequisite to allowing the transmission of a transition indication is that the previous state transition must not have been the result of the UE having previously transmitted a transition indication. This prerequisite can be combined with other prerequisites or inhibitions such that satisfaction of the prerequisite alone may not necessarily allow the UE to transmit a transition indication 2) a prerequisite to allowing the transmission of a transition indication is that if the previous state transition was the result of the UE having previously transmitted a transition indication, no more than a defined number of transition indications have been transmitted by the UE. This prerequisite can be combined with other prerequisites or inhibitions such that satisfaction of the prerequisite alone may not necessarily allow the UE to transmit a transition indication 3) if the previous state transition was the result of the UE having previously transmitted a transition indication, inhibit transmission of a transition indication. This is logically equivalent to 1) above. This inhibition can be combined with other prerequisites or inhibitions such if the inhibition is not triggered, that alone may not necessarily allow the UE to transmit a transition indication.

4) if the previous state transition was the result of the UE having previously transmitted a transition indication, inhibit transmission of any more than a defined number of transition indications. This is logically equivalent to 2) above. This inhibition can be combined with other prerequisites or inhibitions such if the inhibition is not triggered, that alone may not necessarily allow the UE to transmit a transition indication.

5) if the previous state transition was not UE driven, allow transmission of a transition indication.

6) if the previous state transition was the result of the UE having previously transmitted a transition indication, allow transmission of only up to a defined number of transition indications.

7) for certain RRC states, allow transmission of only up to a defined number of transition indications.

Interplay with Inhibit Timer

As indicated above, the state transition-based prerequisite or inhibition can be combined with other prerequisites or inhibitions. Embodiments have been described above which inhibit a UE from sending a transition indication for some period of time after previously sending a transition indication.

In some embodiments, this inhibition is combined with the state transition-based inhibition/prerequisite described above.

For example, the use of an inhibit timer has been described previously as one mechanism for inhibiting the UE from sending a transition indication for some period of time after previously sending a transition indication, in which an inhibit timer is started after transmitting a transition indication, and the UE is allowed to send a further transition indication only if the inhibit timer is not running. In some embodiments the use of this inhibit timer is combined with the state transition-based inhibition as follows:

previous state transition the result of the UE having previously transmitted a transition indication? inhibit transmission of transition indication, or inhibit the transmission of more than a defined number of transition indications subsequent to a previous transition that was the result of the UE having previously transmitted a transition indication; and is inhibit timer running? inhibit transmission of transition indication.

In some embodiments, these are the only two inhibitions in place in which case, the behaviour can be summarized as follows:

allow transmission of a transition indication if the inhibit timer is not running, and the current state was not a result of a previous transition indication transmitted by the UE, or allow transmission of a transition indication if the inhibit timer is not running, and if fewer than a defined number of transition indications have been transmitted subsequent to a state transition that was the result of the UE having previously transmitted a transition indication.

Previous State Transition Cause Maintenance

The UE has a mechanism for maintaining an indication of whether the current state is a result of the previous transmission of a transition indication by the UE. This indication can be a previous state transition cause value stored in a memory on the UE that is accessible by a processor forming part of the UE, or a switch implemented in hardware to name a few examples. In a specific example, the previous state transition cause is a single bit that is a first value ('1' or '0') to indicate that the previous state transition the result of the UE having previously transmitted a transition indication, and is otherwise a second value ('0' or '1').

Previous State Transition Cause Assessment

The UE has a mechanism for determining whether the current state is a result of the previous transmission of a transition indication by the UE.

If the UE has sent the transition indication, and this has been acknowledged by the network so the UE knows that the network received it, then the UE may know that if it receives an RRC reconfiguration message within a fixed period of time, that this RRC configuration message is a result of the sending of the transition indication.

If the UE receives an RRC reconfiguration and it has not sent (and had acknowledged) a transition indication within a predetermined period of time leading up to the reconfiguration, then the UE can assume that the state transition was not in response to the transmission of a transition indication by the UE.

In a first example, each time a state transition occurs as a result of a reconfiguration by the network, the UE assesses whether the state transition was the result of the UE having previously transmitted a transition indication. If this was the case, the UE updates the previous state transition cause to indicate that the previous state transition was UE driven. If the state transition was other than the result of the UE having previously transmitted a transition indication, then the previous state transition cause is updated accordingly.

In some embodiments, where a transition with cause value is supported, the UE determines whether it had previously sent a transition indication with a cause value for which this mechanism is to be implemented prior to receiving this reconfiguration.

In some embodiments the UE performs the following steps to determine whether a state transition is the result of the UE having previously transmitted a transition indication:

1) transmit a transition indication (or transition indication with particular cause value);

2) if a state transition that is consistent with the transition indication occurs within a defined time interval of transmitting the transition indication, assess the state transition to be the result of the UE having previously transmitted a transition indication, and otherwise assess the state transition to be other than the result of the UE having previously transmitted a transition indication.

In some embodiments, upon transmitting a transition indication, a timer is started start counting that counts down starting at a timeout value, or equivalently that counts up to a timeout value. If the timer is still running when the state transition occurs, then it is assessed as being the result of the UE having previously transmitted a transition indication.

In some embodiments, any of these embodiments are implemented using a transition indication that includes a cause code to allow the UE to specify a cause for the transition indication (e.g. to indicate that a data transfer or call is complete, or that no further data is expected for a prolonged period). A specific example is the SIGNALLING CONNECTION RELEASE INDICATION defined in 3GPP TS 25.331 Section 8.1.14 where the cause code is the IE "Signalling Connection Release Indication Cause" set to "UE Requested PS Data session end".

In some embodiments, any of these embodiments are implemented using a transition indication that does not include a cause code. A specific example is the SIGNALLING CONNECTION RELEASE INDICATION defined in 3GPP TS 25.331 Section 8.1.14.

Further Example of Determination of the mechanism for the RRC State Transition

If the UE receives an RRC reconfiguration message from the network, it can determine if it has sent a SCRI message with the cause value "UE Requested PS Data session end" prior to receiving this reconfiguration.

If the UE has sent this message, and the message has been acknowledged by the network so the UE knows that the network received it, then the UE may know that if it receives and RRC reconfiguration message within a fixed period of time, that this RRC configuration message is a result of the sending of the SCRI.

If the UE is in CELL_DCH or CELL_FACH RRC state and it has sent a SCRI which has been acknowledged but the network does not send an RRC reconfiguration within a fixed period of time, then the UE can assume that it is currently in the state that the network wants it to remain in, and the UE can consider that the mechanism for which it remains in that state is for Fast Dormancy purposes.

If the UE receives an RRC reconfiguration and it has not sent (and had acknowledged) a SCRI message the fixed period of time leading up to the reconfiguration, then the UE can assume that the state transition was not for Fast Dormancy purposes.

Specific Examples

With reference to the state diagram of FIG. 1, assume that a UE is initially in the Cell_DCH state 122. After that, the UE transmits a transition indication, for example upon determining it has no more data to send. In response, the network acknowledges the transition indication and transitions the UE to URA_PCH. In some embodiments, this is a direct state transition. In other embodiments, this is an indirect state transition via the cell_FACH state. After that, the UE is not allowed to send another transition indication.

Note that in general, the description of embodiments and behaviour that pertain to the URA_PCH state also apply to the CELL_PCH state.

If, on the other hand, the network decides on its own to transition the UE to URA_PCH, for example due to expiry of an inactivity timer, the UE is allowed to send a transition indication. At this point, the UE is looking to transition to IDLE mode from URA_PCH. However, the UE must transition to CELL_FACH to send the transition indication. Recall that the purpose of the transition indication is for the UE to move to a less battery-intensive state. If the network leaves the UE in CELL_FACH, this is not a transition to a more battery efficient state (the only more battery efficient state from URA_PCH being IDLE) and so the CELL_FACH state is not considered to be as the result of a previous transmission of a transition indication. If the network transitions the UE to URA_PCH or IDLE mode within a defined period, then the state transition is considered to be as a result of a previous transmission of a transition indication.

Another Inhibition

In some embodiments, if the UE has sent a transition indication which has been acknowledged but the network does not send an RRC reconfiguration within a fixed period of time, then the UE assumes that it is currently in the state that the network wants it to remain in. In some embodiments, upon this sequence of events taking place, the UE is inhibited from transmitting a transition indication, even though the current state may not necessarily be the result of the UE having previously transmitted a transition indication.

In some embodiments, the above-described inhibition is only implemented if the state that the UE remains in is the CELL_DCH or CELL_FACH RRC state.

State Due to Fast Dormancy

In some embodiments, when the UE is in a state that is a result of a previously transmitted transition indication, the UE is said to be in a state due to invoking fast dormancy. In some embodiments, when the UE has transmitted a transition indication which is acknowledged, but the UE does not undergo a state change, the UE is also said to be in a state due to invoking fast dormancy.

If the UE is transitioned to an RRC state (that is not IDLE) and this was not because of a transition indication (also referred to as a transition indication for fast dormancy purposes), then the UE uses the inhibit timer in order to determine when it is allowed to send a transition indicator for fast dormancy purposes. This behaviour is currently described in 3GPP TS 25.331.

If the UE is transitioned to an RRC state (that is not IDLE) and this was due to a transition indication, then the UE will have different constraints on its behaviour. The UE will set some sort of flag or indication internally when it knows that it is in this situation. This may, for example, be referred to as the FDM (Fast Dormancy Mechanism) flag.

In one case, the UE may be inhibited from sending a further transition indication. Alternatively, the UE may be allowed to send further requests for a state transition, but the number of further requests is limited to some defined number, for example one or more. The period between sending these requests is controlled by the inhibit timer.

If when the UE requests a state transition using the transition indication (and this has been acknowledged) the network either leaves the UE in its current RRC state (e.g. for CELL_FACH) or moves it back to the RRC state from which it sent the transition indicator from (e.g. the UE was in CELL_PCH, moved to CELL_FACH to send the SCRI, then the network moved the UE back to CELL_PCH) then the UE decrements the number of remaining transition indication requests that it is allowed to send.

If the UE moves to a different RRC state because a data transaction is initiated (e.g. it receives a page and is responding to this, or it requests resources for a data transaction) then the UE clears the FDM flag and the procedure restarts.

If the UE makes a transition to CELL_FACH state to transmit a CELL_UPDATE message or a URA_UPDATE message and in the acknowledgement from the network the UE is moved back to CELL_PCH or URA_PCH state, then this does not clear the FDM flag.

If however the UE makes a transition to CELL_FACH state to transmit a CELL_UPDATE message or a URA_UPDATE message or a transition indication message, and the network subsequently leaves the UE in CELL_FACH state, then the UE does clear the FDM flag and the procedure restarts.

In some cases, the UE is prevented entirely from sending the SCRI message after the UE is transitioned to a different RRC state in response to a Fast Dormancy request using the SCRI message with the cause value "UE Requested PS Data session end". In this case the UE sets the FDM flag and only clears this flag when it moves to a different RRC state for a data transaction that is initiated by the UE or by the network.

In some cases, the UE is only allowed a predefined maximum number of transition indication messages in certain predefined states. The number can be different for different states. For instance the UE may only be allowed to transmit "n" transition indication messages (with or without the cause code as described above) when in CELL_PCH or URA_PCH RRC States.

In some embodiments, methods and devices that are compliant with 3GPP TS 25.331 Universal Mobile Telecommunications System (UMTS); Radio Resource Control (RRC); Protocol specification, Release 8, or an evolution thereof, with amendments to facilitate or implement one or more of the embodiments described herein are provided. Examples of this are provided in Appendix A, Appendix B, and Appendix C. All of these examples refer to the use of the SCRI, but more generally the use of any transition indication is contemplated.

In some embodiments (see Appendix A for an example implementation), a UE internal state variable is defined which is set the first time the UE triggered FD from within PCH state. If set the UE is then prevented from triggering FD again from within PCH state, the variable is reset when new PS data arrives for transmission.

In some embodiments (see Appendix B for an example implementation), a counter V316 is defined and initially set to zero. The UE in PCH state is permitted to trigger sending a transition indication (such as a SCRI) with cause if V316<N316 (N316 is the max value). If UE does trigger sending of a transition indication (such as a SCRI with cause value) in PCH state then V316 is incremented. V316 is reset to zero if the UE is paged in PCH state or if the UE has uplink PS data available for transition.

If N316 is fixed to be 1 then the behaviour is equivalent to V316 being a Boolean state variable. Note that the UE having PS data available for transmission specifically excludes the sending of a transition indication (such as SCRI with cause) and causes the counter V316 to be reset. In this context, the PS having data available may, for example, mean that the user has data to transmit on RB3 (radio bearer 3) or upwards (the SCRI message is sent on RB2).

Note the text proposal in 8.3.1.2 (cell update procedure) and the final paragraph of 8.1.14.2 are alternative ways of capturing the condition for resetting V316.

In some embodiments (see appendix C for an example implementation), the UE is inhibited from transmitting a transition indication (such as a SCRI with cause) if the network moves the UE to PCH state in response to a transition indication (such as SCRI with cause) transmitted by the UE while in DCH or FACH state. To inhibit the transition indication (such as SCRI with cause) may be done by setting V316 to N316. The UE assess whether the move is instructed by the network 'in response' to the transition indication. Mechanisms described previously can be used for this; for example, the UE may judge this to be the case if the reconfiguration is received within a certain time of sending the transition indication.

In some embodiments, a new flag may be added to the reconfiguration message which can be set to TRUE if the reconfiguration message is triggered in the network by the receipt of a SCRI with cause, thus enabling the UE to know for certain is the reconfiguration is in response to the SCRI with cause. An example of this is depicted in Appendix D.

Many different embodiments for inhibiting the transmission of a transition indication, either completely, or to some maximum number of transition indications, have been described. Many of these are a function of one or more of:

whether the current state of the UE is the result of a previous state transition;

whether the current state is the same as the UE's state prior to sending a state transition, whether the current state is more battery intensive than the UE's state prior to sending a state transition.

In some embodiments, a mechanism for inhibiting the transmission of a transition indication is implemented, or not, on a per state basis; in some embodiments, for certain states no mechanism is implemented. In other embodiments, a different mechanism is used for each of at least two states.

In one embodiment, the network has a plurality of choices on how to proceed when it has received an indication in step 1810 and optionally examined the radio resource profile or profiles in step 1820.

A first option is to do nothing. The network may decide that a transition is not warranted and thus not accept the user equipment indication to transition. As will be appreciated by those skilled in the art, doing nothing saves network signaling since the state is not changed and in particular since a transition is not triggered.

A second option is to change the state of the device. For example, in a UMTS network, the state of the device may change from Cell_DCH to Cell_PCH. In non-UMTS networks the state transition may occur between connected states. As will be appreciated by those skilled in the art, changing states reduces the amount of core network signaling when compared with a transition to idle mode. Changing the state can also save radio resources since the Cell_PCH state does not require a dedicated channel. Also Cell_PCH is less battery intensive state enabling the UE to preserve battery power.

A third option for the network is to keep the UE in the same state but release the radio resources associated with a particular APN or PDP context. This approach saves radio resources and signaling as the connection is maintained in its current state and does not need to be re-established. However, it may be less suitable for situations where UE battery life is a concern.

A fourth option for the network is to transition the UE to an Idle mode. In particular, in both UMTS and non-UMTS, the network may move from a connected mode to an Idle mode. As will be appreciated, this saves radio resources since no connection at all is maintained. It further saves the battery life on the user equipment. However, a greater amount of core network signaling is required to reestablish the connection.

A fifth option for the network is to change a data rate allocation, which will save radio resources, typically allowing more users to use the network.

Other options would be evident to those skilled in the art.

The decision of the network on which of the five or more options to utilize will vary from network to network. Some overloaded networks may prefer to preserve radio resources and thus would choose the third, fourth or fifth options above. Other networks prefer to minimize signaling and thus may choose the first or second options above.

The decision is shown in FIG. 18 at step 1830 and may be based on network preferences along with the radio resource profile for the user equipment. The decision is triggered by the network receiving an indication from the user equipment that the user equipment would like to transition into another state e.g. into a less battery intensive state.

Figure 19:
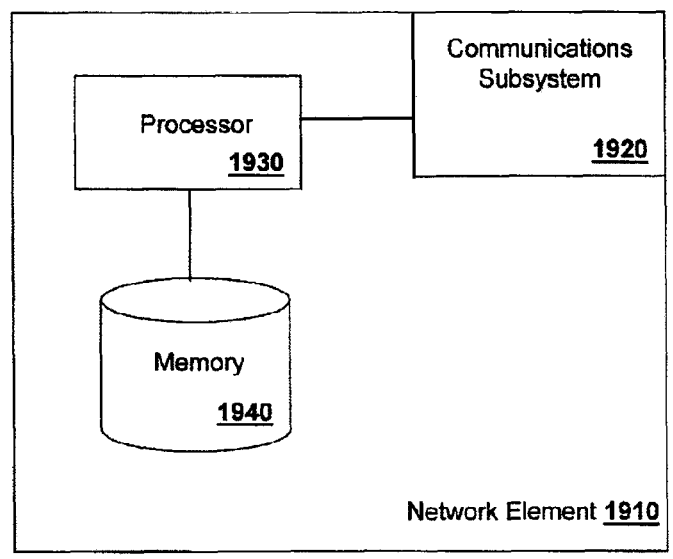
FIG. 19 illustrates a simplified block diagram of a network element capable of being used with the method of FIG. 18.

Reference is now made to FIG. 19. FIG. 19 illustrates the simplified network element adapted to make the decisions shown in FIG. 18 above. Network element 1910 includes a communications subsystem 1920 adapted to communicate with user equipment. As will be appreciated by those skilled in the art communications subsystem 1920 does not need to directly communicate with user equipment, but could be part of a communications path for communications to and from the user equipment.

Network element 1910 further includes a processor 1930 and a storage 1940. Storage 1940 is adapted to store preconfigured or static radio resource profiles for each user equipment being serviced by network element 1910. Processor 1930 is adapted to, upon receipt of an indication by communications subsystem 1920, consider the radio resource profile for the user equipment and to decide on a network action regarding transitioning the user equipment. As will be appreciated by those skilled in the art, the indication received by communications subsystem 1920 could further include a portion of or all of the radio resource profile for the user equipment that would then be utilized by processor 1930 to make the network decision concerning any transition.

Based on the above, a network element therefore receives an indication from the user equipment that a transition might be in order (such as for example when a data exchange is complete and/or that no further data is expected at the UE). Based on this indication, the network element optionally checks the radio resource profile of the user equipment, which could include both static and dynamic profile elements. The network element may further check safeguards to ensure that unnecessary transitions are not occurring. The network element could then decide to do nothing or to transition to a different mode or state, or to tear down a radio resource. As will be appreciated, this provides the network more control of its radio resources and allows the network to configure transition decisions based on network preferences rather than merely user equipment preferences. Further, in some cases the network has more information than the device concerning whether to transition. For example, the user equipment has knowledge of upstream communications and based on this may decide that the connection may be torn down. However, the network may have received downstream communications for the user equipment and thus realized that it cannot tear down the connection. In this case, a delay can also be introduced using the delay timer to provide the network with more certainty that no data will be received for user equipment in the near future.

The embodiments described herein are examples of structures, systems or methods having elements corresponding to elements of the techniques of this disclosure. This written description may enable those skilled in the art to make and use embodiments having alternative elements that likewise correspond to the elements of the techniques of this disclosure. The intended scope of the techniques of this disclosure thus includes other structures, systems or methods that do not differ from the techniques of this disclosure as described herein, and further includes other structures, systems or methods with insubstantial differences from the techniques of this disclosure as described herein.

Appendix A

8.1.14 Signalling connection release indication procedure

Figure 22:
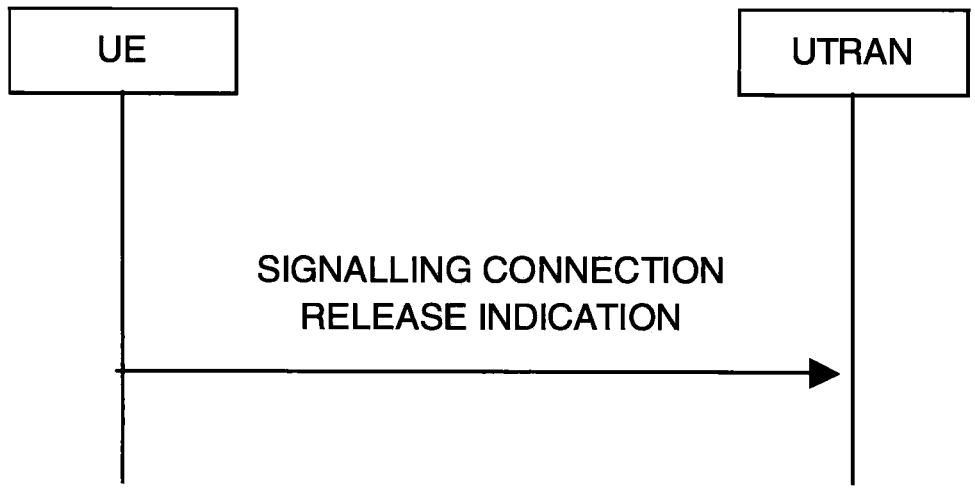
FIG. 22 illustrates a signaling connection release indication procedure, normal case.

Figure 22 illustrates a signaling connection release indication procedure, normal case.

8.1.14.1 General

The signalling connection release indication procedure is used by the UE to indicate to the UTRAN that one of its signalling connections has been released. The procedure may in turn initiate the RRC connection release procedure.

8.1.14.2 Initiation

The UE shall, on receiving a request to release (abort) the signalling connection from upper layers for a specific CN domain:

> 1> if a signalling connection in the variable ESTABLISHED_SIGNALLING_CONNECTIONS for the specific CN domain identified with the IE "CN domain identity" exists:
>> 2> initiate the signalling connection release indication procedure.
> 1> otherwise:
>> 2> abort any ongoing establishment of signalling connection for that specific CN domain as specified in 8.1.3.5a.

Upon initiation of the signalling connection release indication procedure in CELL_PCH or URA_PCH state, the UE shall:

> 1> if variable READY_FOR_COMMON_EDCH is set to TRUE:
>> 2> move to CELL_FACH state;
>> 2> restart the timer T305 using its initial value if periodical cell update has been configured by T305 in the IE "UE Timers and constants in connected mode" set to any other value than "infinity".
> 1> else:
>> 2> if variable H_RNTI and variable C_RNTI are set:
>>> 3> continue with the signalling connection release indication procedure as below.
>> 2> else:
>>> 3> perform a cell update procedure, according to subclause 8.3.1, using the cause "uplink data transmission";
>>> 3> when the cell update procedure completed successfully:
>>>> 4> continue with the signalling connection release indication procedure as below.

The UE shall:

> 1> set the IE "CN Domain Identity" to the value indicated by the upper layers. The value of the IE indicates the CN domain whose associated signalling connection the upper layers are indicating to be released;
> 1> remove the signalling connection with the identity indicated by upper layers from the variable ESTABLISHED_SIGNALLING_CONNECTIONS;
> 1> transmit a SIGNALLING CONNECTION RELEASE INDICATION message on DCCH using AM RLC.

When the successful delivery of the SIGNALLING CONNECTION RELEASE INDICATION message has been confirmed by RLC the procedure ends.

In addition, if the timer T323 value is stored in the IE "UE Timers and constants in connected mode" in the variable TIMERS_AND_CONSTANTS, and if there is no CS domain connection indicated in the variable ESTABLISHED_SIGNALLING_CONNECTIONS, the UE may:

1> if the upper layers indicate that there is no more PS data for a prolonged period:
2> if timer T323 is not running:
3> if the UE is in CELL_DCH state or CELL_FACH state; or
3> if the UE is in CELL_PCH state or URA_PCH state and "Triggered" in the variable TRIGGERED_SCRI_IN_PCH_STATE is FALSE:
4> if the UE is in CELL_PCH or URA_PCH state, set "Triggered" in the variable TRIGGERED_SCRI_IN_PCH_STATE to TRUE;
4> set the IE "CN Domain Identity" to PS domain;
4> set the IE "Signalling Connection Release Indication Cause" to "UE Requested PS Data session end";
4> transmit a SIGNALLING CONNECTION RELEASE INDICATION message on DCCH using AM RLC;
4> start the timer T323.

When the successful delivery of the SIGNALLING CONNECTION RELEASE INDICATION message has been confirmed by RLC the procedure ends.

The UE shall be inhibited from sending the SIGNALLING CONNECTION RELEASE INDICATION message with the IE "Signalling Connection Release Indication Cause" set to "UE Requested PS Data session end" whilst timer T323 is running.

After sending the SIGNALLING CONNECTION RELEASE INDICATION message with the IE "Signalling Connection Release Indication Cause" set to "UE Requested PS Data session end", if PS data becomes available for transmission then the UE shall set "triggered" in the variable TRIGGERED_SCRI_IN_PCH_STATE to FALSE.

8.1.14.2a RLC re-establishment or inter-RAT change

If a re-establishment of the transmitting side of the RLC entity on signalling radio bearer RB2 occurs before the successful delivery of the SIGNALLING CONNECTION RELEASE INDICATION message has been confirmed by RLC, the UE shall:

1> retransmit the SIGNALLING CONNECTION RELEASE INDICATION message on the uplink DCCH using AM RLC on signalling radio bearer RB2.

If an Inter-RAT handover from UTRAN procedure occurs before the successful delivery of the SIGNALLING CONNECTION RELEASE INDICATION message has been confirmed by RLC, the UE shall:

1> abort the signalling connection while in the new RAT.

8.1.14.3 Reception of SIGNALLING CONNECTION RELEASE INDICATION by the UTRAN

Upon reception of a SIGNALLING CONNECTION RELEASE INDICATION message, if the IE "Signalling Connection Release Indication Cause" is not included the UTRAN requests the release of the signalling connection from upper layers. Upper layers may then initiate the release of the signalling connection.

If the IE "Signalling Connection Release Indication Cause" is included in the SIGNALLING CONNECTION RELEASE INDICATION message the UTRAN may initiate a state transition to efficient battery consumption IDLE, CELL_PCH, URA_PCH or CELL_FACH state.

8.1.14.4 Expiry of timer T323

When timer T323 expires:

> 1> the UE may determine whether any subsequent indications from upper layers that there is no more PS data for a prolonged period in which case it triggers the transmission of a single SIGNALLING CONNECTION RELEASE INDICATION message according with clause 8.1.14.2;
>
> 1> the procedure ends.

13.4.27x TRIGGERED_SCRI_IN_PCH_STATE

This variable contains information about whether a SIGNALLING CONNECTION RELEASE INDICATION message has been triggered in CELL_PCH or URA_PCH states. There is one such variable in the UE.

| Information Element/Group name | Need | Multi | Type and reference | Semantics description |
|---|---|---|---|---|
| Triggered | OP | | Boolean | Set to FALSE on entering UTRA RRC connected mode. |

Appendix B

8.1.14 Signalling connection release indication procedure

Figure 23:
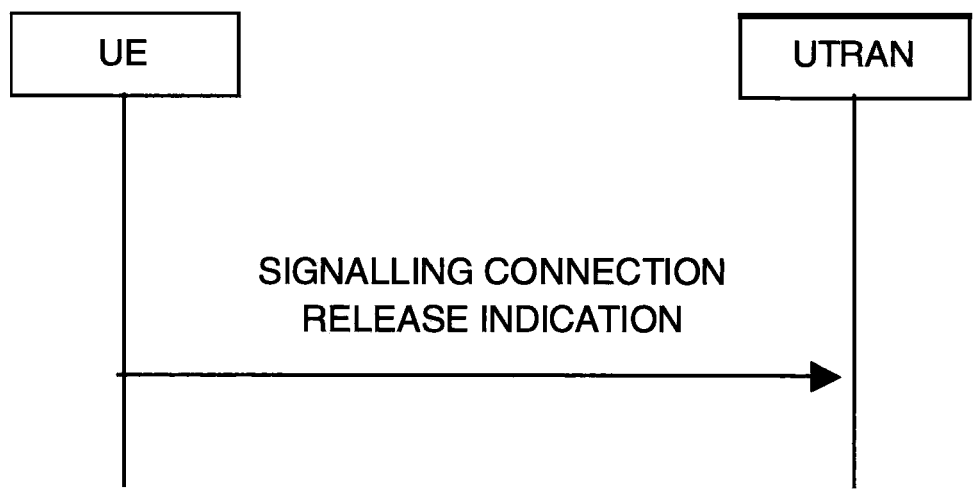
FIG. 23 illustrates a signaling connection release indication procedure, normal case.

Figure 23 illustrates a signaling connection release indication procedure, normal case.

8.1.14.1 General

The signalling connection release indication procedure is used by the UE to indicate to the UTRAN that one of its signalling connections has been released. The procedure may in turn initiate the RRC connection release procedure.

8.1.14.2 Initiation

The UE shall, on receiving a request to release (abort) the signalling connection from upper layers for a specific CN domain:

> 1> if a signalling connection in the variable ESTABLISHED_SIGNALLING_CONNECTIONS for the specific CN domain identified with the IE "CN domain identity" exists:
>
>> 2> initiate the signalling connection release indication procedure.
>
> 1> otherwise:
>
>> 2> abort any ongoing establishment of signalling connection for that specific CN domain as specified in 8.1.3.5a.

Upon initiation of the signalling connection release indication procedure in CELL_PCH or URA_PCH state, the UE shall:

> 1> if variable READY_FOR_COMMON_EDCH is set to TRUE:
>
>> 2> move to CELL_FACH state;
>>
>> 2> restart the timer T305 using its initial value if periodical cell update has been configured by T305 in the IE "UE Timers and constants in connected mode" set to any other value than "infinity".
>
> 1> else:
>
>> 2> if variable H_RNTI and variable C_RNTI are set:
>>
>>> 3> continue with the signalling connection release indication procedure as below.
>>
>> 2> else:
>>
>>> 3> perform a cell update procedure, according to subclause 8.3.1, using the cause "uplink data transmission";
>>>
>>> 3> when the cell update procedure completed successfully:
>>>
>>>> 4> continue with the signalling connection release indication procedure as below.

The UE shall:

- 1> set the IE "CN Domain Identity" to the value indicated by the upper layers. The value of the IE indicates the CN domain whose associated signalling connection the upper layers are indicating to be released;

- 1> remove the signalling connection with the identity indicated by upper layers from the variable ESTABLISHED_SIGNALLING_CONNECTIONS;

- 1> transmit a SIGNALLING CONNECTION RELEASE INDICATION message on DCCH using AM RLC.

When the successful delivery of the SIGNALLING CONNECTION RELEASE INDICATION message has been confirmed by RLC the procedure ends.

In addition, if the timer T323 value is stored in the IE "UE Timers and constants in connected mode" in the variable TIMERS_AND_CONSTANTS, and if there is no CS domain connection indicated in the variable ESTABLISHED_SIGNALLING_CONNECTIONS, the UE may:

- 1> if the upper layers indicate that there is no more PS data for a prolonged period:

- 2> if timer T323 is not running:

- 3> if the UE is in CELL_DCH state or CELL_FACH state; or

- 3> if the UE is in CELL_PCH state or URA_PCH state and V316 < N316:

- 4> if the UE is in CELL_PCH or URA_PCH state increment V316 by 1;

- 4> set the IE "CN Domain Identity" to PS domain;

- 4> set the IE "Signalling Connection Release Indication Cause" to "UE Requested PS Data session end";

- 4> transmit a SIGNALLING CONNECTION RELEASE INDICATION message on DCCH using AM RLC;

- 4> start the timer T323.

When the successful delivery of the SIGNALLING CONNECTION RELEASE INDICATION message has been confirmed by RLC the procedure ends.

The UE shall be inhibited from sending the SIGNALLING CONNECTION RELEASE INDICATION message with the IE "Signalling Connection Release Indication Cause" set to "UE Requested PS Data session end" whilst timer T323 is running.

If PS data becomes available for transmission or the UE receives a paging message that triggers cell update procedure then the UE shall V316 to zero.8.1.14.2a RLC re-establishment or inter-RAT change

If a re-establishment of the transmitting side of the RLC entity on signalling radio bearer RB2 occurs before the successful delivery of the SIGNALLING CONNECTION RELEASE INDICATION message has been confirmed by RLC, the UE shall:

> 1> retransmit the SIGNALLING CONNECTION RELEASE INDICATION message on the uplink DCCH using AM RLC on signalling radio bearer RB2.

If an Inter-RAT handover from UTRAN procedure occurs before the successful delivery of the SIGNALLING CONNECTION RELEASE INDICATION message has been confirmed by RLC, the UE shall:

> 1> abort the signalling connection while in the new RAT.

8.1.14.3 Reception of SIGNALLING CONNECTION RELEASE INDICATION by the UTRAN

Upon reception of a SIGNALLING CONNECTION RELEASE INDICATION message, if the IE "Signalling Connection Release Indication Cause" is not included the UTRAN requests the release of the signalling connection from upper layers. Upper layers may then initiate the release of the signalling connection.

If the IE "Signalling Connection Release Indication Cause" is included in the SIGNALLING CONNECTION RELEASE INDICATION message the UTRAN may initiate a state transition to efficient battery consumption IDLE, CELL_PCH, URA_PCH or CELL_FACH state.

8.1.14.4 Expiry of timer T323

When timer T323 expires:

> 1> the UE may determine whether any subsequent indications from upper layers that there is no more PS data for a prolonged period in which case it triggers the transmission of a single SIGNALLING CONNECTION RELEASE INDICATION message according with clause 8.1.14.2;
> 
> 1> the procedure ends.

8.3 RRC connection mobility procedures

8.3.1 Cell and URA update procedures

Figure 24:
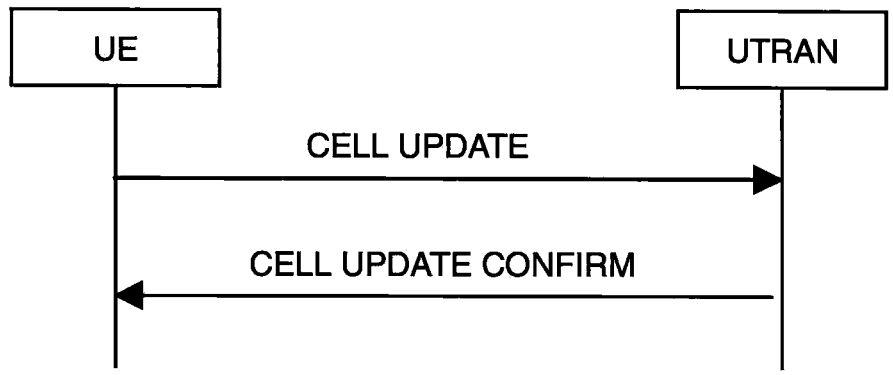
FIG. 24 illustrates a cell update procedure, basic flow.

Figure 24 illustrates a cell update procedure, basic flow.

Figure 25:
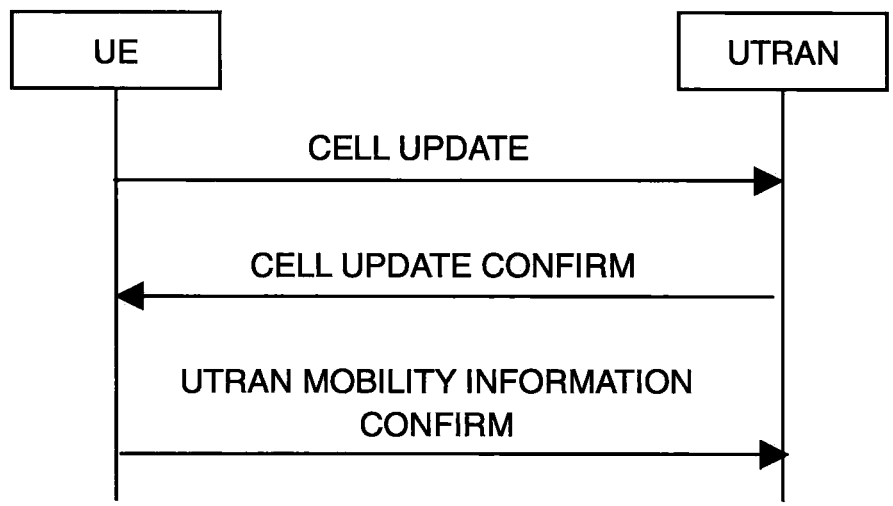
FIG. 25 illustrates a cell update procedure with update of UTRAN mobility information.

Figure 25 illustrates a cell update procedure with update of UTRAN mobility information.

Figure 26:
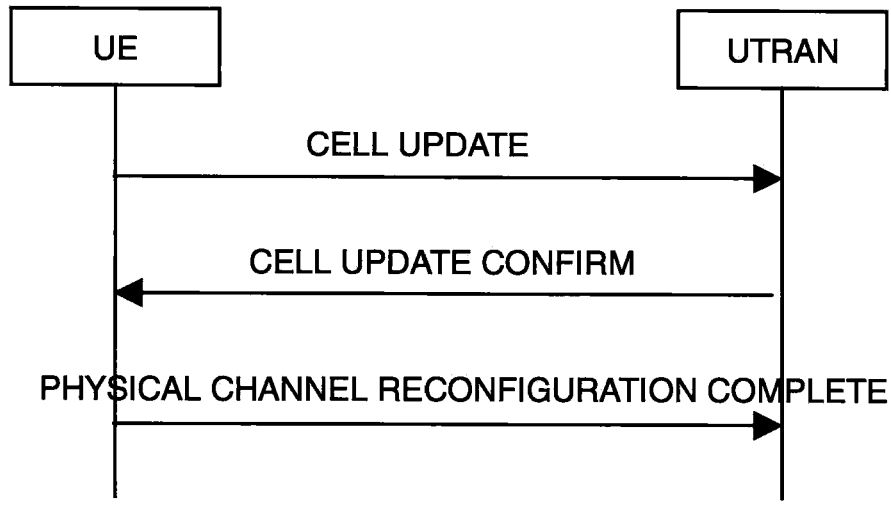
FIG. 26 illustrates a cell update procedure with physical channel reconfiguration.

Figure 26 illustrates a cell update procedure with physical channel reconfiguration.

Figure 27:
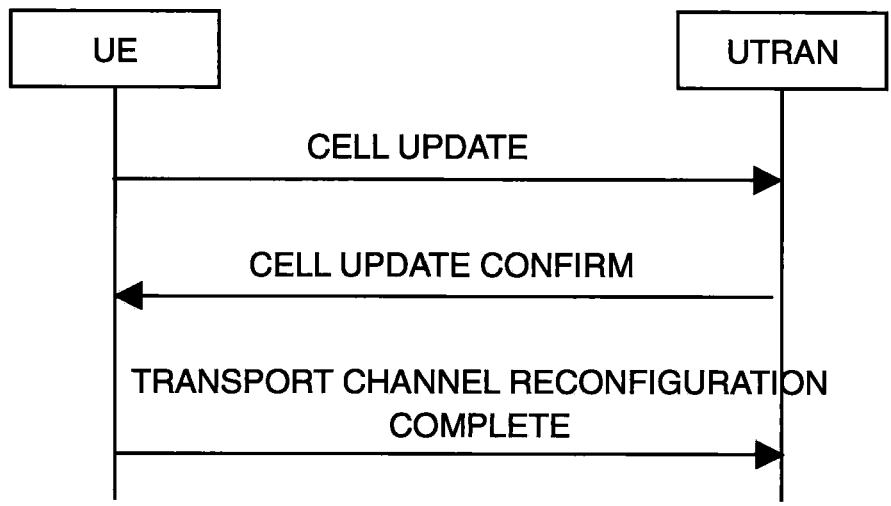
FIG. 27 illustrates a cell update procedure with transport channel reconfiguration.

Figure 27 illustrates a cell update procedure with transport channel reconfiguration.

Figure 28:
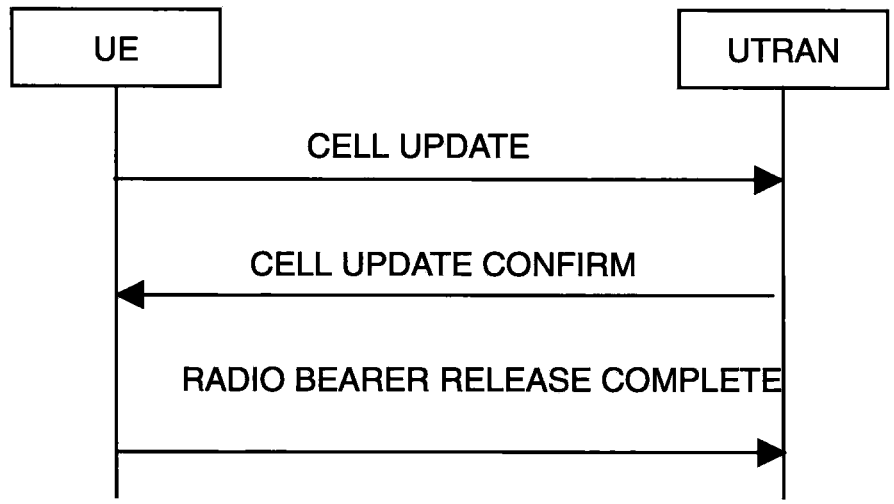
FIG. 28 illustrates a cell update procedure with radio bearer release.

Figure 28 illustrates a cell update procedure with radio bearer release.

Figure 29:
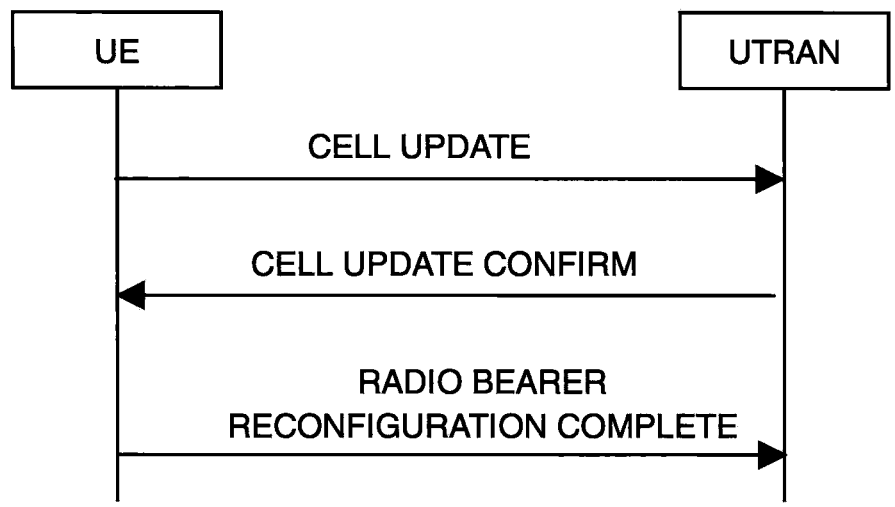
FIG. 29 illustrates a cell update procedure with radio bearer reconfiguration.

Figure 29 illustrates a cell update procedure with radio bearer reconfiguration.

Figure 30:
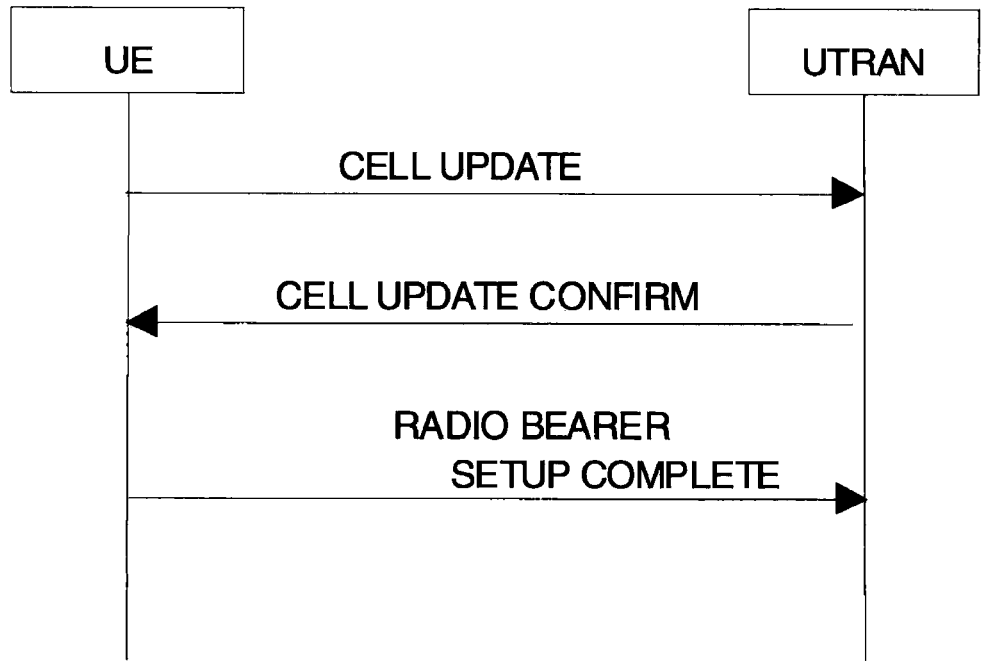
FIG. 30 illustrates a cell update procedure with radio bearer setup.

Figure 30 illustrates a cell update procedure with radio bearer setup.

Figure 31:
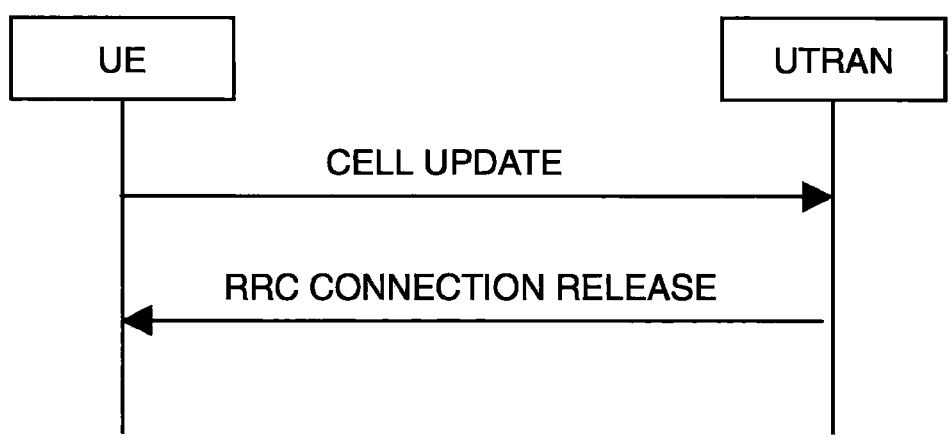
FIG. 31 illustrates a cell update procedure, failure case.

Figure 31 illustrates a cell update procedure, failure case.

Figure 32:
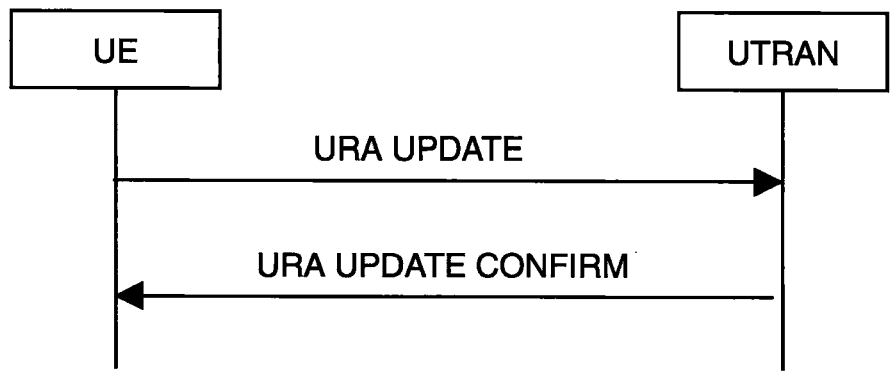
FIG. 32 illustrates a URA update procedure, basic flow.

Figure 32 illustrates a URA update procedure, basic flow.

Figure 33:
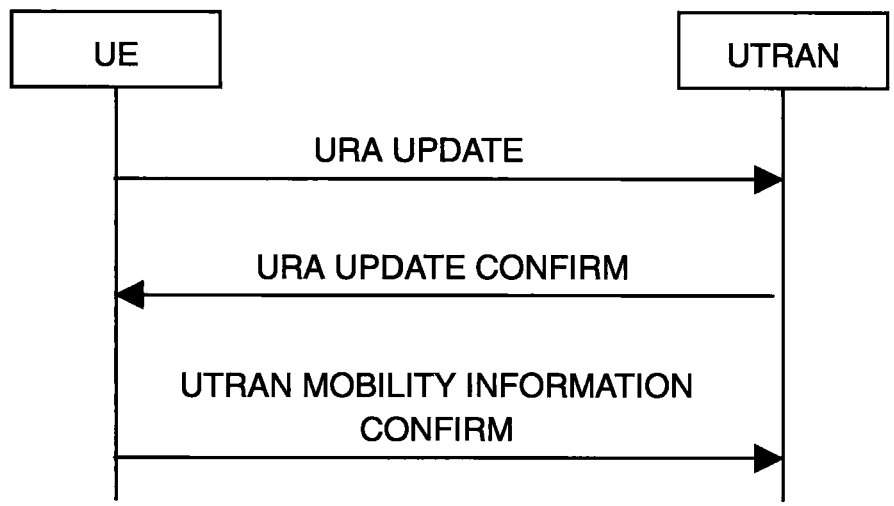
FIG. 33 illustrates a URA update procedure with update of UTRAN mobility information.

Figure 33 illustrates a URA update procedure with update of UTRAN mobility information.

Figure 34:
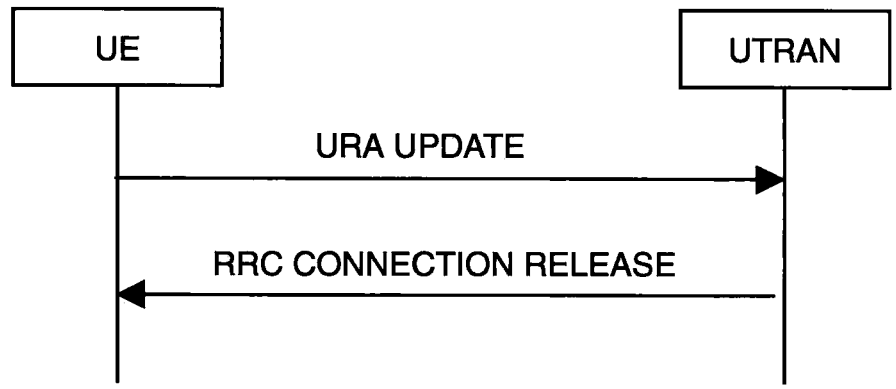
FIG. 34 illustrates a URA update procedure, failure case.

Figure 34 illustrates a URA update procedure, failure case.

8.3.1.1 General

The URA update and cell update procedures serve several main purposes:

- to notify UTRAN after re-entering service area in the URA_PCH or CELL_PCH state;

- to notify UTRAN of an RLC unrecoverable error [16] on an AM RLC entity;

- to be used as a supervision mechanism in the CELL_FACH, CELL_PCH, or URA_PCH state by means of periodical update.

In addition, the URA update procedure also serves the following purpose:

- to retrieve a new URA identity after cell re-selection to a cell not belonging to the current URA assigned to the UE in URA_PCH state.

In addition, the cell update procedure also serves the following purposes:

- to update UTRAN with the current cell the UE is camping on after cell reselection;

- to act on a radio link failure in the CELL_DCH state;

- to act on the transmission failure of the UE CAPABILITY INFORMATION message;

- for FDD and 1.28 Mcps TDD, if the variable H_RNTI is not set, and for 3.84 Mcps TDD and 7.68 Mcps TDD: when triggered in the URA_PCH or CELL_PCH state, to notify UTRAN of a transition to the CELL_FACH state due to the reception of UTRAN originated paging or due to a request to transmit uplink data;

- to count the number of UEs in URA_PCH, CELL_PCH and CELL_FACH that are interested to receive an MBMS transmission;

- when triggered in the URA_PCH, CELL_PCH and CELL_FACH state, to notify UTRAN of the UEs interest to receive an MBMS service;

- to request the MBMS P-T-P RB setup by the UE in CELL_PCH, URA_PCH and CELL_FACH state.

The URA update and cell update procedures may:

1> include an update of mobility related information in the UE;

1> cause a state transition from the CELL_FACH state to the CELL_DCH, CELL_PCH or URA_PCH states or idle mode.

The cell update procedure may also include:
- a re-establish of AM RLC entities;
- a radio bearer release, radio bearer reconfiguration, transport channel reconfiguration or physical channel reconfiguration.

8.3.1.2 Initiation

A UE shall initiate the cell update procedure in the following cases:

1> Uplink data transmission:

2> for FDD and 1.28 Mcps TDD, if the variable H_RNTI is not set, and for 3.84 Mcps TDD and 7.68 Mcps TDD:

3> if the UE is in URA_PCH or CELL_PCH state; and

3> if timer T320 is not running:

4> if the UE has uplink RLC data PDU or uplink RLC control PDU on RB1 or upwards to transmit:

5> perform cell update using the cause "uplink data transmission".

3> else:

4> if the variable ESTABLISHMENT_CAUSE is set:

5> perform cell update using the cause "uplink data transmission".

1> Paging response:

2> if the criteria for performing cell update with the cause specified above in the current subclause are not met; and 2> if the UE in URA_PCH or CELL_PCH state, receives a PAGING TYPE 1 message fulfilling the conditions for initiating a cell update procedure specified in subclause 8.1.2.3:

3> perform cell update using the cause "paging response".

1> Radio link failure:

2> if none of the criteria for performing cell update with the causes specified above in the current subclause is met:

3> if the UE is in CELL_DCH state and the criteria for radio link failure are met as specified in subclause 8.5.6; or 3> if the transmission of the UE CAPABILITY INFORMATION message fails as specified in subclause 8.1.6.6:

4> perform cell update using the cause "radio link failure".

1> MBMS ptp RB request:

2> if none of the criteria for performing cell update with the causes specified above in the current subclause is met; and 2> if the UE is in URA_PCH, Cell_PCH or Cell_FACH state; and 2> if timer T320 is not running; and 2> if the UE should perform cell update for MBMS ptp radio bearer request as specified in subclause 8.6.9.6:

3> perform cell update using the cause "MBMS ptp RB request".

1> Re-entering service area:

2> if none of the criteria for performing cell update with the causes specified above in the current subclause is met; and 2> if the UE is in CELL_FACH or CELL_PCH state; and 2> if the UE has been out of service area and re-enters service area before T307 or T317 expires:

3> perform cell update using the cause "re-entering service area".

1> RLC unrecoverable error:

2> if none of the criteria for performing cell update with the causes specified above in the current subclause is met; and 2> if the UE detects RLC unrecoverable error [16] in an AM RLC entity:

3> perform cell update using the cause "RLC unrecoverable error".

1> Cell reselection:

2> if none of the criteria for performing cell update with the causes specified above in the current subclause is met:

3> if the UE is in CELL_FACH or CELL_PCH state and the UE performs cell re-selection; or 3> if the UE is in CELL_FACH state and the variable C_RNTI is empty:

4> perform cell update using the cause "cell reselection".

1> Periodical cell update:

2> if none of the criteria for performing cell update with the causes specified above in the current subclause is met; and 2> if the UE is in CELL_FACH or CELL_PCH state; and 2> if the timer T305 expires; and 2> if the criteria for "in service area" as specified in subclause 8.5.5.2 are fulfilled; and 2> if periodic updating has been configured by T305 in the IE "UE Timers and constants in connected mode" set to any other value than "infinity":

3> for FDD:

4> if the variable COMMON_E_DCH_TRANSMISSION is set to FALSE:

5> perform cell update using the cause "periodical cell update".

4> else:

5> restart the timer T305;

5> and end the procedure.

3> for 1.28 Mcps TDD and 3.84/7.68 Mcps TDD:

4> perform cell update using the cause "periodical cell update".

1> MBMS reception:

2> if none of the criteria for performing cell update with the causes specified above in the current subclause is met; and 2> if the UE is in URA_PCH, Cell_PCH or Cell_FACH state; and 2> if the UE should perform cell update for MBMS counting as specified in subclause 8.7.4:

3> perform cell update using the cause "MBMS reception".

A UE in URA_PCH state shall initiate the URA update procedure in the following cases:

1> URA reselection:

2> if the UE detects that the current URA assigned to the UE, stored in the variable URA_IDENTITY, is not present in the list of URA identities in system information block type 2; or 2> if the list of URA identities in system information block type 2 is empty; or 2> if the system information block type 2 can not be found:

3> perform URA update using the cause "change of URA".

1> Periodic URA update:

2> if the criteria for performing URA update with the causes as specified above in the current subclause are not met:

3> if the timer T305 expires and if periodic updating has been configured by T305 in the IE "UE Timers and constants in connected mode" set to any other value than "infinity"; or 3> if the conditions for initiating an URA update procedure specified in subclause 8.1.1.6.5 are fulfilled:

4> perform URA update using the cause "periodic URA update".

When initiating the URA update or cell update procedure, the UE shall:

1> if the UE has uplink RLC data PDU or uplink RLC control PDU on RB3 or upwards to transmit; or 1> if the UE received a PAGING TYPE 1 message fulfilling the conditions for initiating a cell update procedure specified in subclause 8.1.2.3:

2> set the counter V316 to zero.

1> if timer T320 is running:

2> stop timer T320;

2> if the UE has uplink RLC data PDU or uplink RLC control PDU on RB1 or upwards to transmit:

3> perform cell update using the cause "uplink data transmission".

2> else:

3> if the cell update procedure is not triggered due to Paging response or Radio link failure; and 3> if the UE should perform cell update for MBMS ptp radio bearer request as specified in subclause 8.6.9.6:

4> perform cell update using the cause "MBMS ptp RB request".

1> stop timer T319 if it is running;

1> stop timer T305;

1> for FDD and 1.28 Mcps TDD:

2> if the UE is in CELL_FACH state; and

2> if the IE "HS-DSCH common system information" is included in System Information Block type 5 or System Information Block type 5bis; and 2> for 1.28 Mcps TDD, if IE "Common E-DCH system info" in System Information Block type 5; and 2> if the UE does support HS-DSCH reception in CELL_FACH state:

3> if variable H_RNTI is not set or variable C_RNTI is not set:

4> clear variable H_RNTI;

4> clear variable C_RNTI;

4> clear any stored IEs "HARQ info";

4> set variable HS_DSCH_RECEPTION_OF_CCCH_ENABLED to TRUE;

4> and start receiving the HS-DSCH transport channels mapped physical channel(s) of type HS-SCCH and HS-PDSCH, by using parameters given by the IE(s) "HS-DSCH common system information" according to the procedure in subclause 8.5.37.

3> else:

4> receive the HS-DSCH transport channels mapped physical channel(s) of type HS-SCCH and HS-PDSCH, by using parameters given by the IE(s) "HS-DSCH common system information" according to the procedure in subclause 8.5.36;

4> determine the value for the HSPA_RNTI_STORED_CELL_PCH variable and take the corresponding actions as described in subclause 8.5.56;

4> determine the value for the READY_FOR_COMMON_EDCH variable and take the corresponding actions as described in subclause 8.5.47;

4> determine the value for the COMMON_E_DCH_TRANSMISSION variable and take the corresponding actions as described in subclause 8.5.46;

4> if variable READY_FOR_COMMON_EDCH is set to TRUE:

5> configure the Enhanced Uplink in CELL_FACH state and Idle mode as specified in subclause 8.5.45 for FDD and 8.5.45a for 1.28 Mcps TDD.

1> if the UE is in CELL_DCH state:

2> in the variable RB_TIMER_INDICATOR, set the IE "T314 expired" and the IE "T315 expired" to FALSE;

2> if the stored values of the timer T314 and timer T315 are both equal to zero; or 2> if the stored value of the timer T314 is equal to zero and there are no radio bearers associated with any radio access bearers for which in the variable ESTABLISHED_RABS the value of the IE "Re-establishment timer" is set to "useT315" and signalling connection exists only to the CS domain:

3> release all its radio resources;

3> indicate release (abort) of the established signalling connections (as stored in the variable ESTABLISHED_SIGNALLING_CONNECTIONS) and established radio access bearers (as stored in the variable ESTABLISHED_RABS) to upper layers;

3> clear the variable ESTABLISHED_SIGNALLING_CONNECTIONS;

3> clear the variable ESTABLISHED_RABS;

3> enter idle mode;

3> perform other actions when entering idle mode from connected mode as specified in subclause 8.5.2;

3> and the procedure ends.

2> if the stored value of the timer T314 is equal to zero:

3> release all radio bearers, associated with any radio access bearers for which in the variable ESTABLISHED_RABS the value of the IE "Re-establishment timer" is set to "useT314";

3> in the variable RB_TIMER_INDICATOR set the IE "T314 expired" to TRUE;

3> if all radio access bearers associated with a CN domain are released:

4> release the signalling connection for that CN domain;

4> remove the signalling connection for that CN domain from the variable ESTABLISHED_SIGNALLING_CONNECTIONS;

4> indicate release (abort) of the signalling connection to upper layers;

2> if the stored value of the timer T315 is equal to zero:

3> release all radio bearers associated with any radio access bearers for which in the variable ESTABLISHED_RABS the value of the IE "Re-establishment timer" is set to "useT315";

3> in the variable RB_TIMER_INDICATOR set the IE "T315 expired" to TRUE.

3> if all radio access bearers associated with a CN domain are released:

4> release the signalling connection for that CN domain;

4> remove the signalling connection for that CN domain from the variable ESTABLISHED_SIGNALLING_CONNECTIONS;

4> indicate release (abort) of the signalling connection to upper layers;

2> if the stored value of the timer T314 is greater than zero:

3> if there are radio bearers associated with any radio access bearers for which in the variable ESTABLISHED_RABS the value of the IE "Re-establishment timer" is set to "useT314":

4> start timer T314.

3> if there are no radio bearers associated with any radio access bearers for which in the variable ESTABLISHED_RABS the value of the IE "Re-establishment timer" is set to "useT314" or "useT315" and the signalling connection exists to the CS domain:

4> start timer T314.

2> if the stored value of the timer T315 is greater than zero:

3> if there are radio bearers associated with any radio access bearers for which in the variable ESTABLISHED_RABS the value of the IE "Re-establishment timer" is set to "useT315"; or 3> if the signalling connection exists to the PS domain:

4> start timer T315.

2> for the released radio bearer(s):

3> delete the information about the radio bearer from the variable ESTABLISHED_RABS;

3> when all radio bearers belonging to the same radio access bearer have been released:

4> indicate local end release of the radio access bearer to upper layers using the CN domain identity together with the RAB identity stored in the variable ESTABLISHED_RABS;

4> delete all information about the radio access bearer from the variable ESTABLISHED_RABS.

2> if the variable E_DCH_TRANSMISSION is set to TRUE:

3> set the variable E_DCH_TRANSMISSION to FALSE;

3> stop any E-AGCH and E-HICH reception procedures;

3> for FDD, stop any E-RGCH reception procedures.

3> for FDD, stop any E-DPCCH and E-DPDCH transmission procedures.

3> for 1.28 Mcps TDD, stop any E-PUCH transmission procedure.

3> clear the variable E_RNTI;

3> act as if the IE "MAC-es/e reset indicator" was received and set to TRUE;

3> release all E-DCH HARQ resources;

3> no longer consider any radio link to be the serving E-DCH radio link.

2> move to CELL_FACH state;

2> select a suitable UTRA cell on the current frequency according to [4];

2> clear variable E_RNTI and:

3> determine the value for the HSPA_RNTI_STORED_CELL_PCH variable and take the corresponding actions as described in subclause 8.5.56;

3> determine the value for the READY_FOR_COMMON_EDCH variable and take the corresponding actions as described in subclause 8.5.47;

3> determine the value for the COMMON_E_DCH_TRANSMISSION variable and take the corresponding actions as described in subclause 8.5.46.

2> for 3.84 Mcps TDD and 7.68Mcps TDD; or

2> for FDD and 1.28 Mcps TDD, if the UE does not support HS-DSCH reception in CELL_FACH state; or 2> if the IE "HS-DSCH common system information" is not included in System Information Block type 5 or System Information Block type 5bis; or 2> for 1.28 Mcps TDD, if the IE "Common E-DCH system info" is not included in System Information Block type 5:

3> select PRACH according to subclause 8.5.17;

3> select Secondary CCPCH according to subclause 8.5.19;

3> use the transport format set given in system information as specified in subclause 8.6.5.1;

3> take the actions related to the HS_DSCH_RECEPTION_GENERAL variable as described in subclause 8.5.37a.

2> else:

3> if variable READY_FOR_COMMON_EDCH is set to TRUE:

4> configure the Enhanced Uplink in CELL_FACH state and Idle mode as specified in subclause 8.5.45.

3> else:

4> select PRACH according to subclause 8.5.17 and:

5> use for the PRACH the transport format set given in system information as specified in subclause 8.6.5.1.

3> clear variable H_RNTI;

3> clear any stored IEs "HARQ info";

3> reset the MAC-ehs entity [15];

3> set variable HS_DSCH_RECEPTION_OF_CCCH_ENABLED to TRUE;

3> and start receiving the HS-DSCH according to the procedure in subclause 8.5.37.

2> set the variable ORDERED_RECONFIGURATION to FALSE.

1> set the variables PROTOCOL_ERROR_INDICATOR, FAILURE_INDICATOR, UNSUPPORTED_CONFIGURATION and INVALID_CONFIGURATION to FALSE;

1> set the variable CELL_UPDATE_STARTED to TRUE;

1> if any IEs relegated to HS-DSCH are stored in the UE:

2> clear any stored IE "Downlink HS-PDSCH information";

2> clear any stored IE "Downlink Secondary Cell Info FDD";

2> clear all the entries from the variable TARGET_CELL_PRECONFIGURATION;

2> for 1.28Mcps TDD, clear the IE "HS-PDSCH Midamble Configuration" and the IE "HS-SCCH Set Configuration" in the IE "DL Multi Carrier Information";

2> determine the value for the HS_DSCH_RECEPTION variable and take the corresponding actions as described in subclause 8.5.25;

2> determine the value for the SECONDARY_CELL_HS_DSCH_RECEPTION variable and take the corresponding actions as described in subclause 8.5.51.

1> if any IEs related to E-DCH are stored in the UE:

2> clear any stored IE "E-DCH info";

2> determine the value for the E_DCH_TRANSMISSION variable and take the corresponding actions as described in subclause 8.5.28.

1> if any of the IEs "DTX-DRX timing information" or "DTX-DRX information" are stored in the UE:

2> determine the value for the DTX_DRX_STATUS variable and take the corresponding actions as described in subclause 8.5.34.

1> if the IE "HS-SCCH less information" is stored in the UE:

2> determine the value for the HS_SCCH_LESS_STATUS variable and take the corresponding actions as described in subclause 8.5.35.

1> if any IEs related to MIMO are stored in the UE:

2> determine the value for the MIMO_STATUS variable and take the corresponding actions as described in subclause 8.5.33.

1> for 1.28 Mcps TDD, if the IEs "Control Channel DRX Information" is stored in the UE:

2> determine the value for the CONTROL_CHANNEL_DRX_STATUS variable and take the corresponding actions as described in subclause 8.5.53.

1> for 1.28 Mcps TDD, if the IE "SPS information" is stored in the UE:

2> determine the value for the E_DCH_SPS_STATUS variable and take the corresponding actions as described in subclause 8.5.54;

2> determine the value for the HS_DSCH_SPS_STATUS variable and take the corresponding actions as described in subclause 8.5.55.

1> if the UE is not already in CELL_FACH state:

2> move to CELL_FACH state;

2> determine the value for the HSPA_RNTI_STORED_CELL_PCH variable and take the corresponding actions as described in subclause 8.5.56;

2> determine the value for the READY_FOR_COMMON_EDCH variable and take the corresponding actions as described in subclause 8.5.47;

2> determine the value for the COMMON_E_DCH_TRANSMISSION variable and take the corresponding actions as described in subclause 8.5.46;

2> for 3.84 Mcps TDD and 7.68 Mcps TDD; or

2> for FDD and 1.28 Mcps TDD, if the UE does not support HS-DSCH reception in CELL_FACH state; or 2> if the IE "HS-DSCH common system information" is not included in System Information Block type 5 or System Information Block type 5bis; or 2> for 1.28 Mcps TDD, if the IE "Common E-DCH system info" is not included in System Information Block type 5:

3> select PRACH according to subclause 8.5.17;

3> select Secondary CCPCH according to subclause 8.5.19;

3> use the transport format set given in system information as specified in subclause 8.6.5.1;

3> take the actions related to the HS_DSCH_RECEPTION_GENERAL variable as described in subclause 8.5.37a.

2> else:

3> if variable READY_FOR_COMMON_EDCH is set to TRUE:

4> configure the Enhanced Uplink in CELL_FACH state and Idle mode as specified in subclause 8.5.45.

3> else:

4> select PRACH according to subclause 8.5.17 and:

5> use for the PRACH the transport format set given in system information as specified in subclause 8.6.5.1.

3> if variable H_RNTI is not set or variable C_RNTI is not set:

4> clear variable C_RNTI;

4> clear variable H_RNTI;

4> clear any stored IEs "HARQ info";

4> set variable HS_DSCH_RECEPTION_OF_CCCH_ENABLED to TRUE;

4> and start receiving the HS-DSCH according to the procedure in subclause 8.5.37.

3> else:

4> receive the HS-DSCH according to the procedure in subclause 8.5.36.

1> if the UE performs cell re-selection:

2> clear the variable C_RNTI; and

2> stop using that C_RNTI just cleared from the variable C_RNTI in MAC;

2> for FDD and 1.28 Mcps TDD, if the variable H_RNTI is set:

3> clear the variable H_RNTI; and

3> stop using that H_RNTI just cleared from the variable H_RNTI in MAC;

3> clear any stored IEs "HARQ info";

2> for FDD and 1.28 Mcps TDD, if the variable E_RNTI is set:

3> clear the variable E_RNTI.

2> determine the value for the HSPA_RNTI_STORED_CELL_PCH variable and take the corresponding actions as described in subclause 8.5.56;

2> determine the value for the READY_FOR_COMMON_EDCH variable and take the corresponding actions as described in subclause 8.5.47;

2> determine the value for the COMMON_E_DCH_TRANSMISSION variable and take the corresponding actions as described in subclause 8.5.46;

2> for FDD and 1.28 Mcps TDD, if the UE does support HS-DSCH reception in CELL_FACH state and IE "HS-DSCH common system information" is included in System Information Block type 5 or System Information Block type 5bis:

3> reset the MAC-ehs entity [15].

3> set variable HS_DSCH_RECEPTION_OF_CCCH_ENABLED to TRUE;

3> and start receiving the HS-DSCH according to the procedure in subclause 8.5.37.

2> else:

3> take the actions related to the HS_DSCH_RECEPTION_GENERAL variable as described in subclause 8.5.37a.

1> set CFN in relation to SFN of current cell according to subclause 8.5.15;

1> in case of a cell update procedure:

2> set the contents of the CELL UPDATE message according to subclause 8.3.1.3;

2> submit the CELL UPDATE message for transmission on the uplink CCCH.

1> in case of a URA update procedure:

2> set the contents of the URA UPDATE message according to subclause 8.3.1.3;

2> submit the URA UPDATE message for transmission on the uplink CCCH.

1> set counter V302 to 1;

1> start timer T302 when the MAC layer indicates success or failure in transmitting the message.

10.3.3.43 UE Timers and Constants in connected mode

This information element specifies timer- and constants values used by the UE in connected mode.

| Information Element/Group name | Need | Multi | Type and reference | Semantics description | Version |
|---|---|---|---|---|---|
| T301 | MD | | Integer(100, 200 .. 2000 by step of 200, 3000, 4000, 6000, 8000) | Value in milliseconds. Default value is 2000. This IE should not be used by the UE in this release of the protocol. One spare value is needed. | |
| N301 | MD | | Integer(0..7) | Default value is 2. This IE should not be used by the UE in this release of the protocol. | |
| T302 | MD | | Integer(100, 200... 2000 by step of 200, 3000, 4000, 6000, 8000) | Value in milliseconds. Default value is 4000. One spare value is needed. | |
| N302 | MD | | Integer(0..7) | Default value is 3. | |
| T304 | MD | | Integer(100, 200, 400, 1000, 2000) | Value in milliseconds. Default value is 2000. Three spare values are needed. | |
| N304 | MD | | Integer(0..7) | Default value is 2.. | |
| T305 | MD | | Integer(5, 10, 30, 60, 120, 360, 720, infinity) | Value in minutes. Default value is 30. Infinity means no update | |
| T307 | MD | | Integer(5, 10, 15, 20, 30, 40, 50) | Value in seconds. Default value is 30. One spare value is needed. | |
| T308 | MD | | Integer(40, 80, 160, 320) | Value in milliseconds. Default value is 160. | |
| T309 | MD | | Integer(1...8) | Value in seconds. Default value is 5. | |
| T310 | MD | | Integer(40 .. 320 by step of 40) | Value in milliseconds. Default value is 160. | |
| N310 | MD | | Integer(0..7) | Default value is 4. | |
| T311 | MD | | Integer(250 .. 2000 by step of 250) | Value in milliseconds. Default value is 2000. | |
| T312 | MD | | Integer (0..15) | Value in seconds. Default value is 1. The value 0 is not used in this version of the specification. | |
| N312 | MD | | Integer (1, | Default value is 1. | |

| Information Element/Group name | Need | Multi | Type and reference | Semantics description | Version |
|---|---|---|---|---|---|
| | | | 2, 4, 10, 20, 50, 100, 200, 400, 600, 800, 1000) | | |
| T313 | MD | | Integer (0..15) | Value in seconds. Default value is 3. | |
| N313 | MD | | Integer (1, 2, 4, 10, 20, 50, 100, 200) | Default value is 20. | |
| T314 | MD | | Integer(0, 2, 4, 6, 8, 12, 16, 20) | Value in seconds. Default value is 12. | |
| T315 | MD | | Integer (0,10, 30, 60, 180, 600, 1200, 1800) | Value in seconds. Default value is 180. | |
| N315 | MD | | Integer (1, 2, 4, 10, 20, 50, 100, 200, 400, 600, 800, 1000) | Default value is 1. | |
| T316 | MD | | Integer(0, 10, 20, 30, 40, 50, infinity) | Value in seconds. Default value is 30. One spare value is needed. | |
| T317 | MD | | | Default value is infinity. | |
| | | | Enumerated (infinity, infinity, infinity, infinity, infinity, infinity, infinity, infinity) | All the values are changed to "infinity" in the Rel-5. | REL-5 |
| T323 | OP | | Enumerated (0, 5, 10, 20, 30, 60, 90, 120) | Value in seconds. The use of 0secs indicates no need to apply the inhibit timer. | REL-8 |
| N316 | OP | | Integer (0, 1, 2) | Maximum number of transmissions of the SIGNALLING CONNECTION RELEASE INDICATION message, with the IE "Signalling Connection Release Indication Cause" set to "UE Requested PS Data session end" in CELL_PCH or URA_PCH. | Rel-8 |

13.4.27x TRIGGERED_SCRI_IN_PCH_STATE

This variable contains information about whether a SIGNALLING CONNECTION RELEASE INDICATION message has been triggered in CELL_PCH or URA_PCH states. There is one such variable in the UE.

| Information Element/Group name | Need | Multi | Type and reference | Semantics description |
|---|---|---|---|---|
| Triggered | OP | | Boolean | Set to FALSE on entering UTRA RRC connected mode. |

13.2 Counters for UE

| Counter | Reset | Incremented | When reaching max value |
|---|---|---|---|
| V300 | When initiating the procedure RRC connection establishment | Upon expiry of T300. | When V300 > N300, the UE enters idle mode. |
| V302 | When initiating the procedure Cell update or URA update | Upon expiry of T302 | When V302 > N302 the UE enters idle mode. |
| V304 | When sending the first UE CAPABILITY INFORMATION message. | Upon expiry of T304 | When V304 > N304 the UE initiates the Cell update procedure |
| V308 | When sending the first RRC CONNECTION RELEASE COMPLETE message in a RRC connection release procedure. | Upon expiry of T308 | When V308 > N308 the UE stops re-transmitting the RRC CONNECTION RELEASE COMPLETE message. |
| V310 | When sending the first PUSCH CAPACITY REQUEST message in a PUSCH capacity request procedure | Upon expiry of T310 | When V310 > N310 the UE stops re-transmitting the PUSCH CAPACITY REQUEST message. |
| V316 | When entering UTRA RRC Connected mode or when PS data becomes available for uplink transmission or when UE receives paging message that triggers cell update procedure. | Upon sending the SIGNALLING CONNECTION RELEASE INDICATION message, with the IE "Signalling Connection Release Indication Cause" set to "UE Requested PS Data session end" in CELL_PCH or URA_PCH. | When V316>=N316 then UE stops sending any further SIGNALLING CONNECTION RELEASE INDICATION message, with the IE "Signalling Connection Release Indication Cause" set to "UE Requested PS Data session end" in CELL_PCH or URA_PCH. |

13.3 UE constants and parameters

| Constant | Usage |
|---|---|
| N300 | Maximum number of retransmissions of the RRC CONNECTION REQUEST message |
| N302 | Maximum number of retransmissions of the CELL UPDATE / URA UPDATE message |
| N304 | Maximum number of retransmissions of the UE CAPABILITY INFORMATION message |
| N308 | Maximum number of retransmissions of the RRC CONNECTION RELEASE COMPLETE message |
| N310 | Maximum number of retransmission of the PUSCH CAPACITY REQUEST message |
| N312 | Maximum number of "in sync" received from L1. |
| N313 | Maximum number of successive "out of sync" received from L1. |
| N315 | Maximum number of successive "in sync" received from L1 during T313 is activated. |
| N316 | Maximum number of transmissions of the SIGNALLING CONNECTION RELEASE INDICATION message, with the IE "Signalling Connection Release Indication Cause" set to "UE Requested PS Data session end" in CELL_PCH or URA_PCH. |

13.2 Counters for UE

| Counter | Reset | Incremented | When reaching max value |
|---|---|---|---|
| V300 | When initiating the procedure RRC connection establishment | Upon expiry of T300. | When V300 > N300, the UE enters idle mode. |
| V302 | When initiating the procedure Cell update or URA update | Upon expiry of T302 | When V302 > N302 the UE enters idle mode. |
| V304 | When sending the first UE CAPABILITY INFORMATION message. | Upon expiry of T304 | When V304 > N304 the UE initiates the Cell update procedure |
| V308 | When sending the first RRC CONNECTION RELEASE COMPLETE message in a RRC connection release procedure. | Upon expiry of T308 | When V308 > N308 the UE stops re-transmitting the RRC CONNECTION RELEASE COMPLETE message. |
| V310 | When sending the first PUSCH CAPACITY REQUEST message in a PUSCH capacity request procedure | Upon expiry of T310 | When V310 > N310 the UE stops re-transmitting the PUSCH CAPACITY REQUEST message. |
| V316 | When entering UTRA RRC Connected mode or when PS data becomes available for uplink transmission or when UE receives paging message that triggers cell update procedure. | Upon sending the SIGNALLING CONNECTION RELEASE INDICATION message, with the IE "Signalling Connection Release Indication Cause" set to "UE Requested PS Data session end" in CELL_PCH or URA_PCH. | When V316>=N316 then UE stops sending any further SIGNALLING CONNECTION RELEASE INDICATION message, with the IE "Signalling Connection Release Indication Cause" set to "UE Requested PS Data session end" in CELL_PCH or URA_PCH. |

13.3 UE constants and parameters

| Constant | Usage |
|---|---|
| N300 | Maximum number of retransmissions of the RRC CONNECTION REQUEST message |
| N302 | Maximum number of retransmissions of the CELL UPDATE / URA UPDATE message |
| N304 | Maximum number of retransmissions of the UE CAPABILITY INFORMATION message |
| N308 | Maximum number of retransmissions of the RRC CONNECTION RELEASE COMPLETE message |
| N310 | Maximum number of retransmission of the PUSCH CAPACITY REQUEST message |
| N312 | Maximum number of "in sync" received from L1. |
| N313 | Maximum number of successive "out of sync" received from L1. |
| N315 | Maximum number of successive "in sync" received from L1 during T313 is activated. |
| N316 | Maximum number of transmissions of the SIGNALLING CONNECTION RELEASE INDICATION message, with the IE "Signalling Connection Release Indication Cause" set to "UE Requested PS Data session end" in CELL_PCH or URA_PCH. |

Appendix C

8.1.14 Signalling connection release indication procedure

Figure 35:
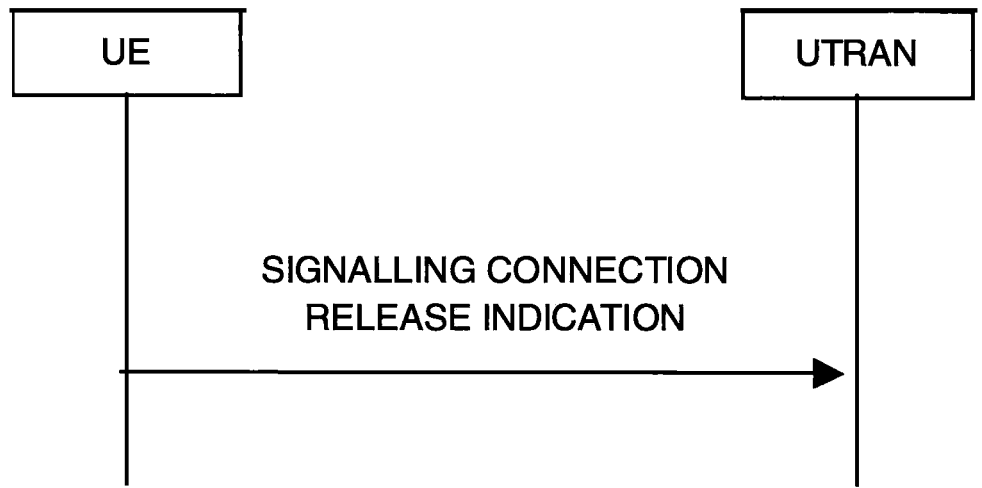
FIG. 35 illustrates a signalling connection release indication procedure, normal case.

Figure 35 illustrates a signalling connection release indication procedure, normal case.

8.1.14.1 General

The signalling connection release indication procedure is used by the UE to indicate to the UTRAN that one of its signalling connections has been released. The procedure may in turn initiate the RRC connection release procedure.

8.1.14.2 Initiation

The UE shall, on receiving a request to release (abort) the signalling connection from upper layers for a specific CN domain:

1> if a signalling connection in the variable ESTABLISHED_SIGNALLING_CONNECTIONS for the specific CN domain identified with the IE "CN domain identity" exists:

2> initiate the signalling connection release indication procedure.

1> otherwise:

2> abort any ongoing establishment of signalling connection for that specific CN domain as specified in 8.1.3.5a.

Upon initiation of the signalling connection release indication procedure in CELL_PCH or URA_PCH state, the UE shall:

1> if variable READY_FOR_COMMON_EDCH is set to TRUE:

2> move to CELL_FACH state;

2> restart the timer T305 using its initial value if periodical cell update has been configured by T305 in the IE "UE Timers and constants in connected mode" set to any other value than "infinity".

1> else:

2> if variable H_RNTI and variable C_RNTI are set:

3> continue with the signalling connection release indication procedure as below.

2> else:

3> perform a cell update procedure, according to subclause 8.3.1, using the cause "uplink data transmission";

3> when the cell update procedure completed successfully:

4> continue with the signalling connection release indication procedure as below.

The UE shall:

1> set the IE "CN Domain Identity" to the value indicated by the upper layers. The value of the IE indicates the CN domain whose associated signalling connection the upper layers are indicating to be released;

1> remove the signalling connection with the identity indicated by upper layers from the variable ESTABLISHED_SIGNALLING_CONNECTIONS;

1> transmit a SIGNALLING CONNECTION RELEASE INDICATION message on DCCH using AM RLC.

When the successful delivery of the SIGNALLING CONNECTION RELEASE INDICATION message has been confirmed by RLC the procedure ends.

In addition, if the timer T323 value is stored in the IE "UE Timers and constants in connected mode" in the variable TIMERS_AND_CONSTANTS, and if there is no CS domain connection indicated in the variable ESTABLISHED_SIGNALLING_CONNECTIONS, the UE may:

1> if the upper layers indicate that there is no more PS data for a prolonged period:

2> if timer T323 is not running:

3> if the UE is in CELL_DCH state or CELL_FACH state; or

3> if the UE is in CELL_PCH state or URA_PCH state and V316 < N316:

4> if the UE is in CELL_PCH or URA_PCH state increment V316 by 1;

4> set the IE "CN Domain Identity" to PS domain;

4> set the IE "Signalling Connection Release Indication Cause" to "UE Requested PS Data session end";

4> transmit a SIGNALLING CONNECTION RELEASE INDICATION message on DCCH using AM RLC;

4> start the timer T323.

When the successful delivery of the SIGNALLING CONNECTION RELEASE INDICATION message has been confirmed by RLC the procedure ends.

The UE shall be inhibited from sending the SIGNALLING CONNECTION RELEASE INDICATION message with the IE "Signalling Connection Release Indication Cause" set to "UE Requested PS Data session end" whilst timer T323 is running.

If PS data becomes available for transmission or the UE receives a paging message that triggers cell update procedure then the UE shall V316 to zero. If the UE sends of the SIGNALLING CONNECTION RELEASE INDICATION message with the IE "Signalling Connection Release Indication Cause" set to "UE Requested PS Data session end" in CELL_DCH or CELL_FACH state and in response the UE receives a reconfiguration message that transitions the UE to CELL_PCH state or URA_PCH state then the UE shall set V316 to N316. The UE shall consider the reconfiguration message to be in response to the SIGNALLING CONNECTION RELEASE INDICATION message if it is received within 500ms.

8.1.14.2a RLC re-establishment or inter-RAT change

If a re-establishment of the transmitting side of the RLC entity on signalling radio bearer RB2 occurs before the successful delivery of the SIGNALLING CONNECTION RELEASE INDICATION message has been confirmed by RLC, the UE shall:

> 1> retransmit the SIGNALLING CONNECTION RELEASE INDICATION message on the uplink DCCH using AM RLC on signalling radio bearer RB2.

If an Inter-RAT handover from UTRAN procedure occurs before the successful delivery of the SIGNALLING CONNECTION RELEASE INDICATION message has been confirmed by RLC, the UE shall:

> 1> abort the signalling connection while in the new RAT.

8.1.14.3 Reception of SIGNALLING CONNECTION RELEASE INDICATION by the UTRAN

Upon reception of a SIGNALLING CONNECTION RELEASE INDICATION message, if the IE "Signalling Connection Release Indication Cause" is not included the UTRAN requests the release of the signalling connection from upper layers. Upper layers may then initiate the release of the signalling connection.

If the IE "Signalling Connection Release Indication Cause" is included in the SIGNALLING CONNECTION RELEASE INDICATION message the UTRAN may initiate a state transition to efficient battery consumption IDLE, CELL_PCH, URA_PCH or CELL_FACH state.

8.1.14.4 Expiry of timer T323

When timer T323 expires:

> 1> the UE may determine whether any subsequent indications from upper layers that there is no more PS data for a prolonged period in which case it triggers the transmission of a single SIGNALLING CONNECTION RELEASE INDICATION message according with clause 8.1.14.2;
>
> 1> the procedure ends.

*8.3 RRC connection mobility procedures*

8.3.1 Cell and URA update procedures

Figure 36:
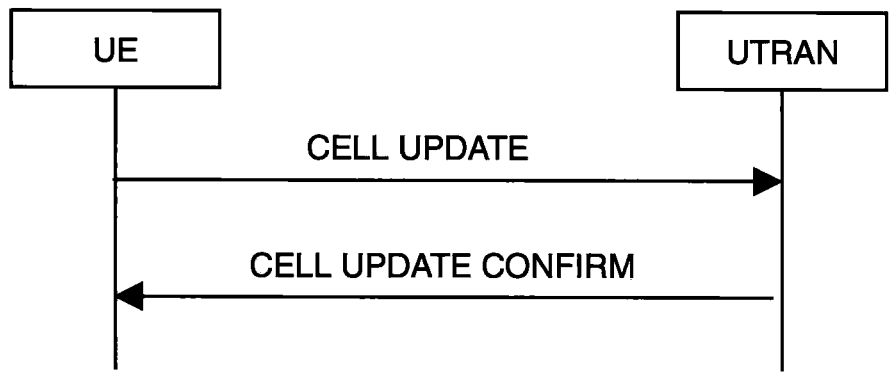
FIG. 36 illustrates a cell update procedure, basic flow.

Figure 36 illustrates a cell update procedure, basic flow.

Figure 37:
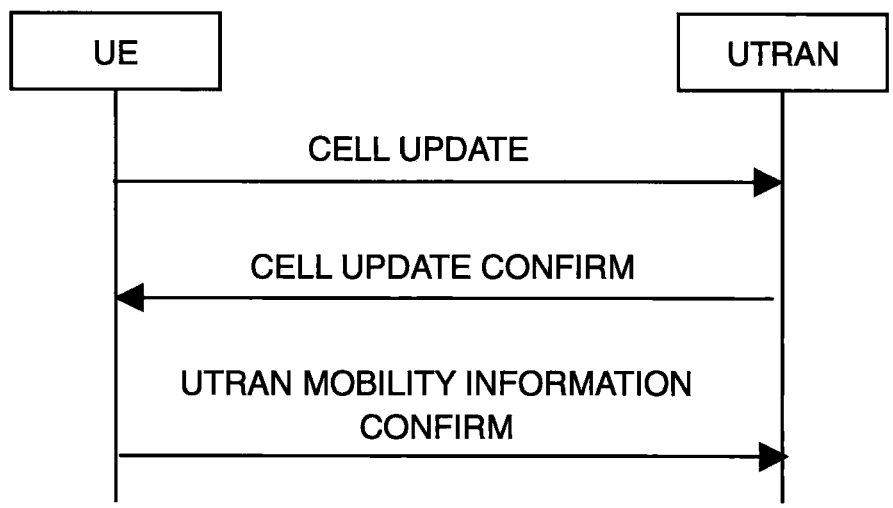
FIG. 37 illustrates a cell update procedure with update of UTRAN mobility information.

Figure 37 illustrates a cell update procedure with update of UTRAN mobility information.

Figure 38:
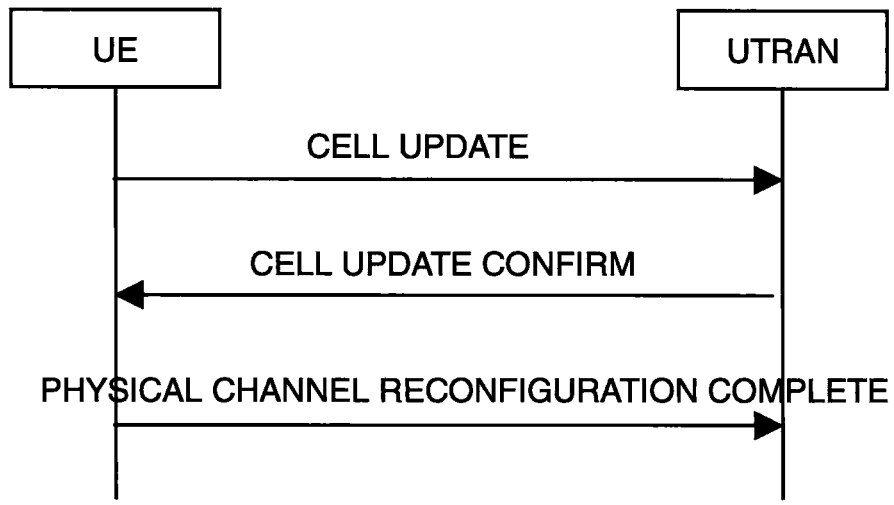
FIG. 38 illustrates a cell update procedure with physical channel reconfiguration.

Figure 38 illustrates a cell update procedure with physical channel reconfiguration.

Figure 39:
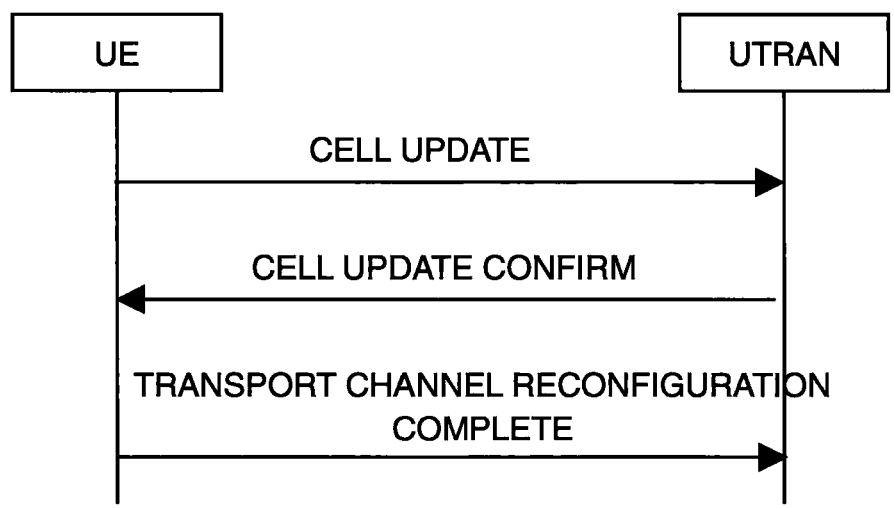
FIG. 39 illustrates a cell update procedure with transport channel reconfiguration.

Figure 39 illustrates a cell update procedure with transport channel reconfiguration.

Figure 40:
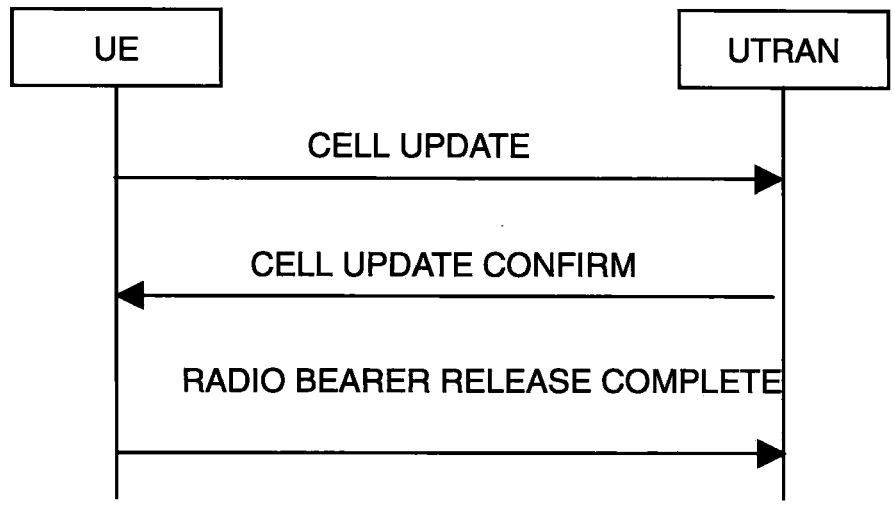
FIG. 40 illustrates a cell update procedure with radio bearer release.

Figure 40 illustrates a cell update procedure with radio bearer release.

Figure 41:
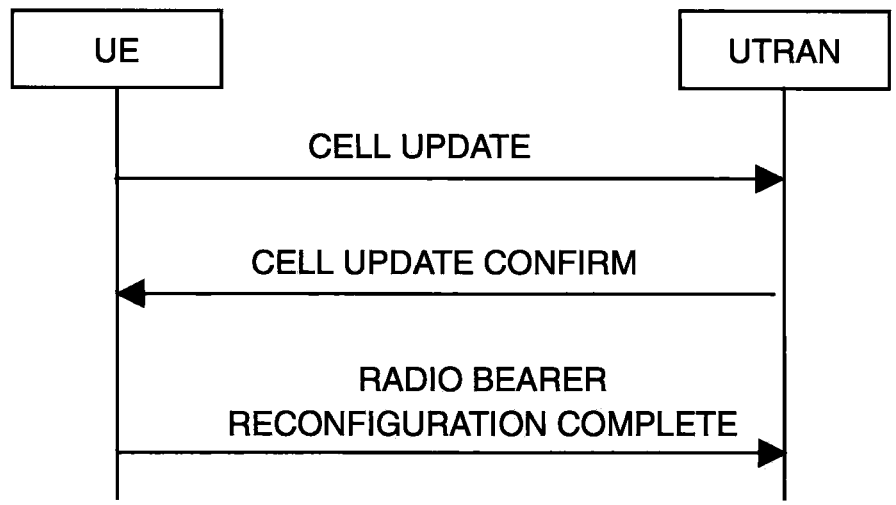
FIG. 41 illustrates a cell update procedure with radio bearer reconfiguration.

Figure 41 illustrates a cell update procedure with radio bearer reconfiguration.

Figure 42:
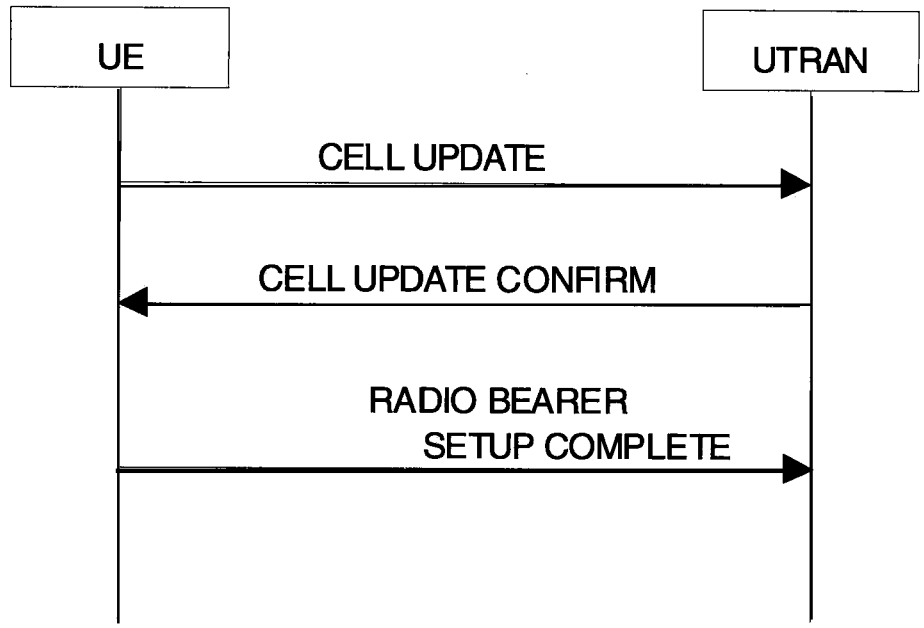
FIG. 42 illustrates a cell update procedure with radio bearer set up.

Figure 42 illustrates a cell update procedure with radio bearer set up.

Figure 43:
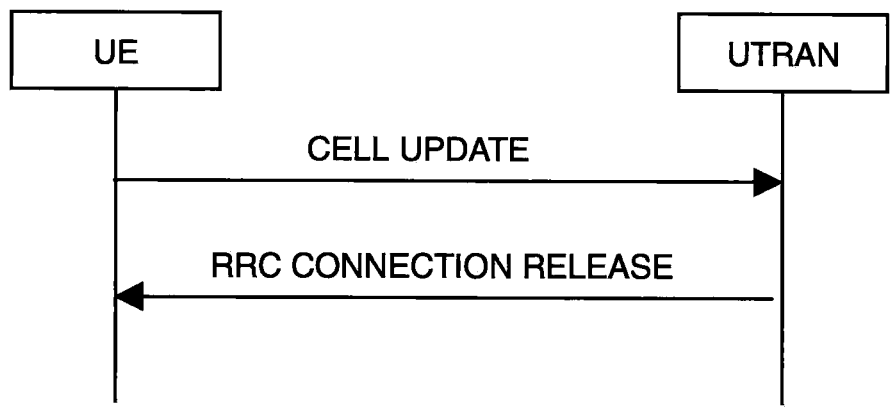
FIG. 43 illustrates a cell update procedure, failure case.

Figure 43 illustrates a cell update procedure, failure case.

Figure 44:
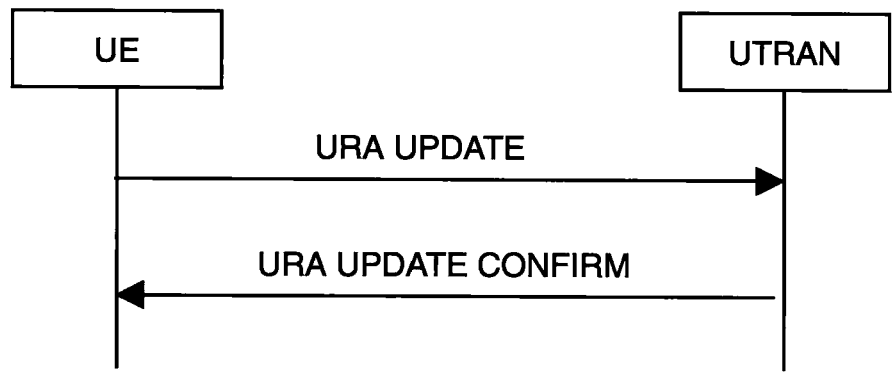
FIG. 44 illustrates a URA update procedure, basic flow.

Figure 44 illustrates a URA update procedure, basic flow.

Figure 45:
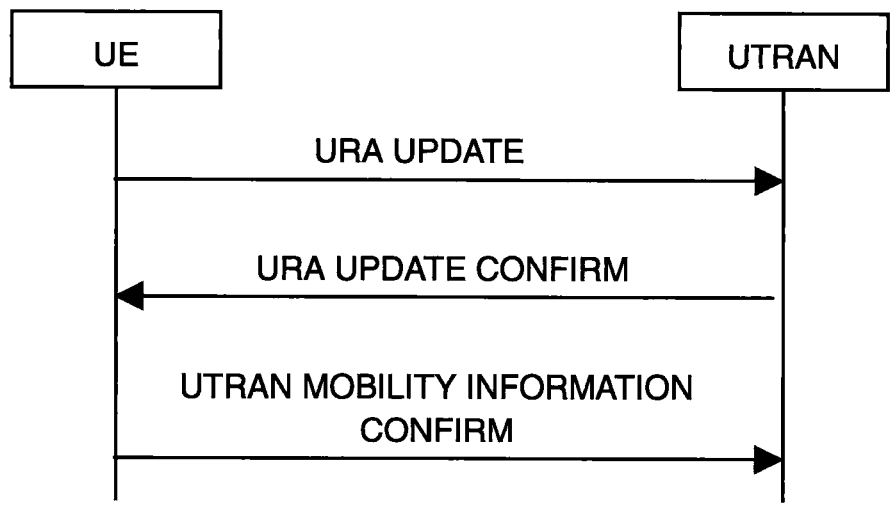
FIG. 45 illustrates a URA update procedure with update of UTRAN mobility information.

Figure 45 illustrates a URA update procedure with update of UTRAN mobility information.

Figure 46:
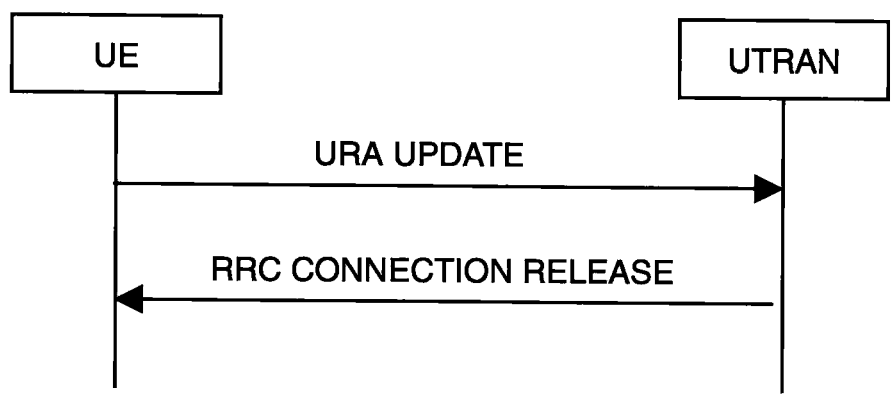
FIG. 46 illustrates a URA update procedure, failure case.

Figure 46 illustrates a URA update procedure, failure case.

8.3.1.1 General

The URA update and cell update procedures serve several main purposes:

- to notify UTRAN after re-entering service area in the URA_PCH or CELL_PCH state;

- to notify UTRAN of an RLC unrecoverable error [16] on an AM RLC entity;

- to be used as a supervision mechanism in the CELL_FACH, CELL_PCH, or URA_PCH state by means of periodical update.

In addition, the URA update procedure also serves the following purpose:

- to retrieve a new URA identity after cell re-selection to a cell not belonging to the current URA assigned to the UE in URA_PCH state.

In addition, the cell update procedure also serves the following purposes:

- to update UTRAN with the current cell the UE is camping on after cell reselection;

- to act on a radio link failure in the CELL_DCH state;

- to act on the transmission failure of the UE CAPABILITY INFORMATION message;

- for FDD and 1.28 Mcps TDD, if the variable H_RNTI is not set, and for 3.84 Mcps TDD and 7.68 Mcps TDD: when triggered in the URA_PCH or CELL_PCH state, to notify UTRAN of a transition to the CELL_FACH state due to the reception of UTRAN originated paging or due to a request to transmit uplink data;

- to count the number of UEs in URA_PCH, CELL_PCH and CELL_FACH that are interested to receive an MBMS transmission;

- when triggered in the URA_PCH, CELL_PCH and CELL_FACH state, to notify UTRAN of the UEs interest to receive an MBMS service;

- to request the MBMS P-T-P RB setup by the UE in CELL_PCH, URA_PCH and CELL_FACH state.

The URA update and cell update procedures may:

1> include an update of mobility related information in the UE;

1> cause a state transition from the CELL_FACH state to the CELL_DCH, CELL_PCH or URA_PCH states or idle mode.

The cell update procedure may also include:
- a re-establish of AM RLC entities;
- a radio bearer release, radio bearer reconfiguration, transport channel reconfiguration or physical channel reconfiguration.

8.3.1.2 Initiation

A UE shall initiate the cell update procedure in the following cases:

1> Uplink data transmission:

2> for FDD and 1.28 Mcps TDD, if the variable H_RNTI is not set, and for 3.84 Mcps TDD and 7.68 Mcps TDD:

3> if the UE is in URA_PCH or CELL_PCH state; and

3> if timer T320 is not running:

4> if the UE has uplink RLC data PDU or uplink RLC control PDU on RB1 or upwards to transmit:

5> perform cell update using the cause "uplink data transmission".

3> else:

4> if the variable ESTABLISHMENT_CAUSE is set:

5> perform cell update using the cause "uplink data transmission".

1> Paging response:

2> if the criteria for performing cell update with the cause specified above in the current subclause are not met; and 2> if the UE in URA_PCH or CELL_PCH state, receives a PAGING TYPE 1 message fulfilling the conditions for initiating a cell update procedure specified in subclause 8.1.2.3:

3> perform cell update using the cause "paging response".

1> Radio link failure:

2> if none of the criteria for performing cell update with the causes specified above in the current subclause is met:

3> if the UE is in CELL_DCH state and the criteria for radio link failure are met as specified in subclause 8.5.6; or 3> if the transmission of the UE CAPABILITY INFORMATION message fails as specified in subclause 8.1.6.6:

4> perform cell update using the cause "radio link failure".

1> MBMS ptp RB request:

2> if none of the criteria for performing cell update with the causes specified above in the current subclause is met; and 2> if the UE is in URA_PCH, Cell_PCH or Cell_FACH state; and 2> if timer T320 is not running; and 2> if the UE should perform cell update for MBMS ptp radio bearer request as specified in subclause 8.6.9.6:

3> perform cell update using the cause "MBMS ptp RB request".

1> Re-entering service area:

2> if none of the criteria for performing cell update with the causes specified above in the current subclause is met; and 2> if the UE is in CELL_FACH or CELL_PCH state; and 2> if the UE has been out of service area and re-enters service area before T307 or T317 expires:

3> perform cell update using the cause "re-entering service area".

1> RLC unrecoverable error:

2> if none of the criteria for performing cell update with the causes specified above in the current subclause is met; and 2> if the UE detects RLC unrecoverable error [16] in an AM RLC entity:

3> perform cell update using the cause "RLC unrecoverable error".

1> Cell reselection:

2> if none of the criteria for performing cell update with the causes specified above in the current subclause is met:

3> if the UE is in CELL_FACH or CELL_PCH state and the UE performs cell re-selection; or 3> if the UE is in CELL_FACH state and the variable C_RNTI is empty:

4> perform cell update using the cause "cell reselection".

1> Periodical cell update:

2> if none of the criteria for performing cell update with the causes specified above in the current subclause is met; and 2> if the UE is in CELL_FACH or CELL_PCH state; and 2> if the timer T305 expires; and 2> if the criteria for "in service area" as specified in subclause 8.5.5.2 are fulfilled; and 2> if periodic updating has been configured by T305 in the IE "UE Timers and constants in connected mode" set to any other value than "infinity":

3> for FDD:

4> if the variable COMMON_E_DCH_TRANSMISSION is set to FALSE:

5> perform cell update using the cause "periodical cell update".

4> else:

5> restart the timer T305;

5> and end the procedure.

3> for 1.28 Mcps TDD and 3.84/7.68 Mcps TDD:

4> perform cell update using the cause "periodical cell update".

1> MBMS reception:

2> if none of the criteria for performing cell update with the causes specified above in the current subclause is met; and 2> if the UE is in URA_PCH, Cell_PCH or Cell_FACH state; and 2> if the UE should perform cell update for MBMS counting as specified in subclause 8.7.4:

3> perform cell update using the cause "MBMS reception".

A UE in URA_PCH state shall initiate the URA update procedure in the following cases:

1> URA reselection:

2> if the UE detects that the current URA assigned to the UE, stored in the variable URA_IDENTITY, is not present in the list of URA identities in system information block type 2; or 2> if the list of URA identities in system information block type 2 is empty; or 2> if the system information block type 2 can not be found:

3> perform URA update using the cause "change of URA".

1> Periodic URA update:

2> if the criteria for performing URA update with the causes as specified above in the current subclause are not met:

3> if the timer T305 expires and if periodic updating has been configured by T305 in the IE "UE Timers and constants in connected mode" set to any other value than "infinity"; or 3> if the conditions for initiating an URA update procedure specified in subclause 8.1.1.6.5 are fulfilled:

4> perform URA update using the cause "periodic URA update".

When initiating the URA update or cell update procedure, the UE shall:

1> if the UE has uplink RLC data PDU or uplink RLC control PDU on RB3 or upwards to transmit; or 1> if the UE received a PAGING TYPE 1 message fulfilling the conditions for initiating a cell update procedure specified in subclause 8.1.2.3:

2> set the counter V316 to zero.

1> if timer T320 is running:

2> stop timer T320;

2> if the UE has uplink RLC data PDU or uplink RLC control PDU on RB1 or upwards to transmit:

3> perform cell update using the cause "uplink data transmission".

2> else:

3> if the cell update procedure is not triggered due to Paging response or Radio link failure; and 3> if the UE should perform cell update for MBMS ptp radio bearer request as specified in subclause 8.6.9.6:

4> perform cell update using the cause "MBMS ptp RB request".

1> stop timer T319 if it is running;

1> stop timer T305;

1> for FDD and 1.28 Mcps TDD:

2> if the UE is in CELL_FACH state; and

2> if the IE "HS-DSCH common system information" is included in System Information Block type 5 or System Information Block type 5bis; and 2> for 1.28 Mcps TDD, if IE "Common E-DCH system info" in System Information Block type 5; and 2> if the UE does support HS-DSCH reception in CELL_FACH state:

3> if variable H_RNTI is not set or variable C_RNTI is not set:

4> clear variable H_RNTI;

4> clear variable C_RNTI;

4> clear any stored IEs "HARQ info";

4> set variable HS_DSCH_RECEPTION_OF_CCCH_ENABLED to TRUE;

4> and start receiving the HS-DSCH transport channels mapped physical channel(s) of type HS-SCCH and HS-PDSCH, by using parameters given by the IE(s) "HS-DSCH common system information" according to the procedure in subclause 8.5.37.

3> else:

4> receive the HS-DSCH transport channels mapped physical channel(s) of type HS-SCCH and HS-PDSCH, by using parameters given by the IE(s) "HS-DSCH common system information" according to the procedure in subclause 8.5.36;

4> determine the value for the HSPA_RNTI_STORED_CELL_PCH variable and take the corresponding actions as described in subclause 8.5.56;

4> determine the value for the READY_FOR_COMMON_EDCH variable and take the corresponding actions as described in subclause 8.5.47;

4> determine the value for the COMMON_E_DCH_TRANSMISSION variable and take the corresponding actions as described in subclause 8.5.46;

4> if variable READY_FOR_COMMON_EDCH is set to TRUE:

5> configure the Enhanced Uplink in CELL_FACH state and Idle mode as specified in subclause 8.5.45 for FDD and 8.5.45a for 1.28 Mcps TDD.

1> if the UE is in CELL_DCH state:

2> in the variable RB_TIMER_INDICATOR, set the IE "T314 expired" and the IE "T315 expired" to FALSE;

2> if the stored values of the timer T314 and timer T315 are both equal to zero; or 2> if the stored value of the timer T314 is equal to zero and there are no radio bearers associated with any radio access bearers for which in the variable ESTABLISHED_RABS the value of the IE "Re-establishment timer" is set to "useT315" and signalling connection exists only to the CS domain:

3> release all its radio resources;

3> indicate release (abort) of the established signalling connections (as stored in the variable ESTABLISHED_SIGNALLING_CONNECTIONS) and established radio access bearers (as stored in the variable ESTABLISHED_RABS) to upper layers;

3> clear the variable ESTABLISHED_SIGNALLING_CONNECTIONS;

3> clear the variable ESTABLISHED_RABS;

3> enter idle mode;

3> perform other actions when entering idle mode from connected mode as specified in subclause 8.5.2;

3> and the procedure ends.

2> if the stored value of the timer T314 is equal to zero:

3> release all radio bearers, associated with any radio access bearers for which in the variable ESTABLISHED_RABS the value of the IE "Re-establishment timer" is set to "useT314";

3> in the variable RB_TIMER_INDICATOR set the IE "T314 expired" to TRUE;

3> if all radio access bearers associated with a CN domain are released:

4> release the signalling connection for that CN domain;

4> remove the signalling connection for that CN domain from the variable ESTABLISHED_SIGNALLING_CONNECTIONS;

4> indicate release (abort) of the signalling connection to upper layers;

2> if the stored value of the timer T315 is equal to zero:

3> release all radio bearers associated with any radio access bearers for which in the variable ESTABLISHED_RABS the value of the IE "Re-establishment timer" is set to "useT315";

3> in the variable RB_TIMER_INDICATOR set the IE "T315 expired" to TRUE.

3> if all radio access bearers associated with a CN domain are released:

4> release the signalling connection for that CN domain;

4> remove the signalling connection for that CN domain from the variable ESTABLISHED_SIGNALLING_CONNECTIONS;

4> indicate release (abort) of the signalling connection to upper layers;

2> if the stored value of the timer T314 is greater than zero:

3> if there are radio bearers associated with any radio access bearers for which in the variable ESTABLISHED_RABS the value of the IE "Re-establishment timer" is set to "useT314":

4> start timer T314.

3> if there are no radio bearers associated with any radio access bearers for which in the variable ESTABLISHED_RABS the value of the IE "Re-establishment timer" is set to "useT314" or "useT315" and the signalling connection exists to the CS domain:

4> start timer T314.

2> if the stored value of the timer T315 is greater than zero:

3> if there are radio bearers associated with any radio access bearers for which in the variable ESTABLISHED_RABS the value of the IE "Re-establishment timer" is set to "useT315"; or 3> if the signalling connection exists to the PS domain:

4> start timer T315.

2> for the released radio bearer(s):

3> delete the information about the radio bearer from the variable ESTABLISHED_RABS;

3> when all radio bearers belonging to the same radio access bearer have been released:

4> indicate local end release of the radio access bearer to upper layers using the CN domain identity together with the RAB identity stored in the variable ESTABLISHED_RABS;

4> delete all information about the radio access bearer from the variable ESTABLISHED_RABS.

2> if the variable E_DCH_TRANSMISSION is set to TRUE:

3> set the variable E_DCH_TRANSMISSION to FALSE;

3> stop any E-AGCH and E-HICH reception procedures;

3> for FDD, stop any E-RGCH reception procedures.

3> for FDD, stop any E-DPCCH and E-DPDCH transmission procedures.

3> for 1.28 Mcps TDD, stop any E-PUCH transmission procedure.

3> clear the variable E_RNTI;

3> act as if the IE "MAC-es/e reset indicator" was received and set to TRUE;

3> release all E-DCH HARQ resources;

3> no longer consider any radio link to be the serving E-DCH radio link.

2> move to CELL_FACH state;

2> select a suitable UTRA cell on the current frequency according to [4];

2> clear variable E_RNTI and:

3> determine the value for the HSPA_RNTI_STORED_CELL_PCH variable and take the corresponding actions as described in subclause 8.5.56;

3> determine the value for the READY_FOR_COMMON_EDCH variable and take the corresponding actions as described in subclause 8.5.47;

3> determine the value for the COMMON_E_DCH_TRANSMISSION variable and take the corresponding actions as described in subclause 8.5.46.

2> for 3.84 Mcps TDD and 7.68Mcps TDD; or

2> for FDD and 1.28 Mcps TDD, if the UE does not support HS-DSCH reception in CELL_FACH state; or 2> if the IE "HS-DSCH common system information" is not included in System Information Block type 5 or System Information Block type 5bis; or 2> for 1.28 Mcps TDD, if the IE "Common E-DCH system info" is not included in System Information Block type 5:

3> select PRACH according to subclause 8.5.17;

3> select Secondary CCPCH according to subclause 8.5.19;

3> use the transport format set given in system information as specified in subclause 8.6.5.1;

3> take the actions related to the HS_DSCH_RECEPTION_GENERAL variable as described in subclause 8.5.37a.

2> else:

3> if variable READY_FOR_COMMON_EDCH is set to TRUE:

4> configure the Enhanced Uplink in CELL_FACH state and Idle mode as specified in subclause 8.5.45.

3> else:

4> select PRACH according to subclause 8.5.17 and:

5> use for the PRACH the transport format set given in system information as specified in subclause 8.6.5.1.

3> clear variable H_RNTI;

3> clear any stored IEs "HARQ info";

3> reset the MAC-ehs entity [15];

3> set variable HS_DSCH_RECEPTION_OF_CCCH_ENABLED to TRUE;

3> and start receiving the HS-DSCH according to the procedure in subclause 8.5.37.

2> set the variable ORDERED_RECONFIGURATION to FALSE.

1> set the variables PROTOCOL_ERROR_INDICATOR, FAILURE_INDICATOR, UNSUPPORTED_CONFIGURATION and INVALID_CONFIGURATION to FALSE;

1> set the variable CELL_UPDATE_STARTED to TRUE;

1> if any IEs relegated to HS-DSCHare stored in the UE:

2> clear any stored IE "Downlink HS-PDSCH information";

2> clear any stored IE "Downlink Secondary Cell Info FDD";

2> clear all the entries from the variable TARGET_CELL_PRECONFIGURATION;

2> for 1.28Mcps TDD, clear the IE "HS-PDSCH Midamble Configuration" and the IE "HS-SCCH Set Configuration" in the IE "DL Multi Carrier Information";

2> determine the value for the HS_DSCH_RECEPTION variable and take the corresponding actions as described in subclause 8.5.25;

2> determine the value for the SECONDARY_CELL_HS_DSCH_RECEPTION variable and take the corresponding actions as described in subclause 8.5.51.

1> if any IEs related to E-DCH are stored in the UE:

2> clear any stored IE "E-DCH info";

2> determine the value for the E_DCH_TRANSMISSION variable and take the corresponding actions as described in subclause 8.5.28.

1> if any of the IEs "DTX-DRX timing information" or "DTX-DRX information" are stored in the UE:

2> determine the value for the DTX_DRX_STATUS variable and take the corresponding actions as described in subclause 8.5.34.

1> if the IE "HS-SCCH less information" is stored in the UE:

2> determine the value for the HS_SCCH_LESS_STATUS variable and take the corresponding actions as described in subclause 8.5.35.

1> if any IEs related to MIMO are stored in the UE:

2> determine the value for the MIMO_STATUS variable and take the corresponding actions as described in subclause 8.5.33.

1> for 1.28 Mcps TDD, if the IEs "Control Channel DRX Information" is stored in the UE:

2> determine the value for the CONTROL_CHANNEL_DRX_STATUS variable and take the corresponding actions as described in subclause 8.5.53.

1> for 1.28 Mcps TDD, if the IE "SPS information" is stored in the UE:

2> determine the value for the E_DCH_SPS_STATUS variable and take the corresponding actions as described in subclause 8.5.54;

2> determine the value for the HS_DSCH_SPS_STATUS variable and take the corresponding actions as described in subclause 8.5.55.

1> if the UE is not already in CELL_FACH state:

2> move to CELL_FACH state;

2> determine the value for the HSPA_RNTI_STORED_CELL_PCH variable and take the corresponding actions as described in subclause 8.5.56;

2> determine the value for the READY_FOR_COMMON_EDCH variable and take the corresponding actions as described in subclause 8.5.47;

2> determine the value for the COMMON_E_DCH_TRANSMISSION variable and take the corresponding actions as described in subclause 8.5.46;

2> for 3.84 Mcps TDD and 7.68 Mcps TDD; or

2> for FDD and 1.28 Mcps TDD, if the UE does not support HS-DSCH reception in CELL_FACH state; or 2> if the IE "HS-DSCH common system information" is not included in System Information Block type 5 or System Information Block type 5bis; or 2> for 1.28 Mcps TDD, if the IE "Common E-DCH system info" is not included in System Information Block type 5:

3> select PRACH according to subclause 8.5.17;

3> select Secondary CCPCH according to subclause 8.5.19;

3> use the transport format set given in system information as specified in subclause 8.6.5.1;

3> take the actions related to the HS_DSCH_RECEPTION_GENERAL variable as described in subclause 8.5.37a.

2> else:

3> if variable READY_FOR_COMMON_EDCH is set to TRUE:

4> configure the Enhanced Uplink in CELL_FACH state and Idle mode as specified in subclause 8.5.45.

3> else:

4> select PRACH according to subclause 8.5.17 and:

5> use for the PRACH the transport format set given in system information as specified in subclause 8.6.5.1.

3> if variable H_RNTI is not set or variable C_RNTI is not set:

4> clear variable C_RNTI;

4> clear variable H_RNTI;

4> clear any stored IEs "HARQ info";

4> set variable HS_DSCH_RECEPTION_OF_CCCH_ENABLED to TRUE;

4> and start receiving the HS-DSCH according to the procedure in subclause 8.5.37.

3> else:

4> receive the HS-DSCH according to the procedure in subclause 8.5.36.

1> if the UE performs cell re-selection:

2> clear the variable C_RNTI; and

2> stop using that C_RNTI just cleared from the variable C_RNTI in MAC;

2> for FDD and 1.28 Mcps TDD, if the variable H_RNTI is set:

3> clear the variable H_RNTI; and

3> stop using that H_RNTI just cleared from the variable H_RNTI in MAC;

3> clear any stored IEs "HARQ info";

2> for FDD and 1.28 Mcps TDD, if the variable E_RNTI is set:

3> clear the variable E_RNTI.

2> determine the value for the HSPA_RNTI_STORED_CELL_PCH variable and take the corresponding actions as described in subclause 8.5.56;

2> determine the value for the READY_FOR_COMMON_EDCH variable and take the corresponding actions as described in subclause 8.5.47;

2> determine the value for the COMMON_E_DCH_TRANSMISSION variable and take the corresponding actions as described in subclause 8.5.46;

2> for FDD and 1.28 Mcps TDD, if the UE does support HS-DSCH reception in CELL_FACH state and IE "HS-DSCH common system information" is included in System Information Block type 5 or System Information Block type 5bis:

3> reset the MAC-ehs entity [15].

3> set variable HS_DSCH_RECEPTION_OF_CCCH_ENABLED to TRUE;

3> and start receiving the HS-DSCH according to the procedure in subclause 8.5.37.

2> else:

3> take the actions related to the HS_DSCH_RECEPTION_GENERAL variable as described in subclause 8.5.37a.

1> set CFN in relation to SFN of current cell according to subclause 8.5.15;

1> in case of a cell update procedure:

2> set the contents of the CELL UPDATE message according to subclause 8.3.1.3;

2> submit the CELL UPDATE message for transmission on the uplink CCCH.

1> in case of a URA update procedure:

2> set the contents of the URA UPDATE message according to subclause 8.3.1.3;

2> submit the URA UPDATE message for transmission on the uplink CCCH.

1> set counter V302 to 1;

1> start timer T302 when the MAC layer indicates success or failure in transmitting the message.

10.3.3.43 UE Timers and Constants in connected mode

This information element specifies timer- and constants values used by the UE in connected mode.

| Information Element/Group name | Need | Multi | Type and reference | Semantics description | Version |
| --- | --- | --- | --- | --- | --- |
| T301 | MD | | Integer(100, 200 .. 2000 by step of 200, 3000, 4000, 6000, 8000) | Value in milliseconds. Default value is 2000. This IE should not be used by the UE in this release of the protocol. One spare value is needed. | |
| N301 | MD | | Integer(0..7) | Default value is 2. This IE should not be used by the UE in this release of the protocol. | |
| T302 | MD | | Integer(100, 200... 2000 by step of | Value in milliseconds. Default value is 4000. One spare value is needed. | |

| Information Element/Group name | Need | Multi | Type and reference | Semantics description | Version |
|---|---|---|---|---|---|
| | | | 200, 3000, 4000, 6000, 8000) | | |
| N302 | MD | | Integer(0..7) | Default value is 3. | |
| T304 | MD | | Integer(100, 200, 400, 1000, 2000) | Value in milliseconds. Default value is 2000. Three spare values are needed. | |
| N304 | MD | | Integer(0..7) | Default value is 2.. | |
| T305 | MD | | Integer(5, 10, 30, 60, 120, 360, 720, infinity) | Value in minutes. Default value is 30. Infinity means no update | |
| T307 | MD | | Integer(5, 10, 15, 20, 30, 40, 50) | Value in seconds. Default value is 30. One spare value is needed. | |
| T308 | MD | | Integer(40, 80, 160, 320) | Value in milliseconds. Default value is 160. | |
| T309 | MD | | Integer(1...8) | Value in seconds. Default value is 5. | |
| T310 | MD | | Integer(40..320 by step of 40) | Value in milliseconds. Default value is 160. | |
| N310 | MD | | Integer(0..7) | Default value is 4. | |
| T311 | MD | | Integer(250..2000 by step of 250) | Value in milliseconds. Default value is 2000. | |
| T312 | MD | | Integer(0..15) | Value in seconds. Default value is 1. The value 0 is not used in this version of the specification. | |
| N312 | MD | | Integer (1, 2, 4, 10, 20, 50, 100, 200, 400, 600, 800, 1000) | Default value is 1. | |
| T313 | MD | | Integer(0..15) | Value in seconds. Default value is 3. | |
| N313 | MD | | Integer (1, 2, 4, 10, 20, 50, 100, 200) | Default value is 20. | |
| T314 | MD | | Integer(0, 2, 4, 6, 8, 12, 16, 20) | Value in seconds. Default value is 12. | |
| T315 | MD | | Integer (0,10, 30, 60, 180, | Value in seconds. Default value is 180. | |

| Information Element/Group name | Need | Multi | Type and reference | Semantics description | Version |
|---|---|---|---|---|---|
| | | | 600, 1200, 1800) | | |
| N315 | MD | | Integer (1, 2, 4, 10, 20, 50, 100, 200, 400, 600, 800, 1000) | Default value is 1. | |
| T316 | MD | | Integer(0, 10, 20, 30, 40, 50, infinity) | Value in seconds. Default value is 30. One spare value is needed. | |
| T317 | MD | | | Default value is infinity. | |
| | | | Enumerated (infinity, infinity, infinity, infinity, infinity, infinity, infinity, infinity) | All the values are changed to "infinity" in the Rel-5. | REL-5 |
| T323 | OP | | Enumerated (0, 5, 10, 20, 30, 60, 90, 120) | Value in seconds. The use of 0secs indicates no need to apply the inhibit timer. | REL-8 |
| N316 | OP | | Integer (0, 1, 2) | Maximum number of transmissions of the SIGNALLING CONNECTION RELEASE INDICATION message, with the IE "Signalling Connection Release Indication Cause" set to "UE Requested PS Data session end" in CELL_PCH or URA_PCH. | Rel-8 |

13.4.27x TRIGGERED_SCRI_IN_PCH_STATE

This variable contains information about whether a SIGNALLING CONNECTION RELEASE INDICATION message has been triggered in CELL_PCH or URA_PCH states. There is one such variable in the UE.

| Information Element/Group name | Need | Multi | Type and reference | Semantics description |
|---|---|---|---|---|
| Triggered | OP | | Boolean | Set to FALSE on entering UTRA RRC connected mode. |

13.2 Counters for UE

| Counter | Reset | Incremented | When reaching max value |
|---|---|---|---|
| V300 | When initiating the procedure RRC connection establishment | Upon expiry of T300. | When V300 > N300, the UE enters idle mode. |
| V302 | When initiating the procedure Cell update or URA update | Upon expiry of T302 | When V302 > N302 the UE enters idle mode. |
| V304 | When sending the first UE CAPABILITY INFORMATION message. | Upon expiry of T304 | When V304 > N304 the UE initiates the Cell update procedure |
| V308 | When sending the first RRC CONNECTION RELEASE COMPLETE message in a RRC connection release procedure. | Upon expiry of T308 | When V308 > N308 the UE stops re-transmitting the RRC CONNECTION RELEASE COMPLETE message. |
| V310 | When sending the first PUSCH CAPACITY REQUEST message in a PUSCH capacity request procedure | Upon expiry of T310 | When V310 > N310 the UE stops re-transmitting the PUSCH CAPACITY REQUEST message. |
| V316 | When entering UTRA RRC Connected mode or when PS data becomes available for uplink transmission or when UE receives paging message that triggers cell update procedure. | Upon sending the SIGNALLING CONNECTION RELEASE INDICATION message, with the IE "Signalling Connection Release Indication Cause" set to "UE Requested PS Data session end" in CELL_PCH or URA_PCH. | When V316>=N316 then UE stops sending any further SIGNALLING CONNECTION RELEASE INDICATION message, with the IE "Signalling Connection Release Indication Cause" set to "UE Requested PS Data session end" in CELL_PCH or URA_PCH. |

13.3 UE constants and parameters

| Constant | Usage |
|---|---|
| N300 | Maximum number of retransmissions of the RRC CONNECTION REQUEST message |
| N302 | Maximum number of retransmissions of the CELL UPDATE / URA UPDATE message |
| N304 | Maximum number of retransmissions of the UE CAPABILITY INFORMATION message |
| N308 | Maximum number of retransmissions of the RRC CONNECTION RELEASE COMPLETE message |
| N310 | Maximum number of retransmission of the PUSCH CAPACITY REQUEST message |
| N312 | Maximum number of "in sync" received from L1. |
| N313 | Maximum number of successive "out of sync" received from L1. |
| N315 | Maximum number of successive "in sync" received from L1 during T313 is activated. |
| N316 | Maximum number of transmissions of the SIGNALLING CONNECTION RELEASE INDICATION message, with the IE "Signalling Connection Release Indication Cause" set to "UE Requested PS Data session end" in CELL_PCH or URA_PCH. |

Appendix D

From 25.331 section 8.2.2, Figure 8.2.2-3: depicts a Radio bearer reconfiguration, normal flow.

The message is described here, with the proposed addition in italics and bold:

10.2.27 RADIO BEARER RECONFIGURATION

This message is sent from UTRAN to reconfigure parameters related to a change of QoS or to release and setup a radio bearer used for ptp transmission of MBMS services of the broadcast type. This procedure can also change the multiplexing of MAC, reconfigure transport channels and physical channels. This message is also used to perform a handover from GERAN *Iu mode* to UTRAN.

RLC-SAP: AM or UM or sent through GERAN *Iu mode*

Logical channel: DCCH or sent through GERAN *Iu mode*

Direction: UTRAN → UE

| Information Element/Group name | Need | Multi | Type and reference | Semantics description | Version |
|---|---|---|---|---|---|
| Message Type | MP | | Message Type | | |
| UE Information elements | | | | | |
| RRC transaction identifier | MP | | RRC transaction identifier 10.3.3.36 | | |
| Integrity check info | CH | | Integrity check info 10.3.3.16 | | |
| Integrity protection mode info | OP | | Integrity protection mode info 10.3.3.19 | The UTRAN should not include this IE unless it is performing an SRNS relocation or a handover from GERAN *Iu mode* | |
| Ciphering mode info | OP | | Ciphering mode info 10.3.3.5 | The UTRAN should not include this IE unless it is performing either an SRNS relocation or a handover from GERAN *Iu mode* and a change in ciphering algorithm | |
| Activation time | MD | | Activation time 10.3.3.1 | Default value is "now" | |
| Delay restriction flag | OP | | Enumerated (TRUE) | This IE is always set to TRUE and included if the activation time is restricted according to subclause 8.6.3.1 | REL-6 |
| New U-RNTI | OP | | U-RNTI 10.3.3.47 | | |
| New C-RNTI | OP | | C-RNTI 10.3.3.8 | | |
| New DSCH-RNTI | OP | | DSCH-RNTI 10.3.3.9a | Should not be set in FDD. If received The UE should ignore it | |

| Information Element/Group name | Need | Multi | Type and reference | Semantics description | Version |
|---|---|---|---|---|---|
| New H-RNTI | OP | | H-RNTI 10.3.3.14a | | REL-5 |
| New Primary E-RNTI | OP | | E-RNTI 10.3.3.10a | | REL-6 |
| New Secondary E-RNTI | OP | | E-RNTI 10.3.3.10a | FDD only | REL-6 |
| RRC State Indicator | MP | | RRC State Indicator 10.3.3.35a | | |
| UE Mobility State Indicator | CV-FACH_PCH | | Enumerated (High-mobilityDetected) | Absence of this IE implies that, according to [4], the UE shall consider itself being in the mobility state the UE has maintained in CELL_DCH state or being not in high mobility state after the state transition, if applicable. | REL-7 |
| UTRAN DRX cycle length coefficient | OP | | UTRAN DRX cycle length coefficient 10.3.3.49 | | |
| CN information elements | | | | | |
| CN Information info | OP | | CN Information info 10.3.1.3 | | |
| UTRAN mobility information elements | | | | | |
| RNC support for change of UE capability | OP | | Boolean | Should be included if the message is used to perform an SRNS relocation | REL-7 |
| Reconfiguration in response to requested change of UE capability | OP | | Enumerated (TRUE) | | REL-7 |
| URA identity | OP | | URA identity 10.3.2.6 | | |
| Specification mode information elements | | | | | REL-8 |
| Default configuration for CELL_FACH | OP | | Default configuration for CELL_FACH 10.3.4.0a | | REL-8 |
| CHOICE specification mode | MP | | | | REL-5 |
| >Complete specification | | | | | |
| RB information elements | | | | | |
| >>RAB information to reconfigure list | OP | 1 to < maxRABsetup > | | | |
| >>>RAB information to reconfigure | MP | | RAB information to reconfigure 10.3.4.11 | | |
| >>RAB information for MBMS ptp bearer list | OP | 1 to < maxMBMSservSelect > | | | REL-6 |
| >>>RAB information for MBMS ptp bearer | MP | | RAB information for MBMS ptp bearer 10.3.4.9a | | REL-6 |
| >>RB information to reconfigure list | MP | 1to <maxRB> | | Although this IE is not always required, need is MP to align with ASN.1 | |

| Information Element/Group name | Need | Multi | Type and reference | Semantics description | Version |
|---|---|---|---|---|---|
| | OP | | | | REL-4 |
| >>>RB information to reconfigure | MP | | RB information to reconfigure 10.3.4.18 | | |
| >>RB information to be affected list | OP | 1 to <maxRB> | | | |
| >>>RB information to be affected | MP | | RB information to be affected 10.3.4.17 | | |
| >>RB with PDCP context relocation info list | OP | 1 to <maxRBallRABs> | | This IE is needed for each RB having PDCP and performing PDCP context relocation | REL-5 |
| >>>PDCP context relocation info | MP | | PDCP context relocation info 10.3.4.1a | | REL-5 |
| >>PDCP ROHC target mode | OP | | PDCP ROHC target mode 10.3.4.2a | | REL-5 |
| TrCH Information Elements | | | | | |
| Uplink transport channels | | | | | |
| >>UL Transport channel information common for all transport channels | OP | | UL Transport channel information common for all transport channels 10.3.5.24 | | |
| >>Deleted TrCH information list | OP | 1 to <maxTrCH> | | | |
| >>>Deleted UL TrCH information | MP | | Deleted UL TrCH information 10.3.5.5 | | |
| >>Added or Reconfigured TrCH information list | OP | 1 to <maxTrCH> | | | |
| >>>Added or Reconfigured UL TrCH information | MP | | Added or Reconfigured UL TrCH information 10.3.5.2 | | |
| Downlink transport channels | | | | | |
| >>DL Transport channel information common for all transport channels | OP | | DL Transport channel information common for all transport channels 10.3.5.6 | | |
| >>Deleted TrCH information list | OP | 1 to <maxTrCH> | | | |
| >>>Deleted DL TrCH information | MP | | Deleted DL TrCH information 10.3.5.4 | | |
| >>Added or Reconfigured TrCH information list | OP | 1 to <maxTrCH> | | | |

| Information Element/Group name | Need | Multi | Type and reference | Semantics description | Version |
|---|---|---|---|---|---|
| >>>Added or Reconfigured DL TrCH information | MP | | Added or Reconfigured DL TrCH information 10.3.5.1 | | |
| >Preconfiguration | | | | | REL-5 |
| >>CHOICE *Preconfiguration mode* | MP | | | This value only applies in case the message is sent through GERAN *Iu mode* | |
| >>>Predefined configuration identity | MP | | Predefined configuration identity 10.3.4.5 | | |
| >>>Default configuration | | | | | |
| >>>>Default configuration mode | MP | | Enumerated (FDD, TDD) | Indicates whether the FDD or TDD version of the default configuration shall be used | |
| >>>>Default configuration identity | MP | | Default configuration identity 10.3.4.0 | | |
| PhyCH information elements | | | | | |
| Frequency info | OP | | Frequency info 10.3.6.36 | | |
| Multi-frequency Info | OP | | Multi-frequency Info 10.3.6.39a | This IE is used for 1.28 Mcps TDD only | REL-7 |
| DTX-DRX timing information | OP | | DTX-DRX timing information 10.3.6.34b | | REL-7 |
| DTX-DRX Information | OP | | DTX-DRX Information 10.3.6.34a | | REL-7 |
| HS-SCCH less Information | OP | | HS-SCCH less Information 10.3.6.36ab | | REL-7 |
| MIMO parameters | OP | | MIMO parameters 10.3.6.41a | | REL-7 |
| Control Channel DRX information | OP | | Control Channel DRX information 1.28 Mcps TDD 10.3.6.107 | This IE is used for 1.28 Mcps TDD only | REL-8 |
| SPS Information | OP | | SPS information 1.28 Mcps TDD 10.3.6.110 | This IE is used for 1.28 Mcps TDD only | REL-8 |
| Uplink radio resources | | | | | |
| Maximum allowed UL TX power | MD | | Maximum allowed UL TX power 10.3.6.39 | Default value is the existing maximum UL TX power | |
| Uplink DPCH info | OP | | Uplink DPCH info 10.3.6.88 | | |
| E-DCH Info | OP | | E-DCH Info 10.3.6.97 | | REL-6 |
| Downlink radio resources | | | | | |
| Downlink HS-PDSCH Information | OP | | Downlink HS-PDSCH Information 10.3.6.23a | | REL-5 |

| Information Element/Group name | Need | Multi | Type and reference | Semantics description | Version |
|---|---|---|---|---|---|
| Downlink information common for all radio links | OP | | Downlink information common for all radio links 10.3.6.24 | | |
| Downlink information per radio link list | MP | 1 to <maxRL> | | Although this IE is not always required, need is MP to align with ASN.1 | |
| | OP | | | | REL-4 |
| >Downlink information for each radio link | MP | | Downlink information for each radio link 10.3.6.27 | | |
| Downlink secondary cell info FDD | OP | | Downlink secondary cell info FDD 10.3.6.31a | FDD only | REL-8 |
| MBMS PL Service Restriction Information | OP | | Enumerated (TRUE) | | REL-6 |
| *FD Transition Flag* | *OP* | | *Enumerated (TRUE)* | *This IE is always set to TRUE and included only if the reconfiguration is being sent in response to a SCRI message with the IE "Signalling Connection Release Indication Cause" to "UE Requested PS Data session end";* | *REL-8* |

| Condition | Explanation |
|---|---|
| FACH_PCH | This IE is mandatory default when a transition from CELL_DCH to CELL_FACH, URA_PCH or CELL_PCH is requested by the message and is not needed otherwise. |

We claim:

1. A method performed by a user equipment (UE), the method comprising:
   sending to a network a first signaling connection release indication (SCRI) message having a cause set while in a first radio resource control (RRC) state;
   receiving a message from the network to transition to a second RRC state; and
   while the UE is in the second RRC state and an inhibit duration timer is not running, and if a count of SCRI messages is less than a predetermined value, inhibiting, at the UE, the sending of a second SCRI message having a cause set, wherein the inhibiting comprises:
      maintaining an indicator that indicates whether or not the second RRC state of the UE is a result of the first SCRI message; and
      if the upper layers indicated that there is no more packet switched (PS) data for a prolonged period of time, transmitting the second SCRI message unless the indicator indicates that the second RRC state of the UE is a result of the first SCRI message.

2. The method of claim 1, wherein the message from the network is sent by the network responsive to the first SCRI message sent by the UE.

3. The method of claim 1, further comprising:
   in the UE, if upper layers indicate that there is no more PS data for a prolonged period, sending the second SCRI message unless the UE is inhibiting the sending of the second SCRI message.

4. The method of claim 1, wherein maintaining the indicator comprises:
   setting the indicator to a first value when the second RRC state is the result of the first SCRI message; and
   otherwise setting the indicator to a second value.

5. The method of claim 4, wherein setting the indicator to the first value comprises setting a "triggered" value in a variable TRIGGERED_SCRI_IN_PCH_STATE to FALSE.

6. The method of claim 5, further comprising:
   if the upper layers indicate that there is no more PS data for the prolonged period of time, and if the UE is in CELL_PCH or URA_iPCH state and the "triggered" value is FALSE:
   setting the "triggered" value to TRUE; and
   sending the second SCRI message.

7. The method of claim 5, further comprising:
   after sending the first SCRI message, if PS data becomes available for transmission, setting the variable to FALSE.

8. The method of claim 4, wherein the indicator comprises one of a flag or a bit token.

9. The method of claim 1, wherein the second RRC state is CELL_PCH state or URA PCH state.

10. A user equipment (UE) comprising at least one processor configured to:
    send to a network a first signaling connection release indication (SCRI) message having a cause set while in a first radio resource control (RRC) state;
    receive a message from the network to transition to a second RRC state; and
    while the UE is in the second RRC state and an inhibit duration timer is not running, and if a count of SCRI messages is less than a predetermined value, inhibit the sending of a second SCRI message having a cause set, wherein the inhibiting comprises:
       maintaining an indicator that indicates whether or not the second RRC state of the UE is a result of the first SCRI message; and
       if the upper layers indicated that there is no more packet switched (PS) data for a prolonged period of time, transmitting the second SCRI message unless the indicator indicates that the second RRC state of the UE is a result of the first SCRI message.

11. The UE of claim 10, wherein the message from the network is sent by the network responsive to the first SCRI message sent by the UE.

12. The UE of claim 10, further configured to:
    if upper layers in the UE indicate that there is no more PS data for a prolonged period, send the second SCRI message unless the UE is inhibiting the sending of the second SCRI message.

13. The UE of claim 10, wherein maintaining the indicator comprises:
    setting the indicator to a first value when the second RRC state is the result of the first SCRI message; and
    otherwise setting the indicator to a second value.

14. The UE of claim 13, wherein setting the indicator to the first value comprises setting a "triggered" value in a variable TRIGGERED_SCRI_IN_PCH_STATE to FALSE.

15. The UE of claim 14, further configured to:
    if the upper layers indicate that there is no more PS data for the prolonged period of time, and if the UE is in CELL_PCH or URA_PCH state and the "triggered" value is FALSE:
    set the "triggered" value to TRUE; and
    send the second SCRI message.

16. The UE of claim 14, further configured to:
    after sending the first SCRI message, if PS data becomes available for transmission, set the variable to FALSE.

17. The UE of claim 13, wherein the indicator comprises one of a flag or a bit token.

18. The UE of claim 10, wherein the second RRC state is CELL_PCH state or URA PCH state.

* * * * *

UNITED STATES PATENT AND TRADEMARK OFFICE
CERTIFICATE OF CORRECTION

PATENT NO. : 9,226,271 B2  Page 1 of 1
APPLICATION NO. : 13/955919
DATED : December 29, 2015
INVENTOR(S) : Johanna Lisa Dwyer and Paul Marcus Carpenter It is certified that error appears in the above-identified patent and that said Letters Patent is hereby corrected as shown below:

Claims

In Column 147, Line 41, In Claim 6, delete "URA_IPCH" and insert -- URA_PCH --, therefor.

Signed and Sealed this
Nineteenth Day of April, 2016

Michelle K. Lee
*Director of the United States Patent and Trademark Office*